Nov. 2, 1948.   W. J. MILLER   2,452,858
METHOD OF AND APPARATUS FOR PRODUCING POTTERY WARE
Original Filed March 1, 1929   17 Sheets-Sheet 1
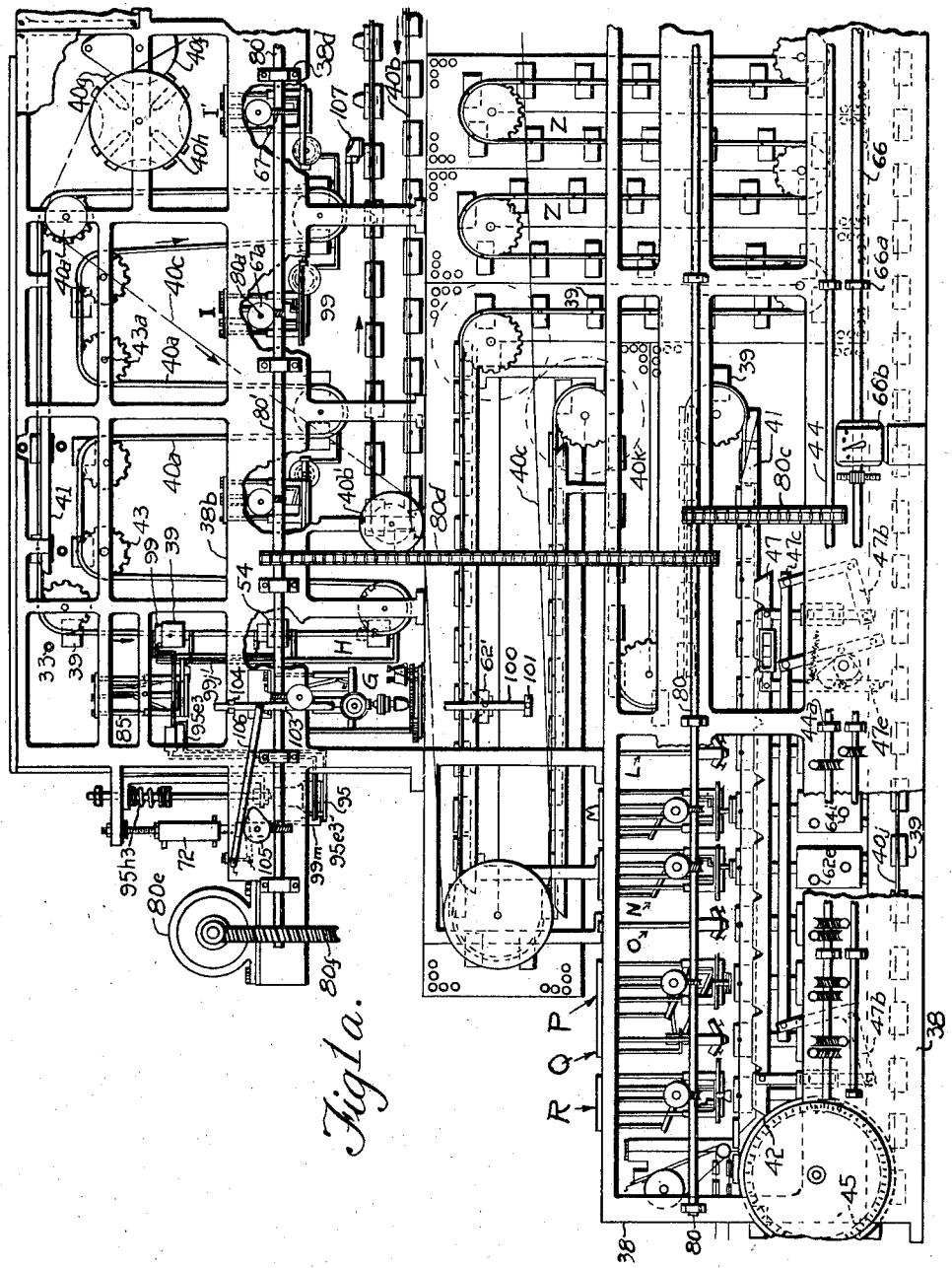
Inventor
WILLIAM J. MILLER
George J. Croninger
Attorney Nov. 2, 1948.  W. J. MILLER  2,452,858
METHOD OF AND APPARATUS FOR PRODUCING POTTERY WARE
Original Filed March 1, 1929  17 Sheets-Sheet 2

Inventor
William J. Miller
George J. Creninger
Attorney

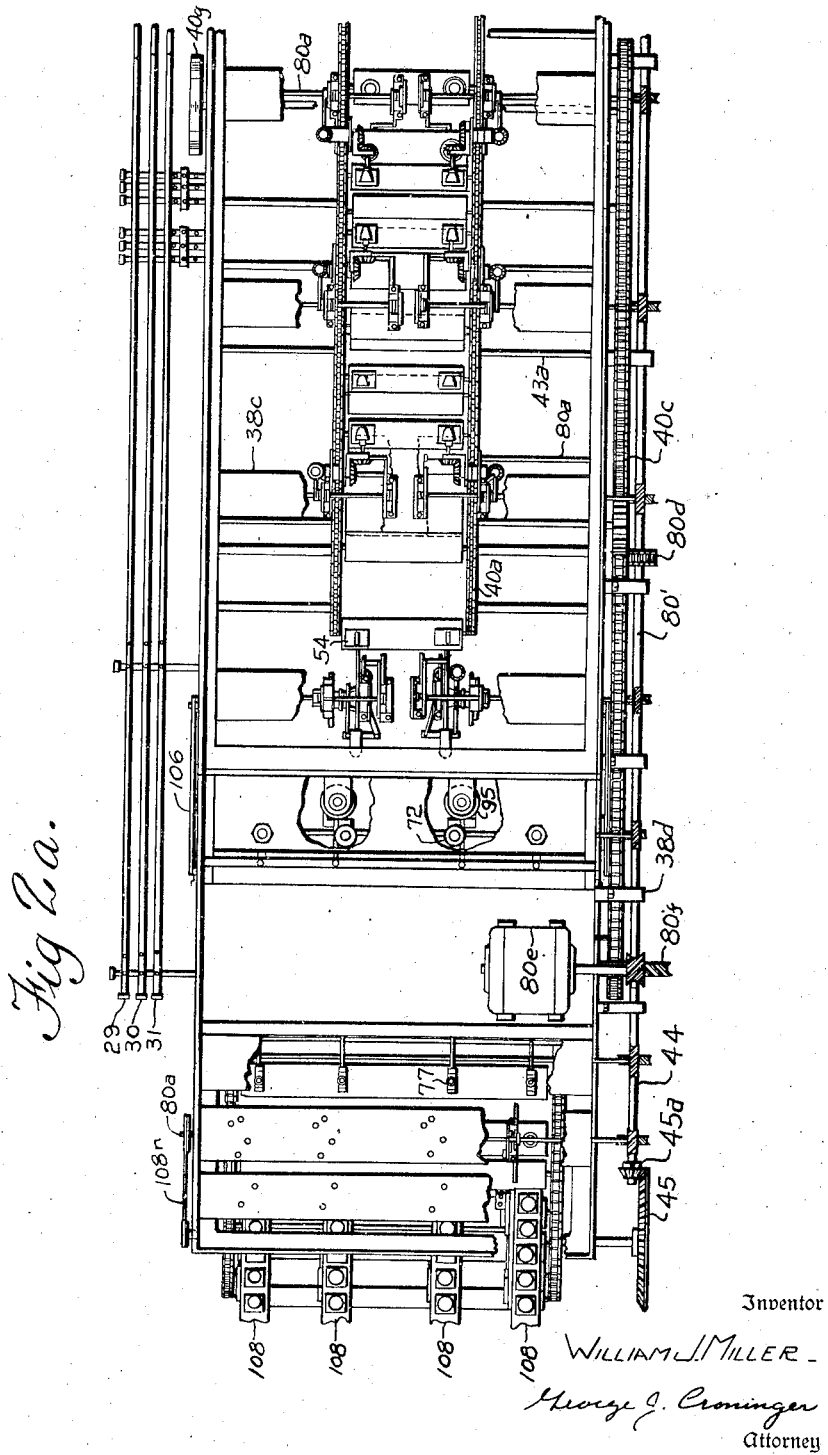

Nov. 2, 1948. W. J. MILLER 2,452,858
METHOD OF AND APPARATUS FOR PRODUCING POTTERY WARE
Original Filed March 1, 1929 17 Sheets-Sheet 4
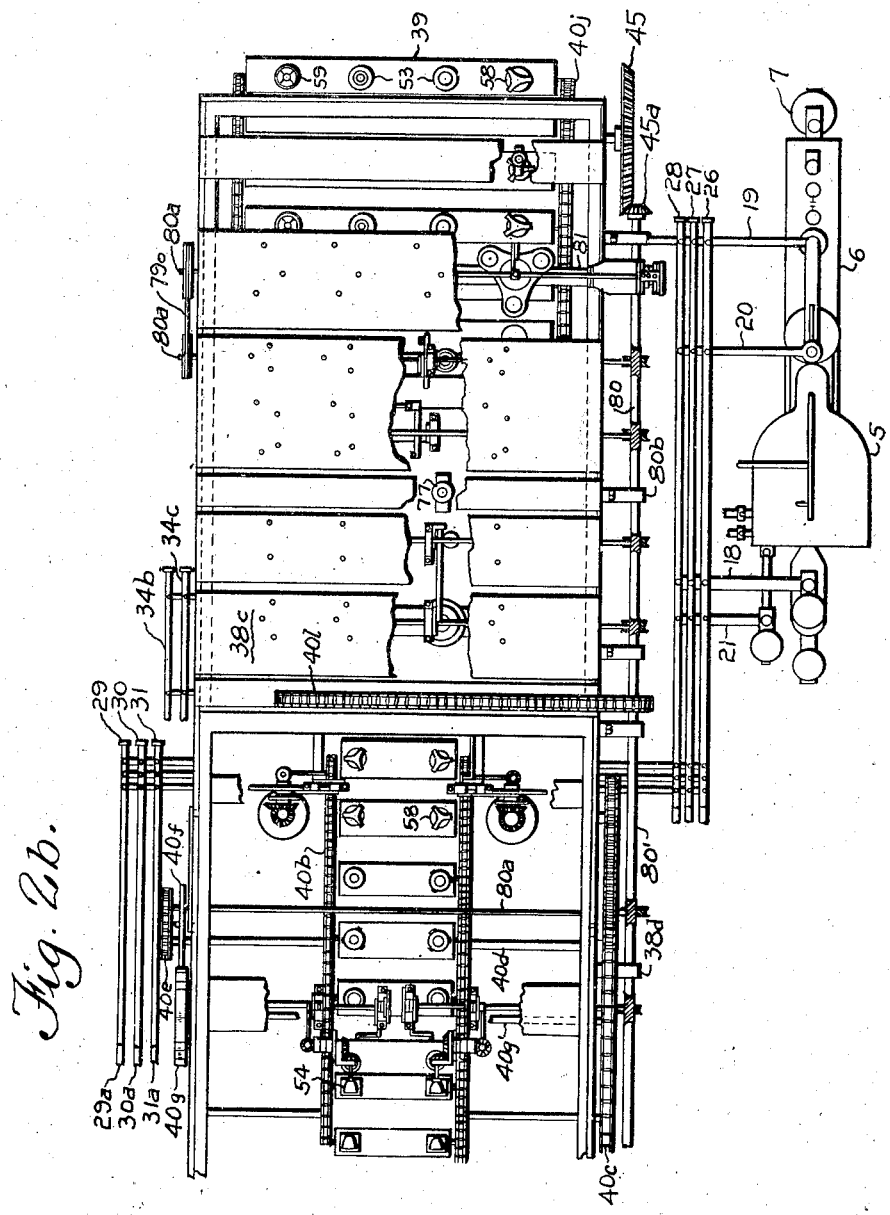
Inventor
WILLIAM J. MILLER
George J. Croninger
Attorney Nov. 2, 1948.   W. J. MILLER   2,452,858
METHOD OF AND APPARATUS FOR PRODUCING POTTERY WARE
Original Filed March 1, 1929   17 Sheets-Sheet 5

Inventor
WILLIAM J. MILLER
George J. Croninger
Attorney

Nov. 2, 1948. W. J. MILLER 2,452,858
METHOD OF AND APPARATUS FOR PRODUCING POTTERY WARE
Original Filed March 1, 1929 17 Sheets-Sheet 6

Fig. 5E   Fig. 14E¹

Inventor
WILLIAM J. MILLER
George J. Croninger
Attorney

Nov. 2, 1948. W. J. MILLER 2,452,858
METHOD OF AND APPARATUS FOR PRODUCING POTTERY WARE
Original Filed March 1, 1929 17 Sheets-Sheet 7
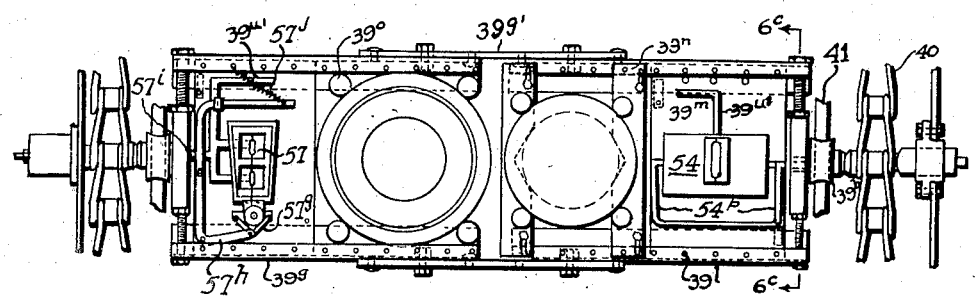
Fig. 6.
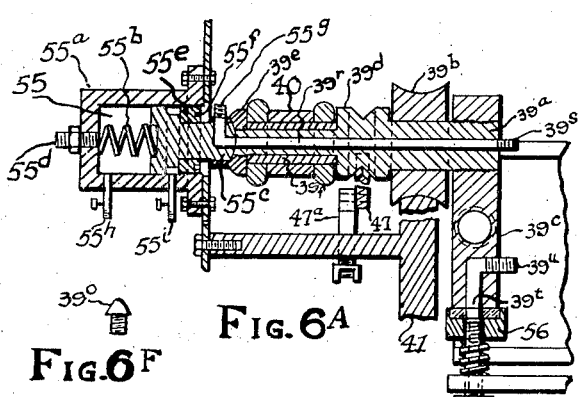
Fig. 6A
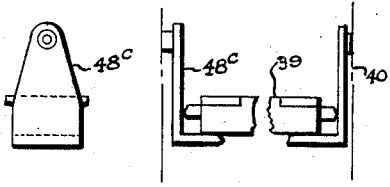
Fig. 6K Fig. 6L
Fig. 6F
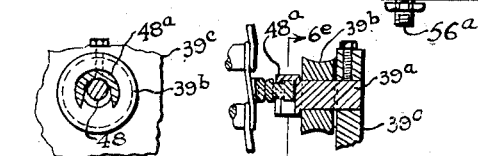
Fig. 6E Fig. 6D
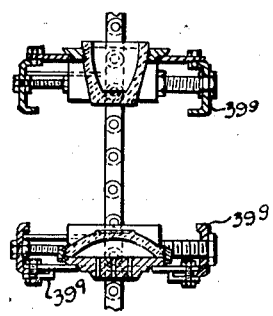
Fig. 6B
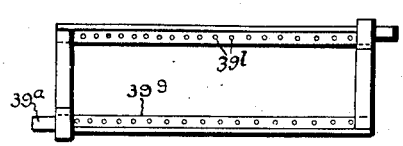
Fig. 6G Fig. 6H
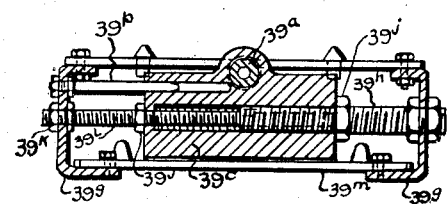
Fig. 6C
Fig. 6I
Inventor
WILLIAM J. MILLER
George J. Cronenger
Attorney Nov. 2, 1948.  W. J. MILLER  2,452,858
METHOD OF AND APPARATUS FOR PRODUCING POTTERY WARE
Original Filed March 1, 1929  17 Sheets-Sheet 8
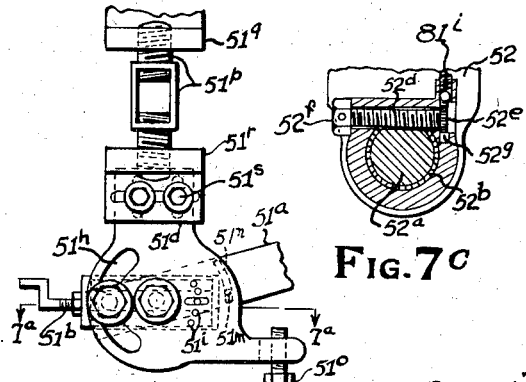
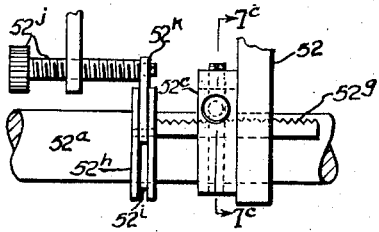
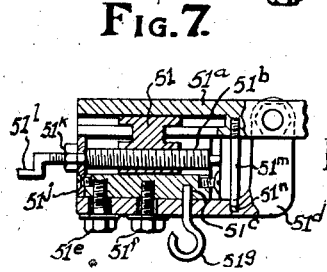
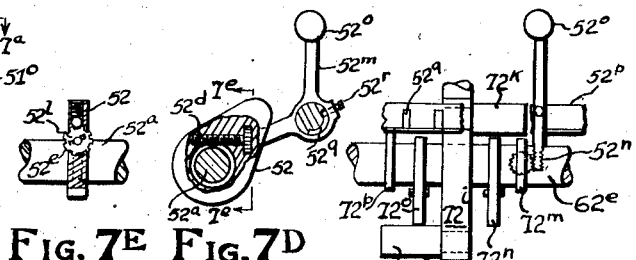
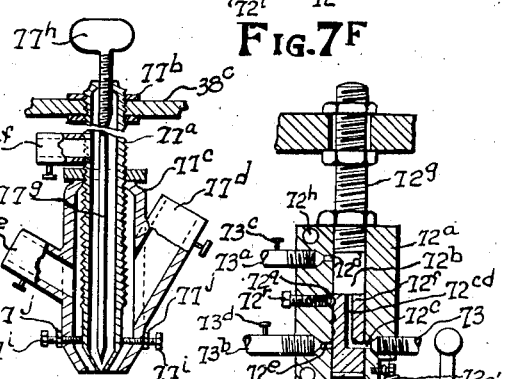
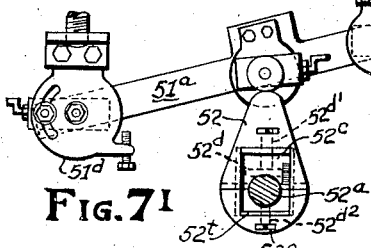
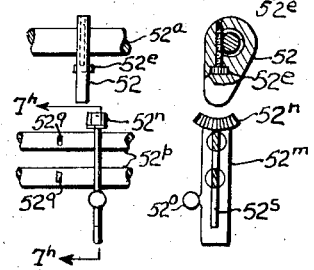
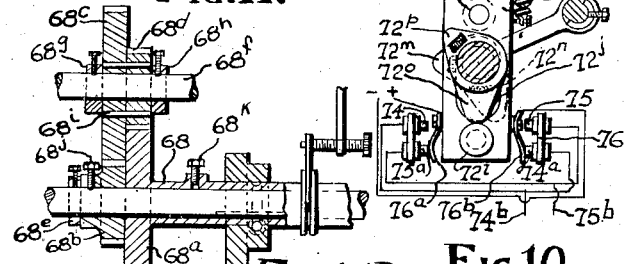
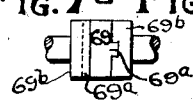
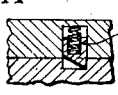
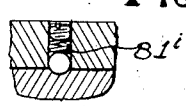
Inventor
William J. Miller
George J. Croninger
Attorney Nov. 2, 1948.   W. J. MILLER   2,452,858
METHOD OF AND APPARATUS FOR PRODUCING POTTERY WARE
Original Filed March 1, 1929   17 Sheets-Sheet 9
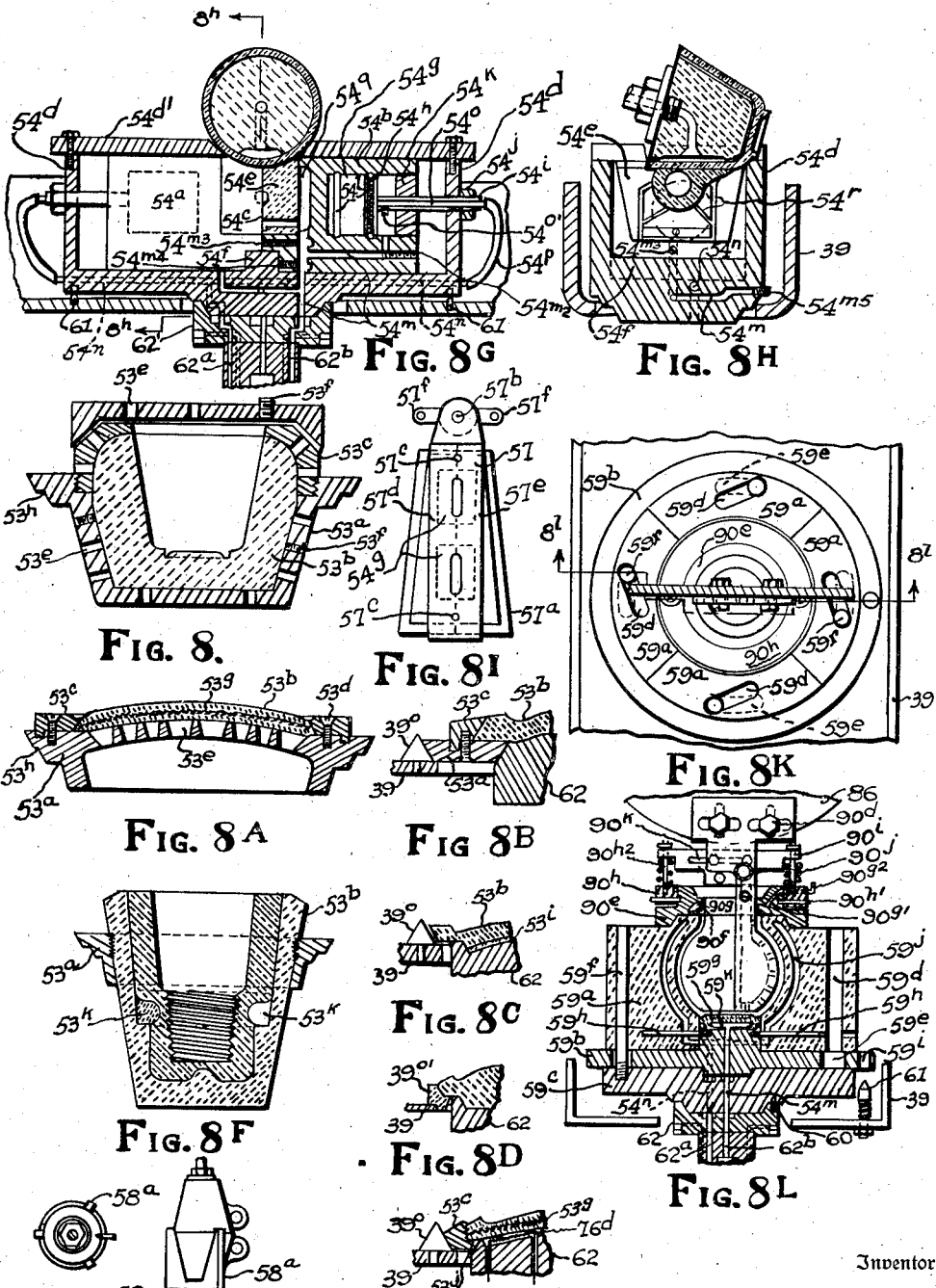

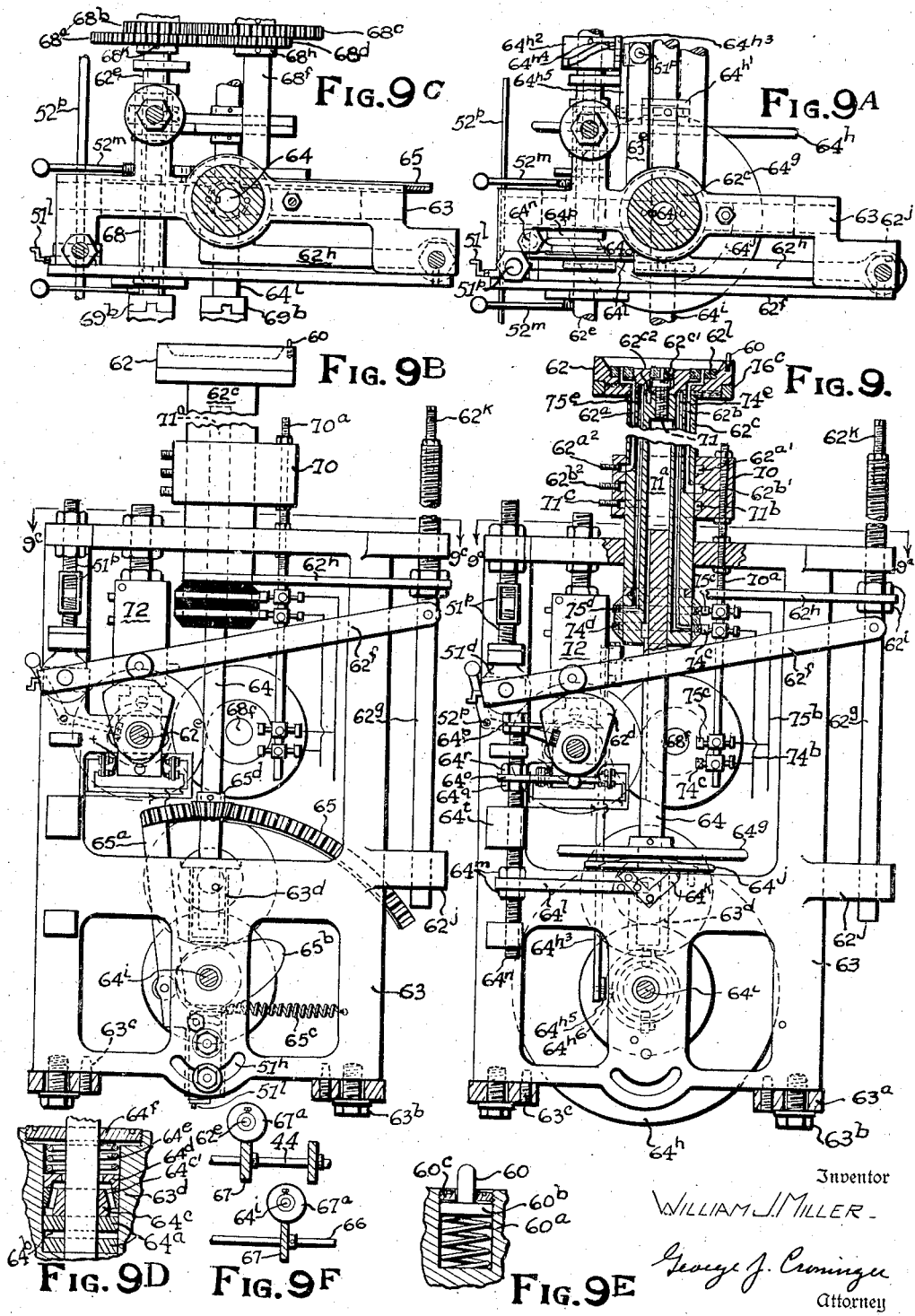

Nov. 2, 1948.   W. J. MILLER   2,452,858
METHOD OF AND APPARATUS FOR PRODUCING POTTERY WARE
Original Filed March 1, 1929   17 Sheets-Sheet 11
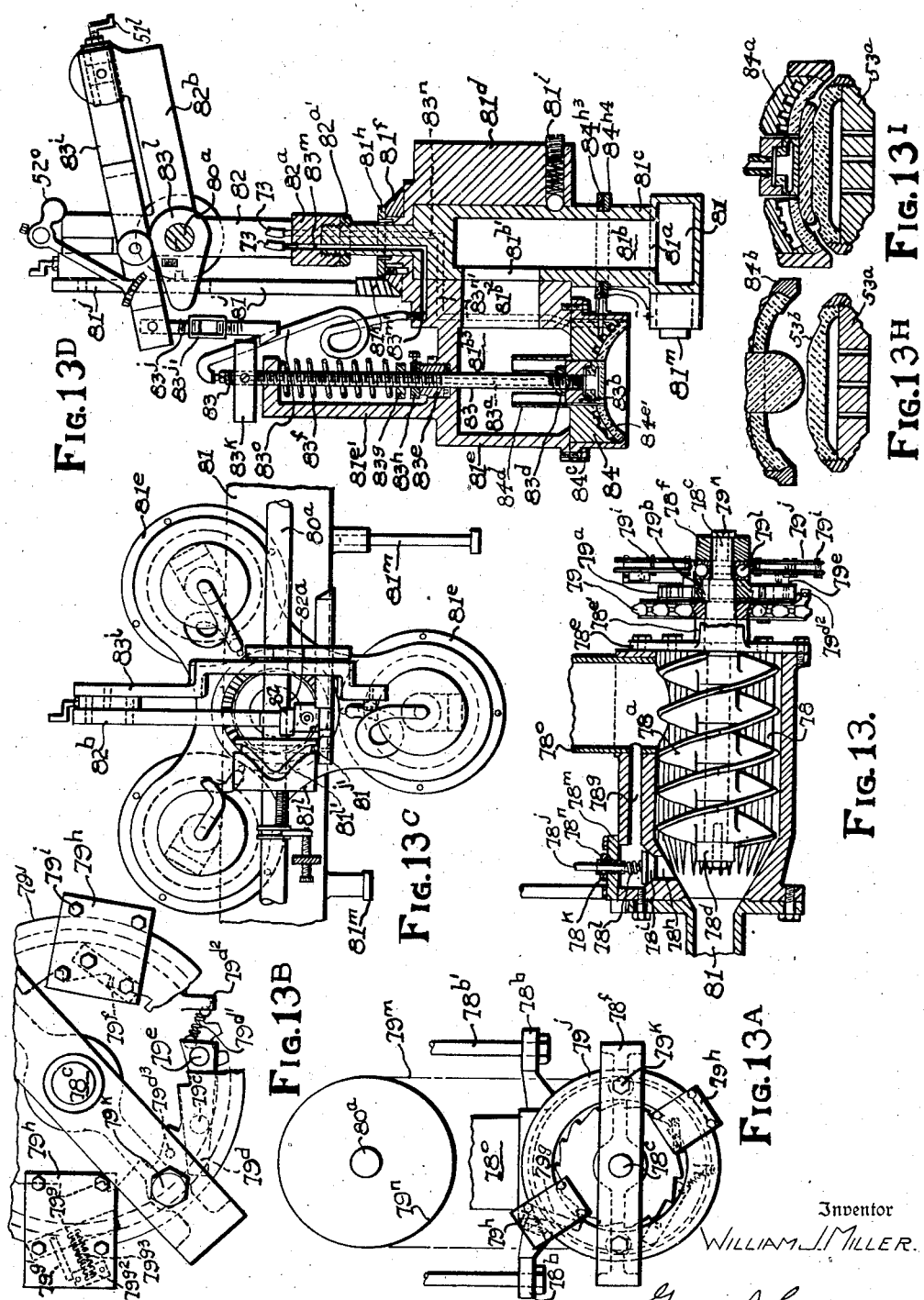

Nov. 2, 1948.   W. J. MILLER   2,452,858
METHOD OF AND APPARATUS FOR PRODUCING POTTERY WARE
Original Filed March 1, 1929   17 Sheets-Sheet 12
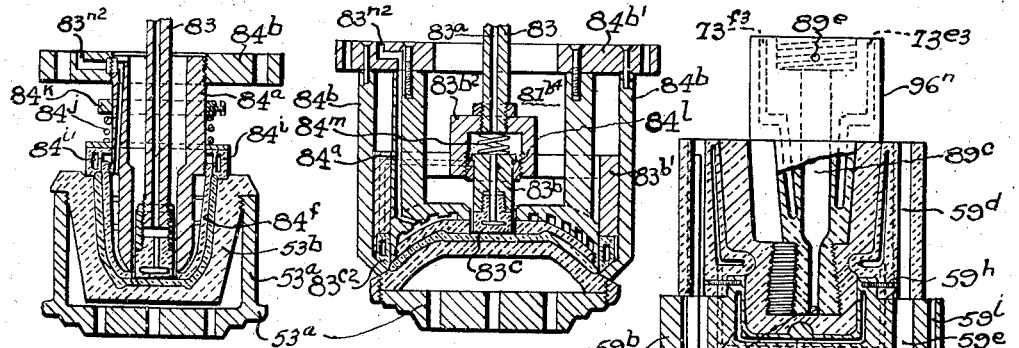
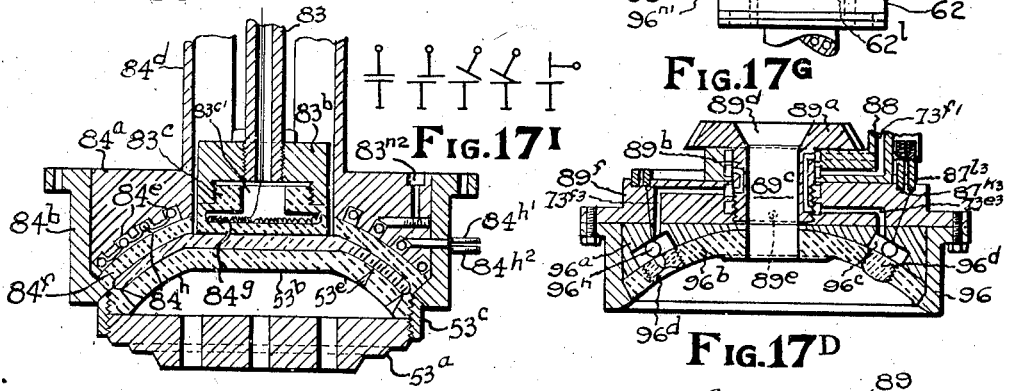
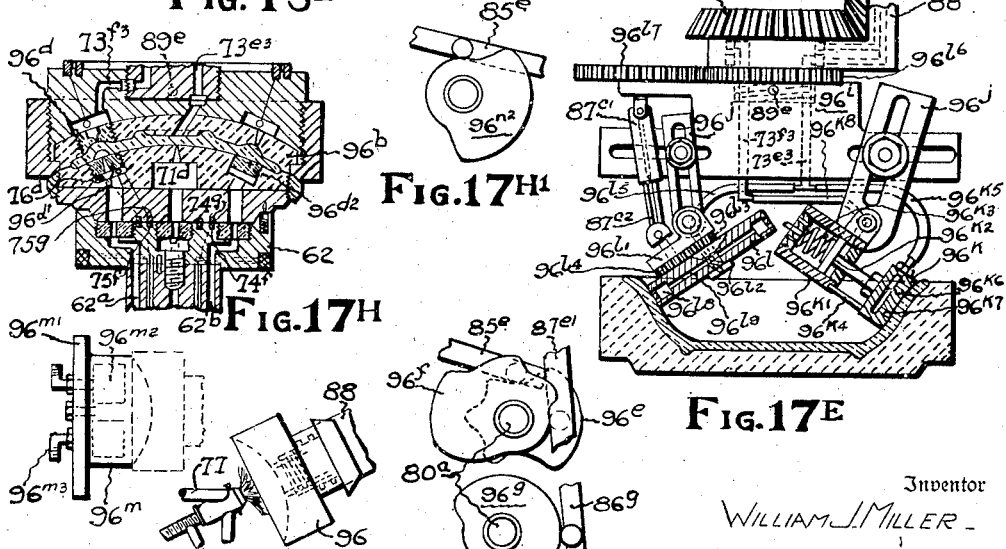
Inventor
WILLIAM J. MILLER
George J. Cruninger
Attorney

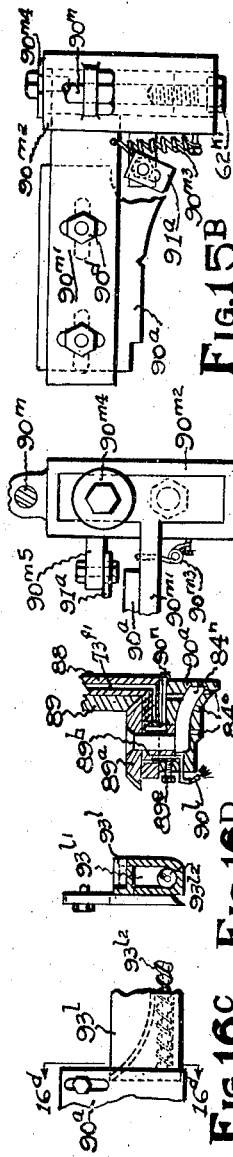
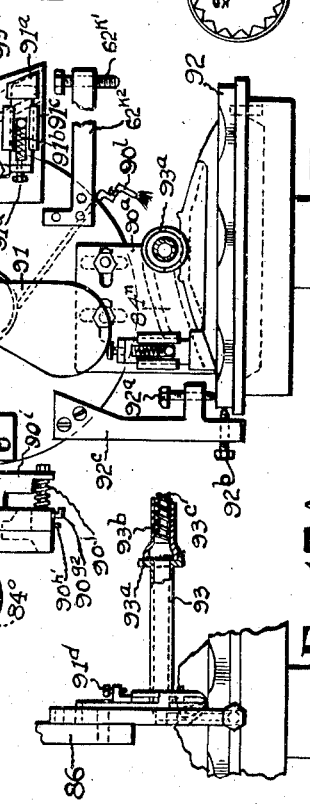

Nov. 2, 1948.   W. J. MILLER   2,452,858
METHOD OF AND APPARATUS FOR PRODUCING POTTERY WARE
Original Filed March 1, 1929   17 Sheets-Sheet 14
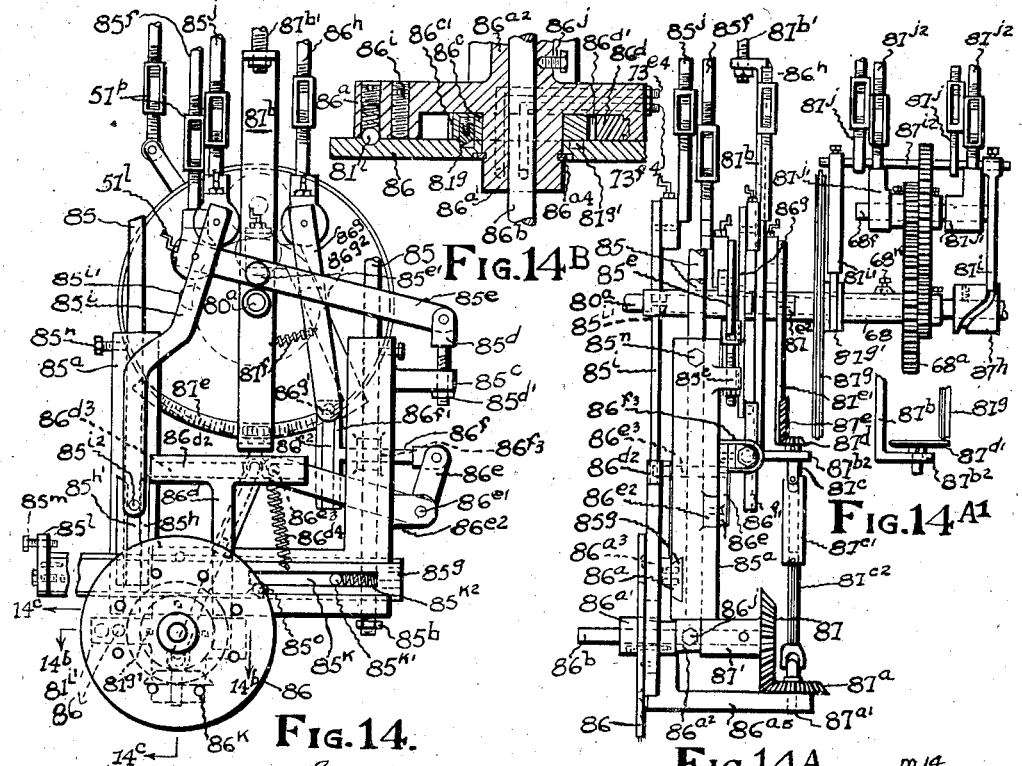
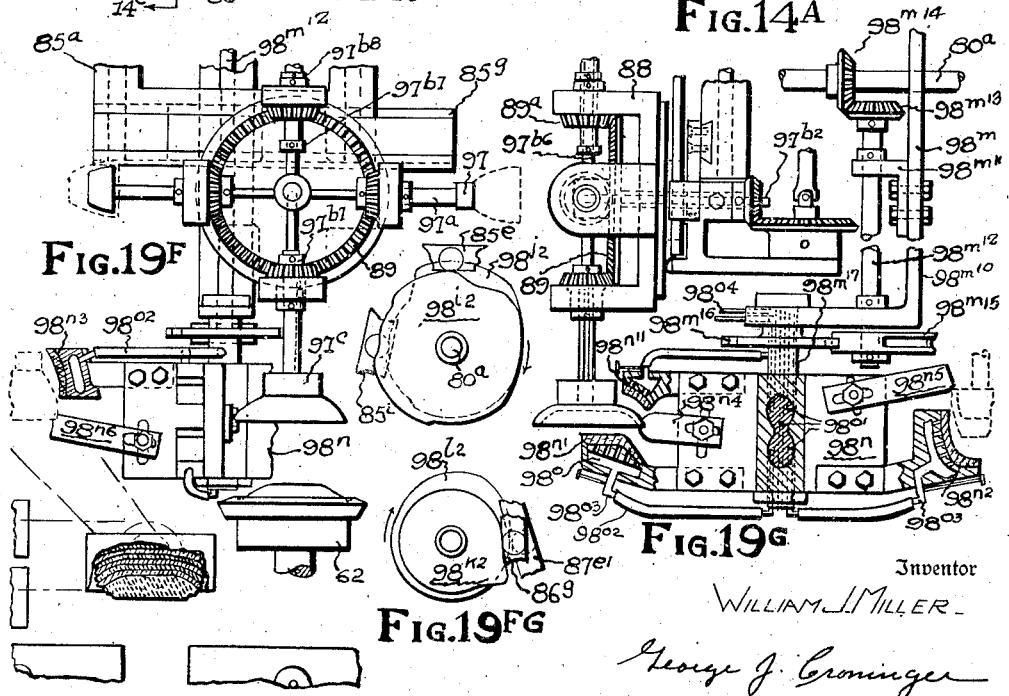

Nov. 2, 1948.　　　　　W. J. MILLER　　　　　2,452,858
METHOD OF AND APPARATUS FOR PRODUCING POTTERY WARE
Original Filed March 1, 1929　　　　　　　　　17 Sheets-Sheet 15
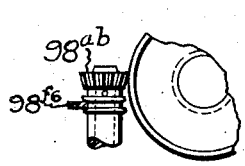
Fig.19J
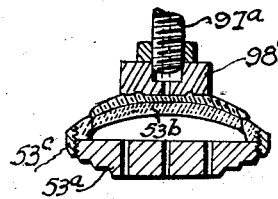
Fig.19K
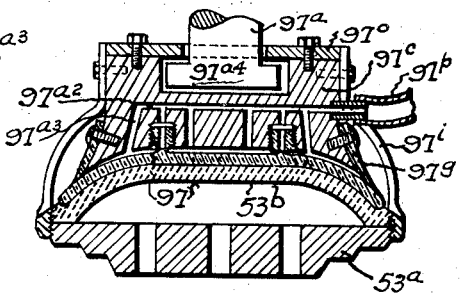
Fig.18D
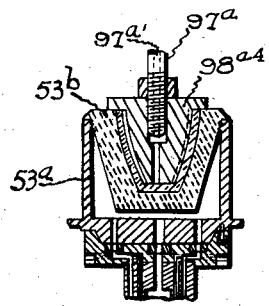
Fig.19L
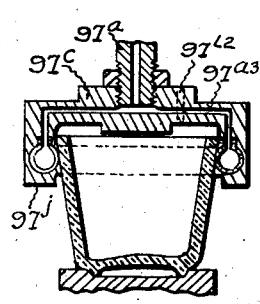
Fig.18B
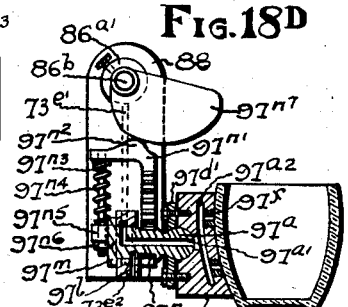
Fig.18C
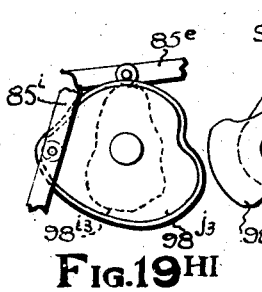
Fig.19HI
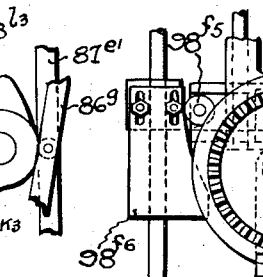
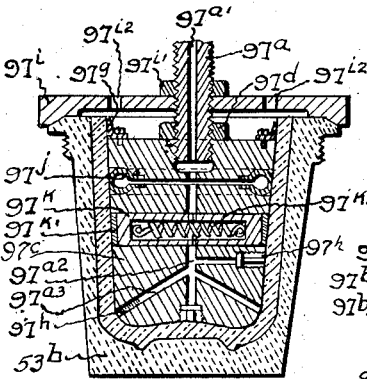
Fig.18A
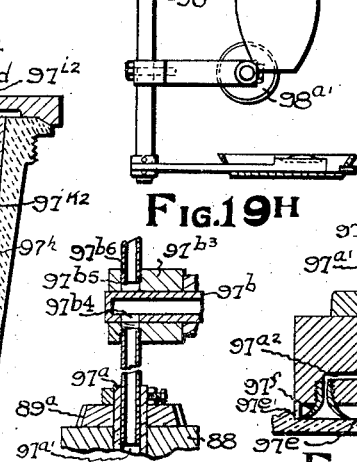
Fig.19H　　Fig.19I
Fig.18E
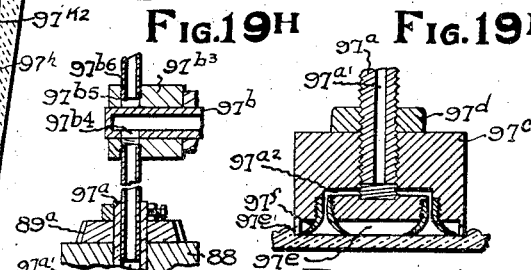
Fig.18.
Inventor
WILLIAM J. MILLER.
George J. Croninger
Attorney Nov. 2, 1948.  W. J. MILLER  2,452,858
METHOD OF AND APPARATUS FOR PRODUCING POTTERY WARE
Original Filed March 1, 1929  17 Sheets-Sheet 16

Inventor
WILLIAM J. MILLER
George J. Croninger
Attorney

Nov. 2, 1948.  W. J. MILLER  2,452,858
METHOD OF AND APPARATUS FOR PRODUCING POTTERY WARE
Original Filed March 1, 1929  17 Sheets-Sheet 17
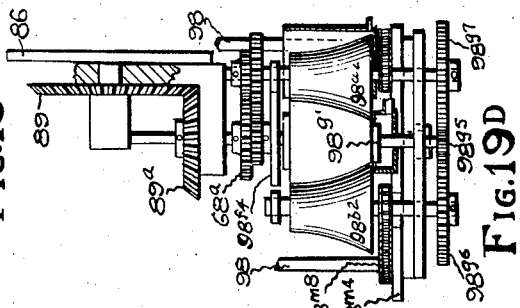
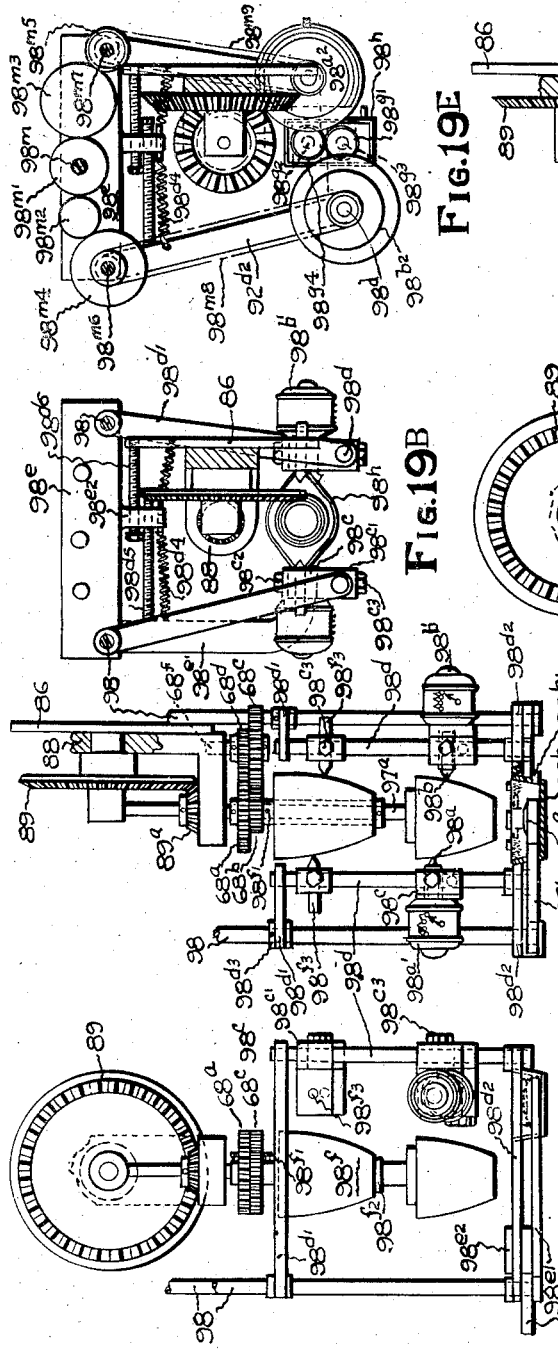
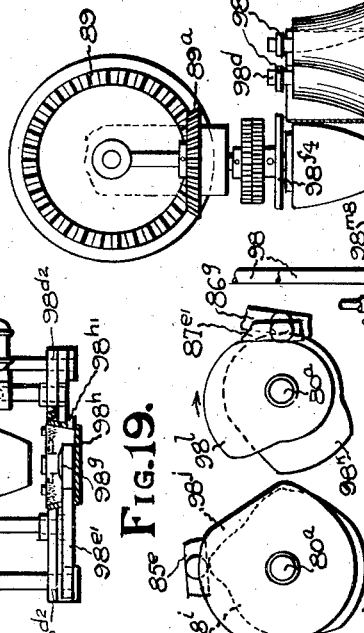
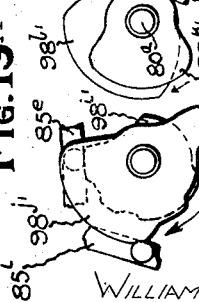
Inventor
WILLIAM J. MILLER
George J. Groninger
Attorney Patented Nov. 2, 1948

2,452,858

UNITED STATES PATENT OFFICE 2,452,858

METHOD OF AND APPARATUS FOR PRODUCING POTTERY WARE

William J. Miller, Swissvale, Pa., assignor to Miller Pottery Engineering Company, Swissvale, Pa., a corporation of Pennsylvania Original application March 1, 1929, Serial No. 343,693. Divided and this application March 29, 1935, Serial No. 13,683

98 Claims. (Cl. 25—22)

This invention relates to a method of and apparatus for producing pottery ware, and the principal object of the same is to provide a process of fabrication and apparatus for carrying out the process whereby this class of ware may be manufactured more expeditiously and economically than with the known machines now in use, the apparatus possessing numerous advantageous features of construction and operation inaugurated with a view toward improving the grade of ware and at the same time facilitating volume production with a minimum amount of manual attention.

This application is a division of my copending application for United States Letters Patent, Serial No. 343,693 filed March 1, 1929, Patent 2,046,525.

In practicing the method, the molds in which the ware is formed and fabricated are disposed on open-bottom trays and the latter mounted in series in an endless flexible, preferably continuously-driven, conveyor which progresses the molds adjacent the various fabricating units and through a drier; and at such points where necessary, the trays are temporarily halted for a fabricating operation, the molds being accessible from above, below and through the sides of the trays, reciprocable and rotatable chucks serving to elevate the molds from the trays and rotate same in operative adjacency to such of the fabricating units as may involve this operation; or the chucks may serve to simply elevate or stabilize the molds during certain fabricating operations, the advancing ware and/or molds being treated and the moisture content thereof regulated in accordance with the successive fabricating operations.

The complete apparatus includes automatically-operated units or assemblies for producing ware of various shapes and designs, such for example as plates, cups, bowls, saucers and the like, means being provided for jiggering or shaping certain articles of ware which would otherwise have to be cast, thereby further eliminating manual labor and increasing production, and only such of these units need be placed in operation as may be required in manufacturing a particular line of ware, as where plates only are bing manufactured, which do not require handles, or plain ware, which need not be subjected to the decorating or embellishing operations. The drawings; however, include a machine in its entirely with a preferred arrangement of the various units in conjunction with a drier, and therein:

Fig. 2 is a plan view of the driers and apparatus as illustrated in Fig. 1, the top cover frame being broken away at various points to show the parts below;

Fig. 2A is a plan view of Fig. 1A, broken longitudinally and moved together to conserve space, the cup fabricating lines only being shown.

Figures 3, 4A, 4B:
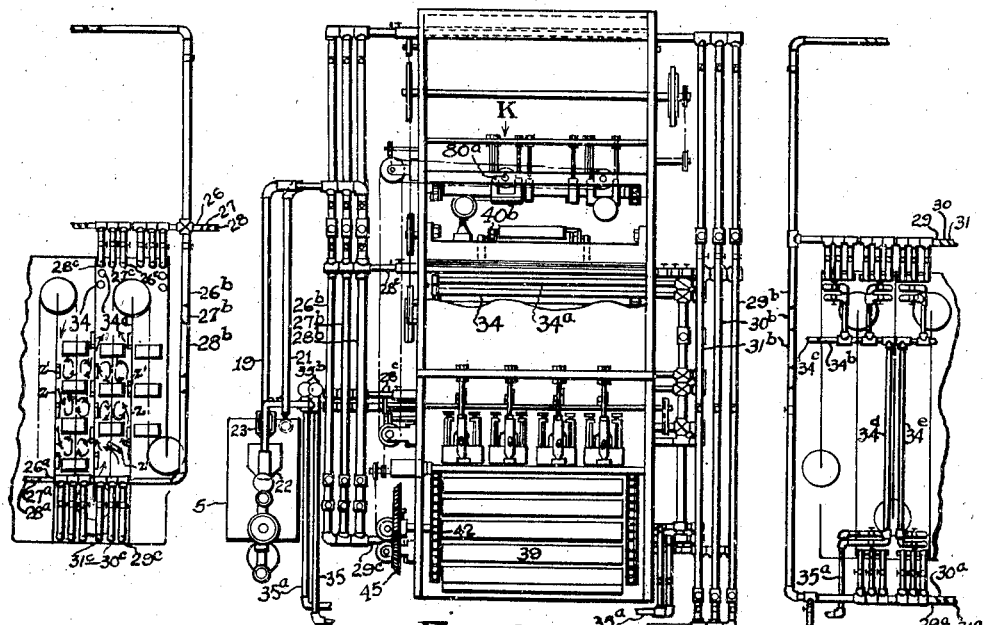
Fig. 3 is an end elevation of the apparatus as shown in Figs. 1 and 2.
Figure 4C:
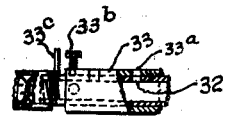
Figure 4D:
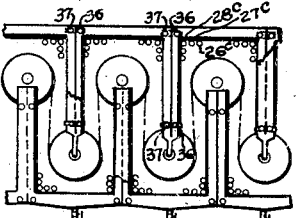
Figure 4E:
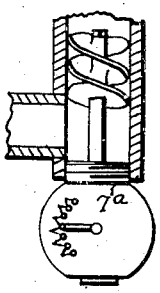
Figure 4:
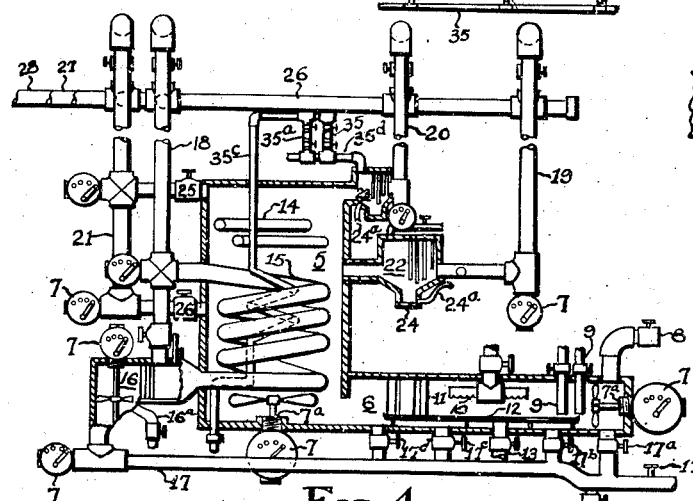

Fig. 4 is a view in sectional side elevation and to some extent diagrammatic of a preferred form of air-conditioning apparatus for the drier; Fig. 4A is a fragmentary view in side elevation of a portion of the drier looking toward the right as viewed in Fig. 3, the frame of the machine and side wall of the drier being removed to show the action of the air currents therein, and Fig. 4B is a similar view looking toward the left; Fig. 4C is a detail view of a valve and nozzle assembly; Fig. 4D is a miniature fragmentary view in sectional side elevation of a modified type of drier; Fig. 4E is a detail view of an air-control unit for installation in the drying system.

Figures 5A, 6J:
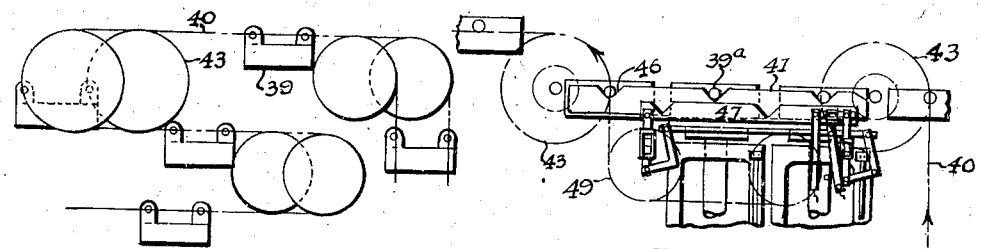
Figures 5, 5D:
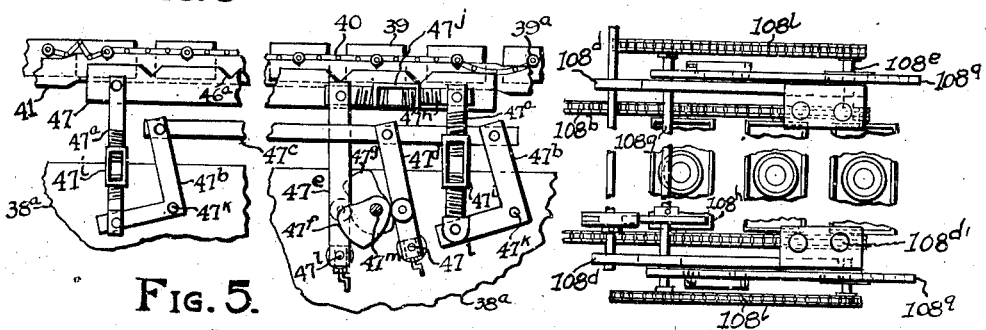
Figures 5B, 5C:
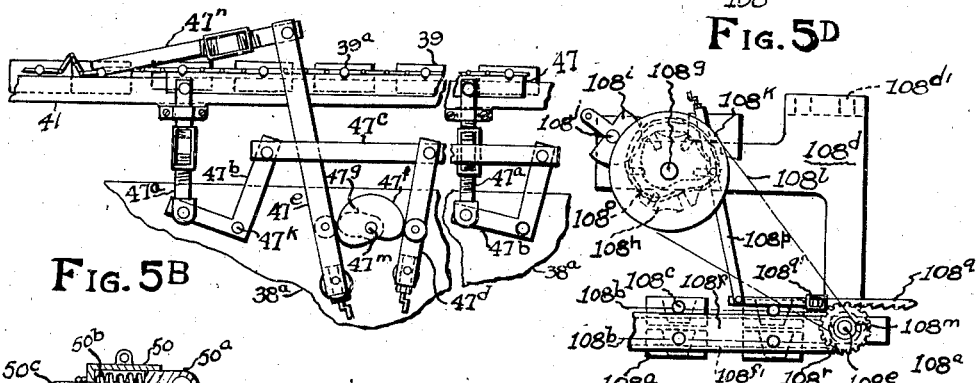

Figure 5 is an enlarged fragmentary view in side levation of a portion of the conveying mechanism; Figs. 5A and 5B are similar views of modifications in structure; Fig. 5C is a view also similar to Fig. 5 of a preferred form of driving mechanism for the ware conveying system; and Fig. 5D is a broken plan view of the same; Fig. 5E is a detail view in section of an adjusting device for the conveyor sprockets.

Figure 6 is an enlarged plan view of a preferred form of tray having a number of different types of molds disposed thereon, the tray being swingably mounted in the conveyor and shown in spotted position for a fabricating operation; Fig. 6A is an enlarged fragmentary, detail, longitudinal sectional elevation of a portion of the tray and registering devices, showing one method of establishing communication with the molds for a fabricating operation; Fig. 6B is a transverse vertical sectional view of a number of trays mounted in series in a conveyor, a deep and shallow mold also being shown in section, and Fig. 6C is a section taken on the line 6ᶜ—6ᶜ, Fig. 6; Fig. 6D is a detail sectional view of a modified form of tray and conveyor trunnion construction, and Fig. 6E is a view taken on the line 6ᵉ—6ᵉ, Fig. 6D; Fig. 6F is a detail view of a positioning stud for use with the trays; Figs. 6G to 6K, inclusive, are detail views of modifications in parts which may be used in the conveying system.

Figures 7 to 7I, inclusive, are detail views in section and elevation of various forms of lever and cam mounting structures.

Figure 8 is a transverse vertical section through a preferred form of mold for cups or deep ware, and Fig. 8A is a similar view of a mold for shallow ware; Figs. 8B, 8C, 8D, and 8E are fragmentary sectional views of various types of molds and cooperating parts; Fig. 8F is a view similar to Figs. 8 and 8A of a mold for undercut articles such as insulators, Fig. 8G is a transverse vertical sectional view, partly in elevation, of a partible mold particularly adapted for automatic application of handles and like appendages to the ware, and Fig. 8H is a view taken on the line 8ʰ—8ʰ, Fig. 8G; Fig. 8I is a plan view of another form of partible mold; Figs. 8J and 8J¹ are, respectively, side elevation and plan views of a boxing form; Fig. 8K is a plan view of a partible mold for undercut ware, and Fig. 8L is a sectional view taken on the line 8ˡ—8ˡ, Fig. 8K.

Figure 9 is a view in section and side elevation of a mold actuating or jigger assembly, and Fig. 9A is a horizontal sectional plan view taken on the line 9ᵃ—9ᵃ, Fig. 9; Fig. 9B is a view in side elevation of another form of mold-actuating or jigger assembly, and Fig. 9C is a horizontal sectional plan view taken on the line 9ᶜ—9ᶜ, Fig. 9B; Figs. 9D and 9E are detail views of parts of the mold-actuating assembly; Fig. 9F is a reduced fragmentary detail view of a drive unit; Fig. 9G is a detail view of a flexible coupling.

Figure 10 is a detail view in section and side elevation of a valve and actuating means therefore, employed for controlling the application of sub and super atmosphere and analogous fluid mediums.

Figure 11 is a transverse vertical sectional view of a mold and ware-treating nozzle member.

Figures 12 and 12A are detail views in section of detent or latch members used in the apparatus.

Figure 13 is a transverse vertical sectional view of the clay-progressing and compacting means forming part of the assembly for feeding charges of clay to the molds; Fig. 13A is an end view thereof, and Fig. 13B is an enlarged view of a portion of Fig. 13A; Fig. 13C is a plan view of the extruding means forming part of the feeder assembly, Fig. 13D is a view principally in transverse vertical section thereof, and Fig. 13E is an enlarged transverse vertical section of a portion of Fig. 13D; Figs. 13F and 13G are views similar to Fig. 13E of attachments for the feeders; Figs. 13H, 13I and 13J are views in section illustrating the feeding operation; Fig. 13K is a transverse vertical sectional view of a further form of attachment for the feeder.

Figure 14E:
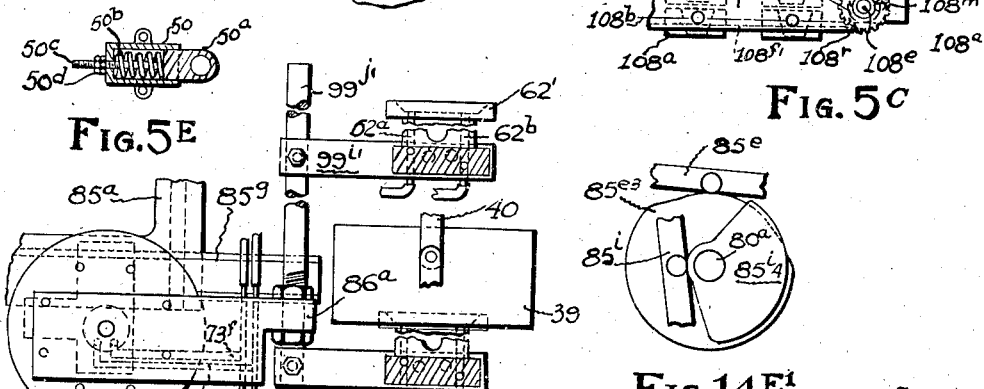
Figures 14C, 17, 17A, 17B, 17C:
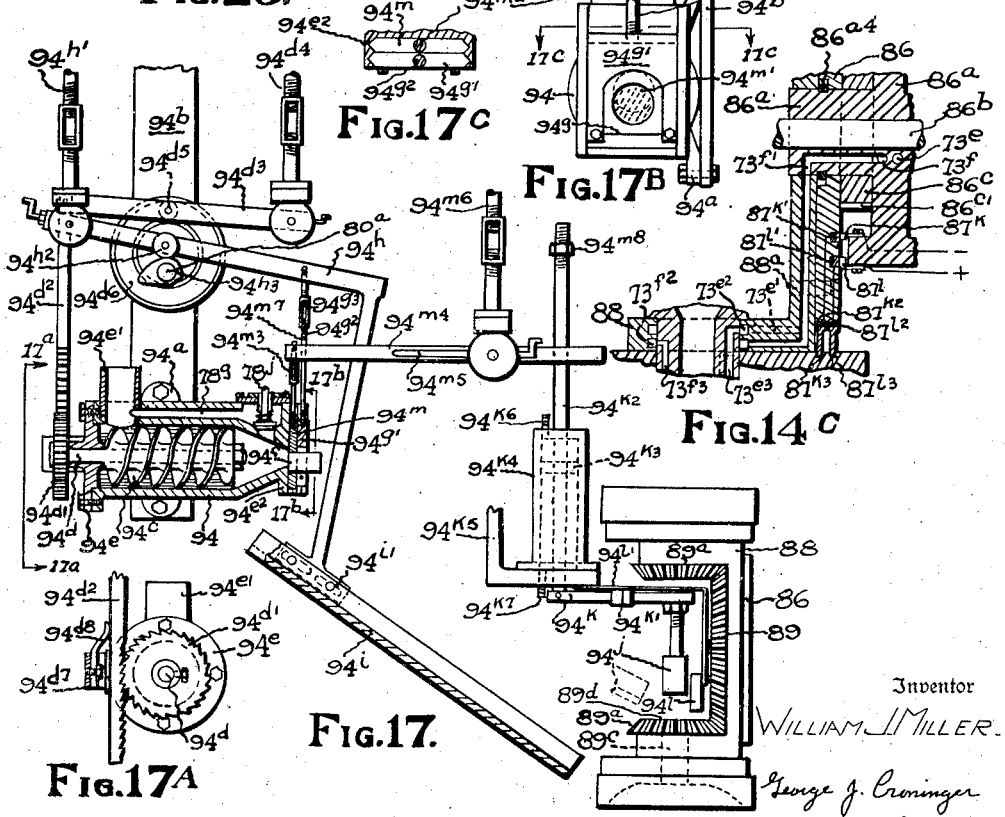

Figure 14 is a view in front elevation of a tool or attachment carriage assembly to which various fabricating tools and attachments are applied, Fig. 14A is a view thereof in side elevation, and Fig. 14A' is a detail fragmentary view of parts of the assembly; Fig. 14B is an enlarged sectional view taken on the line 14ᵇ—14ᵇ, Fig. 14, and Fig. 14C is a similar view taken on the line 14ᶜ—14ᶜ, Fig. 14 and also showing a section of a carriage turret; Fig. 14D is a detail view in sectional elevation of a change speed unit particularly adapted for the carriage and feeder assemblies; Fig. 14E is a fragmentary view in section and front elevation of a spotting chuck mounted on the carriage assembly, and Fig. 14E¹ is a detail view of the cams for Fig. 14D.

Figure 15 is a view in front elevation of the profile and trimmer assembly, and Fig. 15A is a broken side or edge elevation of a portion thereof as viewed from the left; Fig. 15B is a view similar to Fig. 15 of a modification in structure partly broken away to show the trimmer, and Fig. 15C is a plan view thereof, only a fragment of the profile being shown; Fig. 15D is a transverse vertical sectional view of a profile assembly constructed to permit feeding of material therethrough; Fig. 15E is a view in elevation of a set of cams which may be used for the carriage assembly when the profile and trimmer assembly of Fig. 15 is mounted thereon.

Figure 16 is a broken plan view of a preferred form of excess-material-removing assembly, and Fig. 16A is a transverse vertical section taken on the line 16ᵃ—16ᵃ, Fig. 16; Fig. 16B is a view similar to Fig. 16 of a modification in structure; Fig. 16C is a fragmentary elevation of a slight modification in the mounting of the clay—removing means, and Fig. 16D is a sectional view taken on the line 16ᵈ—16ᵈ, Fig. 16C.

Figures 20, 20A:
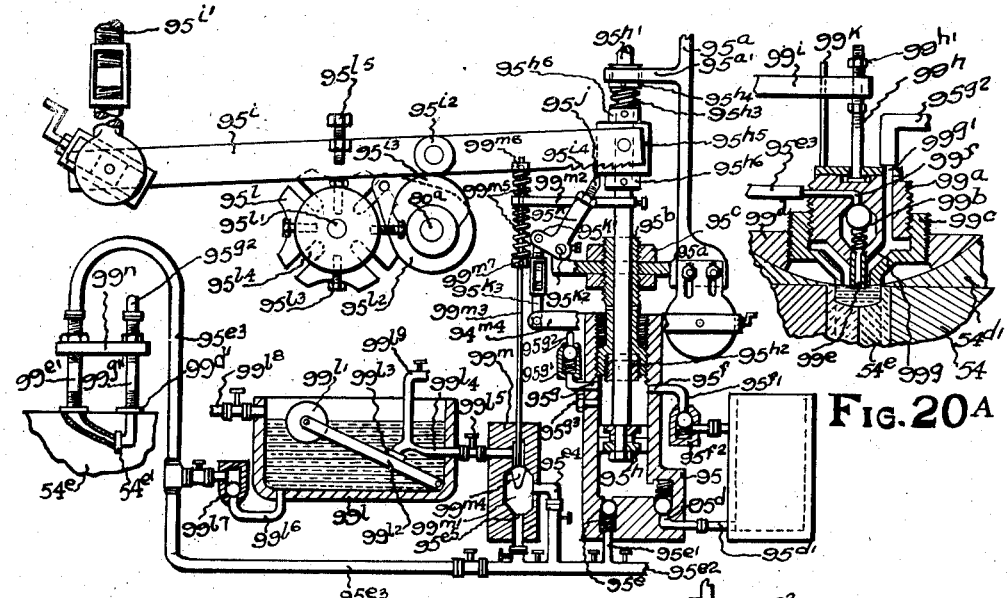

Figure 17 is a view in section and side elevation of an additional material or slip-applying and ware-decorating assembly, other parts of this assembly being included in Fig. 20; Fig. 17A is an end view of part of the apparatus shown in Fig. 17, as indicated by the line 17ᵃ—17ᵃ, Fig. 17; Fig. 17B is an enlarged end view taken on the line 17ᵇ—17ᵇ, Fig. 17, and Fig. 17C is a sectional view taken on the line 17ᶜ—17ᶜ, Fig. 17B; Figs. 17D, 17E and 17F are views in transverse vertical section and elevation of decorating attachments for use with the ware-decorating assembly, and Fig. 17DE is a detail view of the cams for use with the carriage assembly when the attachments shown by Figs. 17D and 17E are mounted thereon; Fig. 17G is a transverse vertical sectional view of an undercutting attachment and mold adapted therefore; Fig. 17H is a view similar to Fig. 17G of a ware-reshaping attachment, and Fig. 17H¹ shows a cam for the carriage assembly when said attachment is mounted thereon; Fig. 17I is a diagrammatic illustration to clarify the operation of the decorating assembly.

Figures 18 to 18D, inclusive, are transverse vertical sectional views of grip chucks for use in transferring ware and various other fabricating operations, and Fig. 18E is a fragmentary sectional view of an attachment used for conducting air or analogous fluid mediums to said chucks.

Figure 19 is a view in front elevation of a ware turning and finishing assembly, Figs. 19A and 19B are, respectively, views in side elevation and top plan of the same, and Fig. 19AB is a view in elevation of the cams for the carriage when the assembly shown by Figs. 19, 19A and 19B is mounted thereon; Fig. 19C is a side elevation of another form of ware turning and finishing assembly, Fig. 19D and 19E are, respectively, views in front elevation and top plan of the same, and Fig. 19CE is a view in elevation of the cams for the carriage when the assembly shown by Figs. 19C, 19D and 19E is mounted thereon; Fig. 19F is a front elevation of a ware swabbing and edge-finishing assembly, Fig. 19G is a side elevation thereof partly in section, and Fig. 19FG is a view in elevation of the cams for the carriage when the assembly shown by Figs 19F and 19G is mounted thereon; Fig. 19H is a front elevation of a further form of ware turning and finishing assembly, Fig. 19I is a side elevation thereof, and Fig. 19HI is a view in elevation of the cams for the carriage when the assembly shown by Figs. 19H and 19I is mounted thereon; Fig. 19J is a detail view of the tool used in the assembly shown by Figs. 19H and 19I; Figs 19K and 19L are views in transverse vertical section of tools used in turning and finishing the bottoms of shallow ware and the interior of deep ware.

Figure 20 is a view in sectional and side elevation of a charge-applying and measuring device and cooperating parts adapted for use with the assembly shown by Fig. 17 and also for charging the appendage or handle molds, and Fig. 20A is a transverse vertical sectional view of a nozzle member adapted for use with the charge-applying and measuring device when charging said molds.

Figure 1B:
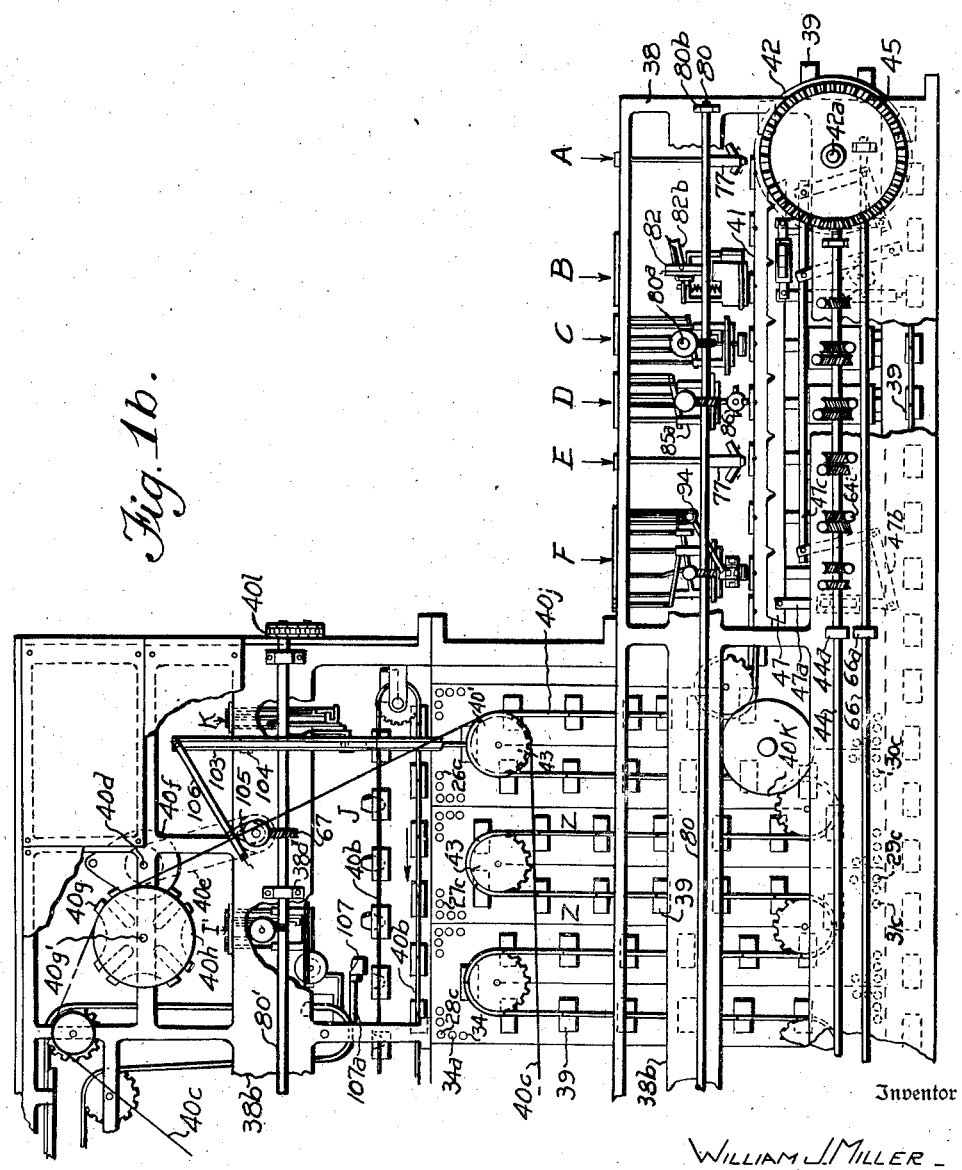
Figure 1 is a view in side elevation of preferred arrangement of the various units of the apparatus mounted in cooperative relation with a drier and supplemental treating chamber or drier disposed thereon, the side wall of the lower main drier being removed.
Fig. 1A is an enlarged view in side elevation of the upper portion of Fig. 1, the side wall of the supplemental treating chamber or drier being broken away in part to show the apparatus therein.

The various fabricating units which go to make up the complete machine should be mounted in such order along the fabricating line as will permit each operation to be performed in proper sequence in accordance with the article of ware being produced, and the frame of the apparatus is constructed to permit interchanging of the said units as desired. In Fig. 1 the units are arranged so that the molds are first cleaned at A, by nozzles as shown in Fig. 11, the clay charges fed to the molds at B, by the devices shown in Figs. 9B—13 to 13K, the charges prepared for the profile by being preformed or having additional material applied thereto at C, by the means shown in Figs. 9B—13D to 13K—14—15D—17—17D to 17F, this unit being used only in certain instances, the charges shaped or profiled to form same into ware at D, by means shown in Figs. 9 to 9F and 16 to 16D, the ware treated by the nozzles shown in Fig. 11 in preparation for decoration or incrustation work at E, the ware reshaped or decorated at F by the means shown in Figs. 9 to 9F, 17, 17D to 17I, after which the ware moves into the drier. If cups or analogous ware which require turning and finishing and/or handles are being produced in one or more lines, this ware is conveyed through the drier until in a leather-hard state and then transferred from the main drier to the supplemental drier or treating chamber and turned and finished while undergoing transfer at G by means shown in Figs. 19 to 19L, the handles applied at H, by means shown in Figs. 8G to 8J, 20 to 20A, the ware transferred to the boxing forms at I and I¹ as indicated in Fig. 1A by means shown in Figs. 8J—8J¹; 14 to 14B, 18 to 18E, the ware inspected at J, the boxed and inspected ware retransferred back to the main drier at K by means shown in Figs. 8J, 8J¹, 14 to 14D, 18 to 18E, and conveyed therethrough until dry, passing out of the main drier and treated or cleaned at L by the means shown in Figs. 11, 17F and finally the ware is transferred to the ware conveyors at R by the means shown in Figs. 14 to 14E, 18 to 18E which convey the ware to the kiln for firing; while in the case of plates and analogous ware which may not require turning and/or handles and like appendages, this ware completes the cycle through the main drier without interruption until dry, then passes out of the main drier and may be cleaned or otherwise treated at L, the bottoms finished at M by the means shown in Figs. 14 to 14B, 19K the edges and surfaces smoothed at N by the means shown in Figs. 14 to 14B, 19F, 19G, 19FG, 18 to 18E, and if the ware is to be decorated, it is again treated at O by the means shown in Figs. 11—11F to prepare it for the decorating unit located at P and shown in detail in Figs. 17D to 17F, 17H, finally treated or cleaned at Q by means shown in Figs. 11—11F after which it is also transferred to the ware conveyor at R and conveyed to the kiln for firing.

It will be understood that the foregoing sequential arrangement and operation of the various units is adopted merely for the purposes of illustration and may be varied at will, the apparatus being so constructed that the units are interchangeable, as previously specified, so that they may be readily arranged in proper sequence in accordance with the ware to be manufactured.

Drier

While any type of ceramic drier may be used in practicing the present method, it is preferred to adopt a system of air-circulation and conditioning apparatus similar to that which is more or less diagrammatically illustrated in Figs. 1A to 4C, inclusive, and whereby the temperature, humidity, volume, direction of flow and velocity of the air in the whole or any part of the drier may be regulated, the drier being arranged in zones and the air selectively circulated and recirculated in the zones until spent, then withdrawn and reconditioned and again circulated, heat and moisture being constantly extracted from the circulating air and used in reconditioning the spent air and incoming atmospheric air.

First referring to Fig. 4, the numeral 5 designates a main temperature-regulating chamber of an air conditioning apparatus, the lower portion thereof opening into a main humidity-regulating chamber 6. An air-circulating and pressure regulating unit 7 is shown mounted at one extremity of the chamber 6, this unit comprising a speed-regulable reversible motor having a fan or screw detachably secured on the armature shaft, the latter having bearing in an externally-threaded sleeve 7a. The unit is shown in detail in Fig. 4E and may be readily installed in any of the air conduits of the system or in the wall of the drier by simply threading the sleeve 7a into the conduit or wall. These units control the super and sub-atmospheric pressure of the circulating air as well as the direction of flow thereof in the various conduits and zones. By lowering the pressure of the air in a particular zone or zones, the drying action is increased for a given temperature, and by raising the pressure, the drying action is retarded. The fan in the end of the chamber 6 is disposed to draw air in through a valve-controlled conduit 8 leading to the atmosphere.

The chamber 6 may also be provided with individually-controlled heating elements or coils 9, spraying means 10 which may be fed with water from a suitable source and the water heated or cooled, and under automatic control, and baffles 11 against which the saturated air is directed, the excess spray not absorbed by the air falling onto a drain pan or through 12 and draining off through a valved pipe 13, which may conduct the spray water back to the source of supply for further use. The main chamber 5 also contains superheating coils 14, which may be used to bring the air to a higher temperature before leaving the main chamber 5, and a heat and moisture-extracting coil 15 for the introduction and circulation of spent air from the drying apparatus. The one extremity of the coil 15 opens into a supplemental humidity-control chamber 16, which may also be provided with baffles and spray means and a drain pipe similar to the main humidity-control chamber 6, the said chamber 16 opening into a conduit 17, the latter communicating with the main humidity chamber 6 through four separately-controlled conduits provided with valve 17a, 17b, 17c, and 17d. The conduit 17 is also provided with a drain 17e and a further valve 17f, and this conduit may extend to the atmosphere and/or to other conditioning apparatus in the event a multiple of units are in use; or the other parts of the same conditioning or drying apparatus, so that by opening the valve 17f part or all of the spent air from the drying chamber may be permitted to escape to the atmosphere or pass to other apparatus for use therein. Thus if the spent air is unsuited for reconditioning the incoming atmospheric air, it may be permitted to escape and the atmospheric air admitted through the conduit 8.

Spent air from the drying chamber is conveyed into the coil 15 by a conduit 18, hereinafter referred to more specifically, and three conduits 19, 20 and 21 are shown in the present instance for conveying conditioned air from the conditioning apparatus to the drier, the conduits 19 and 20 taking the air from auxiliary humidity-control chambers 22 and 23, which are provided with spray means, baffles and drain traps for excess moisture, the traps being indicated at 24 and are provided with outlet pipes 24a which are bent upwardly from their points of connection to the traps so that the water collecting therein will reach a certain level before draining, thus providing a water seal for preventing escape of air from the apparatus through said traps, and the conduit 21 taking air from the upper part of the main chamber 5 at 25 and from an intermediate point at 26, so that air of varying degrees of temperature and humidity may be taken from the chamber 5 and conducted to the drier. If the air in the chamber 5 should require humidification or dehumidification prior to being conducted to the drier, it may be taken from either or both of the auxiliary humidity-control chambers 22 and 23, while if air of a comparatively high temperature is required it may be taken off through the outlet 25, or if air of a lower temperature is required it may be taken off through the outlet 26; and this air may be commingled and selectively admitted to the dryer which is arranged in zones, and also selectively withdrawn from the drier as it becomes spent or unsuited for the ware in any zone or zones of the drier, and as this spent air circulates through the coil 15, the heat is extracted therefrom and utilized in heating incoming atmospheric air or other spent air. After circulating through the coil 15, and air may be permitted to escape by opening valve 17f or selectively admitted into the chamber 6 by opening valves 17a, 17b, 17c, and 17d, depending upon the amount of humidification treatment required.

As heretofore specified, the drier is constructed in zones which are shown as extending both vertically and laterally and indicated at Z, these zones being defined by partitions z, and the circulatory system is arranged so as to permit the air to be selectively circulated and recirculated through the various zones. Thus conditioned air from the conditioning apparatus may be admitted to any selected zone or zones in the drier and circulated therethrough until spent. (By spent air is meant air that may have become unsuitable for the ware passing through a particular zone) and then withdrawn from that zone or zones and circulated through another zone or zones until the air is unfit for use in any zone of the drier, after which it is returned to the conditioning apparatus, reconditioned and again circulated through the drier. With this end in view, the circulatory system for the drier comprises a series of manifolds, here shown as six in number, extending longitudinally on each side of the drier, three above and three below and designated 26, 27 and 28 and 26a, 27a and 28a on the left side, and 29, 30 and 31 and 29a, 30a and 31a on the right side, the upper and lower manifolds on the left side of the drier being connected at opposite extremities by pipes 26b, 27b, and 28b, and the upper and lower manifolds on the right by pipes 29b, 30b and 31b, each of the three upper and lower manifolds on both sides of the drier being provided with coupling unions which connect with adjustable air-exhaust and intake conduits, (which may also serve as radiating treating members), extending at right angles across the upper and lower part of each zone and designated 26c, 27c, and 28c and 29c, 30c and 31c, (see Figs. 1 and 4A), these conduits being provided with a line of perforations 32 and a telescoping sleeve 33 formed with a line of registerable openings 33a, see Fig. 4C, the sleeve being adjustably secured by a screw 33b, and the conduit also adjustably mounted by forming right and left-hand threads in the coupling unions, a pin 33c being secured in the said conduit in line with the perforations 32, the screw 33b and pin 33c being exterior of the drier. By adjusting the sleeve on the conduit, the size of the exhaust and intake openings may be varied and by turning the conduit the direction of the air may be varied in each zone, the pin 33c and screw 33b being visible to indicate the direction and extent of adjustment. If the conduits are to be used as radiating elements in a manner similar to a coil, the perforations may be eliminated or closed by proper adjustment of sleeve 33.

Each manifold is provided with separate valves at each zone for controlling the admission of air to each zone conduit and the air taken therefrom, and each manifold is also provided with valves along its length between each zone, and by proper manipulation of these valves, the circulatory path of the air may be varied at will, as for example, the path of the air may be directed around a certain zone or zones and admitted into another zone or zones, or taken off from the various zones along the drier and applied to any selected zone, the object in view being selective control of the drying medium or atmosphere.

Each of the conduits 18, 19, 20 and 21 of the conditioning apparatus connect with the three manifolds 26, 27 and 28 through valved coupling unions, thus providing for selective admission of conditioned air to the said manifolds and withdrawal of non-conditioned or spent air therefrom.

The drier is also provided with a separate temperature-regulating system adapted for live steam, hot or cold air or electricity and like heating and cooling mediums. Each zone is provided with independently controlled temperature-regulating elements shown in the form of pipes 34 and 34a having their ends normally closed but provided with a valved connection in the event it should be desired to establish circulation in through one pipe and out through the other. These pipes 34 and 34a have separate manifolds 34b and 34c, which may be fed from the same or independent sources of supply, so that different temperature-regulating mediums may be introduced into each pipe 34 and 34a or, in the case of steam, varying pressures into each of said pipes, separate valves being provided for each pipe leading into the respective zones and the manifolds also having valved connections, so that if desired the temperature medium may be admitted into one manifold and circulated and returned through the other, in which event the valved connections for the ends of the pipes 34 and 34a should be opened. As shown, there are two pipes 34 and 34a in the upper and lower portion of each zone, or at opposite extremities of the zone, the lower pipes being fed from the manifolds 34b and 34c by pipes 34d and 34e (see Fig. 4B).

The circulation and temperature-regulating systems are provided with a drainage system for the water of condensation whereby the heat from the latter may be extracted and utilized in the conditioning apparatus or the water returned direct to the humidity-control system. The circulation and temperature systems should be drained at their lowest points, as will be obvious, and in the present instance the circulation system is drained from the pipes 29b, 30b and 31b on the right of the drier by a common drain pipe 35 connected to said pipes by separate valved coupling unions, and the temperature-regulating system is drained in a like manner from any two of the lower pipes 34 and 34a by a common drain pipe 35a, the water being drawn up to the conditioning apparatus by small suction pumps 35b, see left-hand portion of Fig. 3. This water may then be directed into a pipe 35c terminating in a coil inside of the coil 15, see Fig. 4, to have the heat extracted therefrom for use in the conditioning apparatus and then drained off, or the water may be directed into a pipe 35d and utilized in the humidity-control system, the pipe 35d being shown as the supply pipe for the spray-water used in the auxiliary humidity control chamber 23.

It will be understood that suitable automatic controls, such as thermostats, hygrostats and anemometers may be installed at various points in the circulatory and temperature systems to replace or cooperate with manually operated valves wherever possible and provide for automatic regulation of the temperature, humidity and velocity and direction of flow of the air.

In Fig. 4A the arrows indicate the action of the air currents in the drier. The partitions z which define the zones cause the air in general to travel in a confined undulating path and strike the molds and ware in alternate zones in opposite directions, and as the air encounters the relatively slowly moving trays, it swirls around and in between the trays and forms eddy currents or becomes turbulent. To assist in producing turbulency of the air in the zones, angularly disposed baffles or vanes $z^1$ are attached to the partitions and wall of the drier, these baffles deflecting the air in towards the trays and also directing it spirally around the trays and preventing stratification adjacent the partition and drier walls. Thus the air is maintained in a turbulent condition and constantly being commingled, the air striking the ware in an ever changing direction, thereby obtaining maximum efficiency from the circulating air and uniform drying of the ware.

The air-circulating and pressure-regulating units 7 may be installed in the air inlet and withdrawal or exhaust conduits 26c to 31c, inclusive, (note fragment of fan in Fig. 4C), so that the air may be applied to or withdrawn from any selected zone or zones regardless of the difference in the degree of pressure between the zones and the manifolds 26, 26a, to 31, 31a, inclusive, and these units may also be installed in the latter conduits to propel the air therein.

By inclining the vanes outwardly toward the trays and positioning them alternately on opposite sides of the zones, the air may be guided in an undulating path across the advancing trays and molds.

Fig. 4D illustrates a modified form of drying system whereby the walls of the drier serve as a radiating means, said walls being spaced apart to provide a circulation chamber therebetween. Conduits 36 and 37, which may be similar to the regulable conduits 26c, 27c and 28c, lead from the circulating and temperature-control systems and admit the air and steam or other medium to and withdraw it from the chamber between the walls. This form of drier may also be provided with the drainage system heretofore described in conjunction with Figs. 3 and 4, it being noted that the bottom wall is sloped between the zone partitions to provide a drain for the water of condensation which is drained into the pipe 35.

*General descriptive matter*

The ware requiring appendages such as handles and the like is automatically transferred by means hereafter described from the main drier to a supplemental drier or treating chamber here shown as adjustably secured on the main drier and also included in the circulatory and temperature-control systems. For the purpose of illustration, the apparatus is assumed to be producing under-cut ware, plates and cups, and four conveyors are comprised in the conveying system, these three different types of ware bringing into operation all four conveyors and many of the fabricating units which might not be required in producing other lines or a single line of ware. The fabricating units are so mounted in conjunction with the drier that fabricating operations can be performed on the ware during various stages of the drying process.

*Main frame*

The skeleton of the main supporting frame is generally indicated at 38, (see Fig. 1), and has attached thereto or formed integral therewith side beams or plates 38a and 38b which serve to support the various cross shafts as well as the main drive shafts of the apparatus, these side beams being broken away at intervals to show the units in the interior of the machine. The frame is spanned across the top by removably-secured suspension plates 38c which are drilled at various points to permit parts of the apparatus to be secured thereto and suspended therefrom, these plates also being broken away in part to disclose the interior mechanism below (see Fig. 2).

The molds in which the ware is fabricated are disposed on open-bottom trays or carriers 39 which are swingably mounted in series in endless flexible chain conveyors, the conveyor in the main drier being generally indicated at 40, said trays being provided with hollow or longitudinally-bored projecting trunnions 39a, (see Fig. 6A), having rollers 39b rotatably mounted thereon, these rollers having concave peripheries which assist in centering the trays laterally while supported on tracks 41, these tracks being adjustably secured to the frame 38 and serve to support the trays moving in on the right and out on the left of the apparatus, (see Fig. 1), and are also provided at such points in the main and supplemental drier where a support is desired for the trays particularly when the latter move in a horizontal plane for any relatively great distance. The tray trunnions 39a are constructed to cooperate with other units during the various fabricating operations and their preferred construction is clearly shown in Fig. 6A, said trunnions being removably threaded in the end members 39c of the tray and are formed with an enlarged annular grooved portion 39d which serves to prevent lateral displacement of the rollers 39b and also cooperate with gripping and spotting devices hereinafter described, and the end of the trunnion also has threaded thereon a spotting device 39e, the function of which will later become apparent. A loose fitting bushing 39f is preferably inserted over the end of the trunnion to provide a bearing for the hollow chain link forming part of the conveyor chain and permit the tray to swing freely without binding.

The tray frame is preferably of adjustable skeleton construction and comprises side members 39g which are connected for longitudinal adjustment by plates $39g^1$ and at their opposite extremities are adjustably connected to the end members 39c by right and left-hand threaded telescoping rods 39h and 39i, lock nuts 39j and securing nuts 39k, (see Fig. 6C), the side members being of channel construction and formed with a series of mold plate securing holes 39l, (see Fig. 6), in the flanges thereof, to provide for adjustably mounting mold-supporting plates 39m and/or cross-supports 39n or studs 39o, the latter being shown in detail in Fig. 6F, any one or all of which may be used. The cross supports 39n may be notched to receive the mold, an advantage of this construction being that any size of mold may be accommodated by simply spacing the supports relatively to one another, while the plates 39m have a fixed recess which requires annular bushings or rings or analogous devices to provide for varying sizes of molds. The plates 39m are shown as supporting the handle or appendage molds, to be described. The studs 39o are tapered and assist in centering the molds in their seats when lowered onto the tray. These studs may be inserted in the holes 39l of the side channel members and serve alone as a centering and positioning means for the molds, or said studs may be used in conjunction with the cross supports, a plurality of holes being provided therefore, and in which latter event the notches may be omitted.

To prevent the end members 39c from swinging out of position when the lock nuts 39j are loosened for adjusting the sides 39g of the tray toward and from one another, said end members may be bored and a pin 39p inserted through and secured to one of the side members and project into the end member 39c (Fig. 6C).

Fig. 6B, note the upper tray, illustrates how the lower portions of deep molds may be prevented from projecting below the bottom of the tray by securing the cross supports 39n or mold-supporting plates 39m on the upper flanges of the side channel members 39g. This method of mounting the mold-supports also permits vertical adjustment for any type of mold. The lower portion of Fig. 6B shows a method of securing the mold supports to the flanges by means of clamping brackets as at 39q, so that the supports may be adjusted along the tray independently of the securing holes 39l.

The tray trunnions are longitudinally bored as at 39r, this bore having a hose nipple 39s projecting therefrom, and the end members 39c of the tray are also bored as at 39t and provided with a hose nipple 39u, for connecting up air lines and for other purposes which will later become apparent.

*Conveying system*

Reverting now to Figs. 1, 2 and 3, the conveyor chains of the main conveyor 40 are mounted on sprockets 42 and 43, the sprockets 42 being the main drive sprockets and are mounted on cross shafts 42a having bearing in the side plate 38a at opposite extremities of the machine, and the sprockets 43 being guide sprockets which may also serve as drive sprockets for portions of the conveyor and are mounted on shafts 43a which may have bearing in the side frame of the drier. The mold-actuating units are preferably arranged so that they all may be primarily driven from a main drive shaft 44, supported and having bearing in projecting brackets 44a, which may be cast integral with or secured to one of the side beams 38a, and the conveyor drive is taken from this shaft by means of bevel gears 45 secured on the shafts 42a and pinion gears 45a secured on the opposite ends of the drive shaft 44.

To provide for intermittently halting portions of the conveyor without interruption to the main drive, the sprockets 42 at opposite extremities of the machine are driven in synchronism and a certain predetermined amount of slack is provided in the conveyor chain, and at such points along the line where a fabricating operation requires the tray to come to a temporary period of rest, the trays are intermittently advanced at a speed in excess of the normal drive of the conveyor, the slack being periodically accumulated and dissipated on opposite sides of the advanced trays or tray, and the preferred means for accelerating a tray or series of trays is illustrated in detail by Fig. 5.

The track 41 is preferably formed with tray-positioning notches 46, (see Fig. 5A), where each fabricating operation requiring an inert tray ensues, and parallel with the track a tray-carrying bar 47, also notched at 46a, (see Fig. 5), is provided which is intermittently reciprocated by means of a system of rods and levers 47a, 47b, 47c, 47d and 47e, and cams 47f and 47g, the rods 47a being pivotally secured at opposite extremities to the bar 47 and bell-crank levers 47b, the latter being pivotally connected by rod 47c which has pivoted thereto the one end of cam lever 47d, which is adapted to be actuated by cam 47g, the rods 47a and 47h being adjustable by means of turnbuckles 47i and 47j. The bell-crank levers are fulcrumed on pins 57k secured in the side plates 38a, and the cam levers 47d and 47e are fulcrumed on pins 47l adjustably secured to said plates, these latter fulcrum connections being adjustable both while in operation and while at rest through the medium of a sliding-block construction which is illustrated in detail in Figs. 7 and 7A and which will be hereinafter described, and the cams 47f and 47g are adjustably secured on shafts 47m having bearing in the plates 38a, the method of mounting these cams being illustrated and described in connection with Figs. 7B and 7C and 7D and 7E, the phase of motion of said cam being variable while the cam is operating as well as while at rest.

In operation cam 47f actuates lever 47c, which in turn actuates bell crank levers 47b, thereby elevating bar 47 and as this bar rises it lifts the tray trunnions clear of the notches 46, and cam 47g then actuates lever 47e and the trays are advanced to the next succeeding notch, the bar 47 then lowering the trays onto the track and repeating the foregoing cycle of operations.

It will be understood that the foregoing structure is mounted on both sides of the machine and acts on the trays simultaneously.

Fig. 5A illustrates how the trays may be automatically disconnected from the conveyor for a fabricating operation and then again connected thereto without halting the conveyor and without utilizing slack to temporarily halt the trays during the normal drive of the conveyor. In this instance the chain is formed with a trunnion 48 which connects with the carrier by means of a hood 46a, (see Fig. 6E), which is formed on the end of the tray trunnion 39a. The conveyor chain may be positively guided by supplemental sprockets 49 or drop by gravity from engagement with the trays when the latter are deposited on the tracks 41, after which the trays may be progressed forward by the reciprocating bar 47 as in Fig. 5 until the chain 40 again engages and lifts them from the tracks to resume their normal travel.

Fig. 5B illustrates a modification relatively to Fig. 5 wherein the trays are advanced at an accelerated speed on the tracks 41 and then centered and maintained in stable position on said tracks by the bar 47 during a fabricating operation instead of being lifted from notches in the track by said bar and advanced as in Fig. 5. The tracks 41 in this instance are smooth the notches 46 being omitted and the trays are intermittently advanced at an accelerated speed by lever 47e, which has a gravity pawl 47n pivotally mounted on one extremity thereof, the bar 47 having simply a guided vertical movement; and the notches 46a therein serving to center the trays after being advanced by lever 47e. In the position shown in Fig. 5B the lever 47e has just advanced the trays, the buckling links at the left of the figure indicating how the slack accumulates due to acceleration of that particular section of the conveyor.

Figs. 6G and 6H illustrate a modified form of tray-carrying member 48b which may be used in place of the cooperating chain trunnion 48 and hood 48a in Figs. 6E and 6D, these members 48b being pivotally mounted on the chain trunnions 48 and having a concave hook extremity adapted to receive the tray trunnions, which automatically center or come to rest in the pocket formed thereby when the chains move upwardly to reengage the carriers.

Figs. 6I and 6J illustrate a method of hanging the trays in the conveyor chains diagonally so as to always be maintained in a horizontal plane regardless of the direction of movement of the conveyor, to show how this object may be accomplished otherwise than by aligned pivots or swingably mounting the trays in the conveyor, Fig. 6I being a plan view of a tray of this type and Fig. 6J a side elevation of a series of trays mounted in a conveyor chain.

Figs. 6K and 6I show tray carriers 48c somewhat similar to the ordinary ware board, to illustrate how the trays as a whole may be manually disposed on the ordinary ware board commonly used in drier conveyors, the tray being portable instead of the ware board.

The device illustrated in detail in Fig. 5E may be used in mounting the various conveyor sprocket shafts and is particularly advantageous in adjusting the slack in sections of the conveyor between sprockets or between any particular stretch of the conveyor. The assembly comprises a supporting housing 50 adapted to be secured to the frame of the machine, a resilient adjustable shaft bracket 50a, spring 50b, threaded rod 50c and adjusting and set nuts 50d. The sprocket shaft may have bearing in the bracket 50a. By adjusting nuts 50d the position of bracket 50a and shaft that may be mounted therein may be adjusted. It will be noted that the nuts 50d prevent movement of the shaft in one direction while the spring 50b permits a resilient action in the opposite direction, which compensates for contraction of the chain due to varying temperature.

The conveying system of the supplemental drier is hereinafter described.

*Cam and lever mounting*

In apparatus of the type herein disclosed it is of material advantage to be able to adjust and time or synchronize the various units while the machine is in operation as well as at rest, and the working levers and cams are mounted with this end in view.

Figs. 7 and 7A illustrate an assembly used for mounting the various levers, pitmans and analogous members so as to provide for adjusting the pivotal and fulcrum points as well as points of applied force, this assembly comprising a pivot or journal block 51, journaled in a longitudinally slotted portion of the lever or analogous member 51a to be pivoted or fulcrumed and bored and threaded to receive an adjusting and retaining screw 51b, said block being also mounted to slide, through adjustment of screw 51b, in a longitudinally slotted portion of a relatively stationary block 51c, the journal or bearing portion of block 51 being headed and the side walls of the slotted portion of the lever 51a formed with a retaining track or groove for said head. Block 51c is adjustably secured to the supporting bracket 51d as by screw bolts 51e and 51f and positioning pin 51g, the bracket 51d being arcuately slotted at 51h where the bolt 51e extends therethrough and a plurality of positioning holes 51i provided in bracket 51d for pin 51g. By loosening bolts 51e and 51f, pin 51g may be adjusted in any of said holes to definitely locate or spot the angular position of block 51c relatively to the bracket 51d and lever 51a, while screw bolt 51e may be adjusted in slot 51h to accomplish the same result independent of pin 51g and intermediate of holes 51i. Adjusting screw 51b is journaled in end plates 51j secured to block 51c, said screw being provided with a thrust and set nut 51k and handle 51l. When required, a further pin 51m may be threaded into the lever 51a and project into an arcuate slot 51n formed in the bracket 51d, to ensure against endwise displacement of the lever. An abutment screw 51o may also be threaded through an extension of bracket 51d, to limit the travel of the lever in one direction without affecting its travel in the opposite direction.

By adjusting the angle of block 51c and/or shifting block 51, various advantageous adjustments may be obtained. For instance, the extent of reciprocation of lever 51 may be varied without varying the lowermost point of reciprocation; or the intermediate point of reciprocation may be maintained constant while at the same time varying the extent of reciprocation; or the lowermost point of reciprocation may be varied to a greater or less extent than the uppermost point of reciprocation, and vice versa, or the altitude of reciprocation varied, and all of these adjustments may be made while the lever is at work or while in operation and while the driving connection subsists.

The foregoing assembly as a whole may be adjustably supported by a turn-buckle or analogous device 51p, threaded at opposite extremities in brackets 51q and 51r, and to provide for both vertical and lateral adjustment independent of the turn-buckle or as an alternate method of supporting the assembly where the space available may not be sufficient to support the turn-buckle assembly the brackets 51d and 51r may be slotted at right angles to receive securing bolts 51s.

Fig. 7I illustrates how the sliding block adjustment structure may be applied to the three working points of a lever, namely, the pivotal connection, the fulcrum connection and the point of applied force or the cam roller. In this instance the bracket 51r for the pivotal connection assembly is also shown as adjustably threaded on pitman or analogous reciprocating element 51¹. The fulcrum point of the lever is at the extreme left of Fig. 7I, and at an intermediate point the cam roller is rotatably mounted on the journal block 51, which will be readily understood by considering the fragment of the lever as removed from Fig. 7A and the cam roller mounted directly on block 51.

Both the pivotal and fulcrum points are thus made adjustable in a manner above described and the point of applied force or the cam roller may also be adjusted substantially vertically and horizontally, and these adjustments may all be made while in operation and while the driving connection subsists. In regard to the cam roller, the block 51c in which journal block 51 slides is shown adjusted to a position whereby the roller may be adjusted substantially horizontally by adjusting screw 51b, which adjustment either retards or advances the point of contact of the roller relatively to the cam surface and thereby varies the phase of motion imparted to lever 51a without changing the angular position of the actuating cam on its shaft.

Fig. 7I also includes a cam-mounting structure which will be presently described.

Figs. 7B to 7I show methods of mounting cams which permit change in the phase of motion of the parts primarily actuated thereby while said parts are in operation and while the driving connection subsists. To illustrate, a cam 52 and shaft 52a, which may be of any type, is shown, and in the assembly of Figs. 7B and 7C the shaft is formed with an annular threaded groove 52b and the hub 52c of the cam with a bracket portion bored to form a bearing housing for an adjusting and securing screw 52d and having a head 52e cut with radial teeth to provide a gear, the bore in the hub bracket being enlarged to receive said gear, the screw 52d being inserted in the bore and secured in position by a thrust collar or nut 52f. A guide bore or slot is formed in the hub and cam at right angles to screw 52d, said bore being adapted for a rack 52g which is in mesh with gear 52e, said rack being secured at one extremity in a collar 52h provided with an annular groove 52i, the collar having a sliding fit on shaft 52a. A stationary adjusting screw 52j having a saddle lug 52k on one extremity adapted to ride in groove 52i may be used for adjusting the cam, said screw being mounted in a bracket or any other adjacent relatively stationary part of the machine. The threads of the shaft groove 52b and screw 52d are preferably of the single-thread or irreversible type, to prevent angular displacement of the cam due to work imposed thereon, and as a further precaution against angular displacement, a resilient detent 81i, (see Fig. 12), may be mounted in the bracket portion of the cam hub and engage in the teeth of gear 52e.

It will be seen that by adjusting screw 52j, the rack 52g in mesh with gear 52e will cause screw 52d to turn and thereby adjust the angular position of cam 52 on shaft 52a, and this adjustment may be made while the shaft is in motion from a stationary point, the extent and position of adjustment being visible.

In Figs. 7D and 7E the phase-changing adjustment is adapted to less space and smaller cams but may be found advantageous for use with any type of cam. In this instance the screw 52d is mounted in the cam itself, which does not require a hub, and the teeth 52l of gear 52e project radially beyond the sides of the cam. To facilitate adjustment, a lever 52m, formed at one extremity with a toothed segment 52n, (see Fig. 7F), and at its opposite extremity with a weighted head 52o, is provided, said lever being mounted for limited radial rocking movement on a bracket shaft 52p formed with a longitudinal groove and notched at predetermined intervals as at 52q to receive a limiting pin or screw 52r mounted in the hub of lever 52m. The weighted head 52o, is provided, said lever being mounted for limited radial rocking movement on a bracket shaft 52p formed with a longitudinal groove and notched at predetermined intervals as at 52q to receive a limiting pin or screw 52r mounted in the hub of lever 52m. The weighted head 52o of lever 52m serves to normally maintain the segment 52n (see Fig. 7F), out of range of the radial path of the cam. To adjust the cam, the lever is simply slid along the shaft to one of the notches 52q and rocked inwardly to bring the segment 52n within the radius of the teeth 52l of gear 52e as the cam rotates, the adjustment being reversed by sliding said lever along its supporting shaft 52p and engaging the teeth of gear 52e on the opposite side of the cam. Thus the operator may readily gauge the extent of adjustment, as at each rotation of the shaft and cam, a definite degree of rotation is imparted to screw 52d, so that the operator may be guided by the number of times the segment contacts with the teeth of gear 52e in determining the extent to which he adjusts the angular position of the cam.

Figs. 7G and 7H show the lever 52m mounted to slide forward and back when adjusting the cam, the lever being longitudinally grooved as at 52s, so that it may slide at right angles relatively to its supporting brackets when said groove registers with the notches 52q. This method of mounting the adjusting lever braces the latter more firmly against angular strain when the segment 52n is thrust into the path of the angularly moving gear 52e.

In Fig. 7I the cam is constructed to provide adjustment, while in operation, of both the throw of the lever and phase of motion imparted thereto. In this instance the cam is formed in sections, two in the present instance, each section being recessed and provided with grooves, screws 52d1 and 52d2 being mounted and having bearing in said sections. The hub 52c is of square or rectangular shape in this instance with tongued side edges, to receive and guide the cam sections, and interiorly threaded bores to receive the screws 52d1 and 52d2, which are similar to the screw 52d, the said sections being fitted on the hub and the screws 52d1 and 52d2 then adjusted to set the sections in the desired position. The hub is adjustable angularly as in the previously described constructions. The joining surfaces of the cam sections are also preferably of tongue and groove construction, to bridge the adjustment gap for the cam roller. The cam shown is of symmetrical or regular contour but obviously may be shaped in accordance with the work involved. Each section is independently adjustable or the sections may be adjusted in unison, note gap between the hub and cam at 52$t$. By adjusting screw 52$d$1 the throw of the cam may be varied independently of the section controlled by screw 52$d$2, and by adjusting screw 52$d$2, the same adjustment may be effected relatively to the lower or dwell section. By adjusting screws 52$d$1 and 52$d$2 in unison, the cam as a whole may be adjusted radially on shaft 52$a$. The screws 52$d$, 52$d$1 and 52$d$2 are preferably of different lengths, to hereby bring their contact heads 52$e$ in different radial paths for independent adjustment.

Hereinafter, when referring to a lever as being mounted (as in Figs. 7 and 7A) or a cam as being mounted (as in Figs. 7B, 7D, etc.) it will be understood that the lever or cam under discussion is preferably adjustably mounted as shown in the detailed figure referred to.

Molds

The molds in which the ware is formed are generally designated by the reference numeral 53 in the drawings and may be of the usual construction, but it is preferred to use molds having a standard metal base 53$a$ and renewable plaster body 53$b$ constructed in general as illustrated in Figs. 8 and 8A, this construction of mold being slightly varied in some instances as will later appear. The deep ware or cup mold in Fig. 8 is provided with a retaining and protecting ring 53$c$ which is threaded into the base 53$a$; while in Fig. 8A this ring is seated in an annular groove and secured to the base 53$a$ by screws 53$d$. These rings permit ready removal of the plaster body 53$b$ when same has become unfit for further use and also serve to protect the edge of said plaster body from chipping and wear due to the action of the trimmer and handling by attendants as well as retard drying of the edge or brim of the ware and thereby eliminate cracking due to premature drying at this point. The base is provided with ventilating openings 53$e$ which in the plate mold of Fig. 8A result from the construction of the plaster-receiving portion of the base, these openings accelerating the extraction of moisture or the drying action and also permit the application of super and/or sub-atmospheric pressure and analogous treating fluids to the clay charge or ware in or on the mold during various fabricating operations, as will be more fully described and to regulate the drying action, these openings may be selectively closed by plugs 53$f$. The plaster portion of the plate mold may be reinforced by wire netting or the like which may be embedded in the plaster, as at 53$g$, when the molds are cast. That portion of the base of the mold which rests on the chuck when the latter supports the mold is formed with tapered shoulders, as at 53$h$, so as to center the mold on the tray.

A cover is shown with the deep ware mold, this cover also being provided with vents 53$e$ which may be selectively closed by plunger 53$f$, these covers being principally for use in the dryer to regulate or selectively retard the drying of the ware.

In Fig. 8B the base of the mold is in the form of an annular ring with tapered inner and outer walls for centering the mold on the chuck and tray. This method of constructing a mold reduces the size of the base and permits the plaster body to be made considerably thinner than in an all-plaster mold, resulting in accelerated drying and saving in material.

In Fig. 8C the metal base is entirely dispensed with, a resilient pad of rubber or the like at 53$i$ being interposed between the mold and chuck for cushioning purposes.

Fig. 8D illustrates a modified form of mold positioning and centering device 39$o$1, which instead of being in the form of the stud 39$o$ previously described in connection with the trays may be an annular shouldered member or series of segments of plaster or other suitable material which seat on the tray.

In Fig. 8E the ring 53$c$ is formed with an inner tapered supporting flange 53$j$ which serves to support the mold and center on the chuck. A heating coil 76$d$ is shown on the chuck, said coil receiving current transmitted through the chuck 62 as described in connection with Fig. 9. This coil may also be positioned in the mold, as in Fig. 17H, and be in the form of a coiled pipe, nozzle or analogous means and receive steam, water spray, air of varying degrees of temperature and humidity and like mediums which may be applied to the mold direct from this coil or simply circulated therethru, the object being to selectively control the temperature and moisture content of the molds independently of the temperature of the air in the drier or room where the machine is installed. Thus the drying action may be selectively advanced or retarded in accordance with the condition of the advancing ware, to thereby ensure release of each and every article of ware from the molds at a predetermined time and regulate the drying of the ware in accordance with the successive fabricating operations. The reinforcement 54$g$ may also be utilized as a coil.

Molds as heretofore used in potteries were constructed with a view toward providing sufficient strength and to facilitate manual handling and application to the chuck of the jigger and dryer shelves.

The present invention contemplates the provision of a mold having a standard non-absorbent base or frame, which gives the mold its necessary strength and attendant advantages heretofore specified, so that the plaster or porous mold proper may be constructed primarily with a view toward the individual drying requirements of the ware and all excessive or superfluous absorbent material eliminated.

To dry ceramic ware without cracks or flaws in the articles, the humidity of the drying air during the shrinkage period must be relatively great, and during this period, the molds being initially in a bone dry condition, absorb moisture from the surrounding atmosphere until saturated to an equal degree therewith throughout. This moisture absorbed by the mold is wasted and lowers the humidity of the drying atmosphere and is a detriment to the air and mold, and the greater the porous bulk of the mold, the greater will be the amount of moisture absorbed and the longer will be the time required for the mold to dry preparatory to receiving a fresh charge of clay.

The porous bulk of the molds proper used in carrying out the present method, where practicable, is reduced to a minimum consistent with the most efficient drying of the ware, and furthermore, the porous body of the mold may be made thicker at one point than at another, to thereby selectively control the drying of the article of ware carried thereby.

As an auxiliary in obtaining selective control of the drying action, or where it is impracticable to construct a mold as above specified, it is proposed to selectively treat the mold to regulate its absorbing capacity.

Fig. 8F shows a mold for undercut ware which is so constructed that the ware may be removed after formation without parting the mold. The mold illustrated is an insulator mold, and where the annular groove on the exterior of the insulator is to be formed, a ring $53k$ which is composed of three segments in the present instance, is seated on an offset or shouldered portion of the mold. This ring may be in sections as shown or in one piece and composed of dried clay, plaster or analogous material, preferably porous and combustible or subject to decomposition through heat and having the proper absorbing capacity. After the ware is formed, it may be removed from the mold together with the ring, the latter then being replaced for another article of ware, thus eliminating the necessity of cutting the groove in the case of insulators after the latter are removed, and also provides for producing undercut ware without using partible molds. If the ring is composed of decomposable or combustible material of a comparatively cheap character, a separate ring may be provided for each article of ware, and as the ware is subjected to the drying and/or firing operation the ring will crumble or be rendered brittle, so that the ware may be readily removed from the mold with the decomposed ring or the ring easily broken free of the ware. Insulators made in partible molds are subject to fracture and defects at the joints of the mold, and in the production of high grade insulators, they are usually formed in block molds and the groove turned in the insulator after removal from the mold. The form of mold just described eliminates this relatively expensive operation while at the same time ensures uniform drying and the production of a good grade of insulator.

The molds used for automatically applying handles and like appendages to the ware are generally indicated by the numeral 54 in the drawings and shown in detail in Figs. 8G and 8H. The body of the mold is formed in two sections or parts, $54a$ $54b$ which are of similar construction, these parts being normally closed at the joint $54c$, only one of said parts being shown in section in Fig. 8G. The sections $54a$ and $54b$ have limited sliding movement in a frame $54d$, said frame having a detachable cover $54d1$ formed with a ware-positioning seat which is preferably faced with felt or some similar substance, to compensate for shrinkage and prevent marring of the ware deposited therein. The sections $54a$ and $54b$ may be of any suitable material, preferably non-corrosive, and in the abutting portions thereof are cut away to receive and retain the two halves of a supplemental mold $54e$ which is of porous material and constitutes the mold per se in which the handle or appendage is formed, the two halves of this mold $54e$ also joining at $54c$ when the sections are in closed position. The recesses for the porous halves or sections of the mold per se are V-shaped, so that by removing the cover $54d1$, said mold may be removed and replaced by a mold for any desired appendage. The frame $54d$ in line with the joint $54c$ is formed with a guide block $54f$, which assists in guiding and positioning the sections $54a$ and $54b$ when closing, and the bottom of said frame is shaped to center on the spotting chucks $62l$, one of which is shown in section in Fig. 8G. Each of the sections $54a$ and $54b$ is bored or recessed to form a cylinder $54g$, in which a relatively stationary piston $54h$ is mounted, said piston being provided with an exteriorly-threaded stem $54i$ which is formed with a bore $54o$ and threaded into the side of the frame $54d$ and secured by a nut $54j$, the cylinder walls being interiorly threaded for removable application of a sealing head $54k$. The cylinder walls are formed with two annular spotting or positioning grooves $54l$ and the piston $54h$ is diametrically bored to receive a ball and spring detent assembly, the balls registering with the grooves when the sections $54a$ and $54b$ reciprocate, to thereby resiliently retain said sections in their alternate positions.

The mold sections $54a$ and $54b$ together with the respective halves of the appendage or handle mold $54e$ are adapted to be alternately retracted from abutting relation or parted and moved together by means of sub and super-atmospheric pressure, which may be applied through the tray trunnions, see Figs. 6 and 6A, but which in the operation of the machine as shown is applied through the spotting chucks $62l$, (see Fig. 14E), the sub and super-atmospheric pressure being controlled by means of the valve illustrated in Figs. 10 and 7F which will subsequently be described. Preliminary to the retracting operation, it is preferred to impregnate the porous mold $54e$ with super-atmosphere, to thus ensure prompt release of the ware from the mold when the retracting pressure is applied. There are therefore two independent hose connections shown for both the chucks $62l$ and trays 39 and two normally independent air passages $54m$ and $54n$ leading into and branching off in the mold sections $54a$ and $54b$ and mold $54e$, the operating pressure being applied through the passage $54n$ and the impregnating atmospheric pressure, which is not limited to supper-atmosphere but may be any desired treating medium or fluid, applied through the passage $54m$. The bore or passage $54o$ in the piston stem is connected with the passage $54n$ by a hose or analogous member $54p$, and the passage $54n$ in turn branches off at right angles and registers with a passage $62a$ formed in the spotting chuck $82l$, the passage $62a$ connecting with an air line leading to one of the control valves, Fig. 10. The passage $54m$ registers with a passage $62b$ also formed in the chuck $62l$ and connecting with an air line also leading to one of said valves, this passage $54m$ branching off and terminating in chambers $54q$ formed in the sections $54a$ and $54b$ on each side of the mold $54e$ and also branches off into the piston chamber, this latter branch passage being used when it is desired to use the passage $54m$ for applying both the impregnating pressure and operating pressure and is adjustably closed in the present instance by a threaded plug $54m2$. The chambers $54q$, only one of which is visible, communicate with branch passages formed in the sections of the mold $54e$ and terminating at the joint of the latter. The branch of the passage $54m$ leading to the chamber $54q$ may be adjusted through the medium of a screw plug $54m3$, and communication to the chuck passage $62b$ may be closed by a screw plug $54m4$, these plugs being inserted in each section 54a and 54b. The passage 54m also branches off and opens out in the side of the mold, see Fig. 8H, which branch is shown closed by a screw plug 54m5. When it is desired to apply the impregnating pressure or other treating medium through one of the tray trunnions instead of through the chuck passage 62b, the branch passage leading to 62b is closed and the plug 54m5 replaced by a hose nipple. The bore 54o in the piston stem 54i terminates in the cylinder 54g on either side of the piston 54h, depending upon the position of a screw plug 54o', this plug being shown in the side of said stem, the sections being retracted in the present instance by sub-atmospheric pressure and closed by super-atmospheric pressure, whereas if the plug 54o' were inserted in the end of said section, this action would be reversed. To ensure communication with the mold cavity of the porous mold 54e the abutting surfaces of the respective halves of the latter are grooved as at 54r to provide vents leading to the mold cavity.

In operation, assuming the air pressure is to be applied through the chuck by means which will be described, air under pressure is first applied through passage 54m to impregnate the mold 54e and then through passage 54n and bores 54o into the cylinders 54g, which causes the sections 54a and 54b together with the halves of the porous mold 54e to slide back or retract sufficiently to remove the ware after which suction pressure is set up in the cylinders and the sections move into abutting relation.

When charging the mold, it is preferred to first apply sub-atmospheric pressure through passage 54m to extract air pockets and excess moisture from cavity of the mold 54e and the freshly formed handle or appendage therein, and subsequently apply super-atmospheric pressure through said passage to impregnate the porous mold 54e and ensure release of the appendage when the retracting pressure is applied through passage 54n and the mold is parted.

If the operating pressure and treating medium and/or pressures are to be applied through the tray trunnions, the tray-registering assembly shown in Fig. 6A may be mounted on the frame of the machine along the line of travel of the trays 39 and adjacent the points of transfer of the ware or other operations where it may be desired to apply sub and super-atmospheric and other fluid mediums to the appendage molds 54, or any other unit that may be carried by the trays. This assembly is generally indicated by the numeral 55 and comprises a housing 55a, bolted or otherwise secured to the frame of the machine or wall of the drier, a spring 55b mounted in the housing, a spotting piston 55c having a flush sliding flat in said housing against the resistance of said spring and formed with a convex head adapted to intermittently seat in the concave spotting device 39e on the end of the projecting tray trunnion 39a an adjusting screw 55d for the spring 55b, and an externally-threaded piston-positioning or adjusting ring 55e threaded into the housing and having socket holes 55f for a spanner wrench or analogous tool. The end of the piston is bored at right angles and provided with a hose nipple 55g, said bore registering with the bore 39r in the tray trunnion when air pressure or other medium is to be applied to the fabricating units on the tray. The piston 55c may be retracted against spring pressure by contact with the tray trunnions, or said piston may be retracted in timed relation to the conveyor by means of air pressure, valved hose connections 55h and 55i being provided in the housing 55a for connection of air lines leading to one of the control valves shown by Fig. 10.

In some instances it may be desirable to apply air pressure or the like through the bore 39t in the end of the tray, as where the tray trunnion is used for other purposes, in which event the spotting device generally indicated at 56 may be used, said device being resiliently mounted on the frame of the carriage shown in Figs. 14 and 14A in a manner substantially as shown in Fig. 14E and provided with a hose nipple 56a which also leads to one of the valves shown in Fig. 10.

In Fig. 6 an appendage mold 54 is shown on one of the trays 39 having air line connections through the tray instead of the chuck, and in which event the branches of the passages 54m and 54n which register with the chuck passages 62b and 62a will be closed and the hose connections 54p both connect with one of the trunnion nipples 39a while the passage 54m connects with an air line 39u' attached to the nipple 39u.

Fig. 8I illustrates an appendage mold adapted to be opened and closed by levers or mechanical means instead of by fluid pressure, the mold being generally indicated by 57 and comprises a base 57a in which a pivot stud 57b and centering pins 57c are secured, the sections 57d and 57e of the mold being pivoted at one extremity on the stud 57b and provided with lugs 57f which connect with toggle links 57g, (see Fig. 6), in turn connected to a toggle lever 57h, which is actuated by a push rod 57i projecting through the bore 39r of the tray trunnion and retracted by a spring 57j, the push rod in turn being actuated by plunger 55c.

Fig. 8J shows a form, generally indicated by 58 in the drawings, principally used for boxing ware, the form having a base shaped to center on the chucks and a plurality of uprights 58a which support the ware in boxed relation.

Figs. 8K and 8L illustrate a partible mold for undercut ware, generally designated in Fig. 1 by the numeral 59, the mold being formed in sections 59a which are mounted to shift or slide radially on a base 59b, which in turn is mounted to have relative angular shifting or sliding movement of a main base 59c adapted to seat on the rotatable mold-actuating chucks 62 of the machine. Each section is formed with a tangential slot 59d and the base 59b with a corresponding number of arcuate slots 59c, dowels 59f being threaded into the main base 59c and projecting upwardly through both slots into each section 59a. The base 59b is formed with a central boss having a porous insert 59g secured thereon, which forms the bottom of the mold cavity, and guide pins 59h projecting radially therefrom into each section, which serve to guide and accurately position the sections during the opening and closing operations. The chuck is provided with a resiliently mounted mold engaging and centering pin 60, see Fig. 9E, the chuck being recessed to house a spring 60a and said pin having an annular base 60b seated on said spring and having a sliding fit in said housing, an adjustable cover 60c being threaded in the housing and which determines the limit of projection of said pin. The base 59c of the mold 59 is recessed at a predetermined point, so that when the rotating chuck elevates to lift the mold from the tray, said pin 60 will register with said recess and effect a positive engagement of the chuck with the mold base. The tray 39 is also provided with an adjustable, resiliently mounted pin 61 adapted to engage in a bore 59i in the base 59b when the rotating chuck 62 lowers the mold onto the tray. It will be noted that the passages 54n and 54m serve in this instance for admitting sub or superatmosphere to chambers or cavities 59j and 59k, respectively formed in the porous mold body and base insert 59g.

For opening and closing this form of partible mold, it is preferred to use the chuck assembly described in connection with Fig. 9B. The parts of this assembly may be adjusted so that the chuck 62 will rise and elevate the mold from the tray and then rotate it clockwise in operative adjacency to the profile to shape the ware, and when the chuck lowers, rotation is stopped at a point which will bring the pin 61 in approximate registration with the bore 59i, the mold then centering on the tray. To open the mold, the chuck 62 is caused to rise and elevate the mold clear of the tray but not clear of the pin 61 and then rotate counter-clockwise, which shifts the locking dowels 59f in the slots 59d and 59e and parts the mold sections to permit removal of the ware. It is preferred to lower the mold onto the tray in open condition, to give ample time for cleaning and drying of the mold sections. Prior to charging the mold with clay, the chuck 62 is again elevated and lifts the mold clear of pin 61 and rotates the mold clockwise to lock the mold sections together.

*Mold-actuating or jigger units*

As the trays bearing the molds progress along the lower main fabricating line, they pass over reciprocable and rotatable chucks 62 forming part of the mold-actuating units shown by Figs. 9 to 9f, inclusive. The complete assembly is mounted on a skeleton frame 63 which is adjustably secured on cross supports 63a, by screw bolts 63b, extending through enlarged openings, and centering dowels 63c, the latter being removed in the event it is desired to shift the unit from its initially aligned position. The cross supports 63a are suitably adjustably secured to the base of the main frame 38 of the machine. The casting or frame 63 is provided with a bearing housing 63d for a spindle 64, (see Fig. 9D), the lower extremity of which has secured thereon a collar 64a by means of a pin 64b, said collar supporting a thrust bearing assembly comprising a tapered collar 64c, bearing rollers 64c', a saddle 64d and spring 64e, a cover 64f being adjustably threaded into the housing against which said spring abuts, so that the spindle moves upwardly against the tension of said spring and lowers by gravity assisted by said spring.

The spindle 64 is in spline-sliding engagement with a chuck spindle 62c on which the chuck 62 is secured by a screw 62c' and dowel pin 62c2, reciprocation being imparted to the chuck 62 and spindle 62c by means of a cam 62d, which is adjustably mounted as in Figs. 7D and 7E on a cross shaft 62e having bearing in the side frame plates 38a of the main frame of the apparatus, said cam actuating a lever 62f, which is adjustably pivoted at one extremity as in Figs. 7 and 7A, the pivoting assembly being supported from the frame 63, and at its opposite extremity pivotally secured to a pitman 62g, the pitman connecting with spindle 62c by means of a cross fork 62h, which is adjustably secured to said pitman by nuts 62i at its one extremity and forked into an annular groove in the spindle 62c at its opposite extremity. The pitman 62g projects through and is guided by extensions 62j of the frame 63, the upper end of said pitman having adjustably threaded therein a contact screw 62k, the function of which will later become apparent.

Rotation may be imparted to the spindle 64 in the unit illustrated in Fig. 9 by means of cooperating friction gears 64g and 64h, the gear 64g being adjustably secured on the spindle 64 and the gear 64h splined for longitudinal sliding movement on a cross shaft 64i, which is preferably continuously driven, this shaft having bearing at opposite extremities in the side frame plates or beams 38a.

The friction gears 64g and 64h are brought into intermittent contact by a lever and brake assembly comprising a brake shoe 64j formed with studs for mounting the shoe for vertical movement on the frame 63, a bell-crank lever 64k pivoted or fulcrumed in said frame, a connecting rod 64l adapted to be adjustably pivoted at one extremity in any one of a plurality of holes formed in said bell crank lever and at its opposite extremity adjustably secured by nuts 64m on a pitman 64n, and cam-contacting arms 64o and 64p which are also adjustably secured on the pitman 64n by nuts 64q and 64r. These arms 64o and 64p are alternately raised and lowered by separate cams, not shown, which are adjustably mounted as in Figs. 7D and 7E on the shaft 62e and have a contour substantially similar to the valve cams shown in Figs. 10 and 7F. The frame 63 is formed with guide brackets 64t for the pitman 64n.

To vary the speed of rotation of the chuck during reciprocation thereof, the splined friction gear 64h is provided with a grooved hub 64h', also splined on shaft 64i, and a grooved cam 64h2 is adustably secured on shaft 62e, motion being transmitted from the cam to said gear by a lever 64h3, which is adjustably pivotally supported at its upper extremity as in Figs. 7 and 7A on a bracket extension 63e of the frame 63, said lever extending downwardly and adjacent cam 64h2 being provided with a pin 64h4 working in the groove of said cam, and at its lower extremity said lever connects with the grooved hub 64h' by a link 64h5 and pin 64h6 working in the groove of said hub.

In operation, the chuck-reciprocating cam 62d and brake cams being adjusted to work in synchronism, when the chuck spindle and chuck elevate, the brake 64j is released, permitting spindle 64 to lower and thus lowering gear 64g into contact with the continuously rotating gear 64h and imparting rotation to the chuck; and when the chuck is lowered, brake 64j is raised and thus contacts with gear 64g and raises the spindle 64, thereby moving gears 64g and 64h out of contact and stopping rotation of the chuck.

To gradually accelerate and decelerate or vary the speed of rotation of the chuck during reciprocation thereof, the drum cam 64h2 and lever 64h3 may be used to move the gear 64h relatively to gear 64g. Ordinarily, however, the brake, if properly adjusted, will operate to effect gradual contact and release of the gears 64g and 64h and provide for smooth operation of the chuck 62.

In Fig. 9B the chuck is adapted to be rotated through the medium of a segmental gear 65 formed integral with a lever 65a, which is actuated by a cam 65b, adjustably secured as in Figs. 7B and 7C on shaft 64j, against the tension of a retracting spring 65c, the lever being adjustably pivoted as in Figs. 7 and 7A in the frame 63, the segment 65 meshing with a pinion 65d adjustably secured on the spindle 64. The cam 65b is shown as being symmetric contour but may be replaced by a cam contoured in accordance with the work involved, it being obvious that an irregular cam would impart intermittent rotation to the chuck, and the cam 62d may also be given an irregular contour to give the chuck a number of minor reciprocations to each major reciprocation. This form of chuck rotating means is of particular advantage where it is desired to synchronize the rotary time and motion of the chuck with cooperating fabricating units, and is used, for instance, when the chuck is to be rotated in reverse directions as in closing the partible undercut ware molds 59, as by adjusting the throw of lever 65a and/or substitution of a suitably contoured cam, the chuck 62 may be caused to rise and contact with and lower and release the molds in predetermined angular positions, and also impart a definite number of revolutions to the mold when elevating the latter clear of its tray. This chuck-rotating assembly may be applied at any point along the fabricating line in place of that illustrated in Fig. 9, as the frames 63 are constructed to provide for interchangeability of parts.

The shaft 64i, on which the continuously-driven gears 64h are splined, and the cam shafts 62e are arranged so that they may be driven from the main drive shaft 44, or, as shown in Fig. 1, the shafts 64i may be driven from an independently-driven shaft 66 and the shafts 62e from shaft 44, note Fig. 1 and the reduced view Fig. 9F, the drive being transmitted by helical gears 67 and 67a, the gears 67 being adjustably secured on the shafts 66 and 44 and the gears 67a on the cross shafts 62e and 64i. The speed of rotation of shafts 62e and 64i may be independently varied along the fabricating line by simply changing the ratio of gears 67 and 67a. These latter gears are used at various points in the entire apparatus, as will be noted in Fig. 1.

The shaft 66 is supported in bearing brackets 66a, which project at intervals from the main frame of the machine, said shaft being driven by a motor 66b (see Fig. 1).

In the event it is desired to transmit varying drive speeds to one or more of the mold-actuating units arranged transversely relatively to the machine as a whole, the variable speed unit shown by Fig. 14D may be installed, said unit comprising a sleeve 68 and ratio gears 68a, 68b, 68c, 68d. The sleeve 68 is adapted to be mounted together with gears 68a, 68b, and collar 68e on the driven shaft, and gears 68c and 68d are mounted to rotate on a counter shaft 68f and maintained in adjustable postion thereon by collars 68g and 68h, said latter gears being either cast integral or secured by pins 68i, while gear 68a may be integral with sleeve 68 and gear 68b adjustably secured on the driven shaft by screw 68j. The sleeve 68 has a cam shown as mounted thereon, to indicate how the various cams for a particular mold-actuating or other unit may be mounted on the sleeve instead of the driven shaft when this particular unit is to be driven at a different speed relatively to another unit or units from the same shaft. To increase or decrease the speed of rotation of the sleeve 68 with its cams or other motion-transmitting members, collars 68e and 68g are removed, screw 68j loosened and gears 68b and 68c removed and replaced by gears of the required ratio. Sleeve 68 is provided with a screw 68k so that it may be secured to and rotate with the driven shaft if no change of speed is desired, in which latter event screw 68j is loosened to permit gear 68b to rotate free, collar 68e then preventing undue shifting of said gear from its normal position.

If the dowels 63c are retracted and the frames 63 which support the mold-actuating units are adjusted out of transverse alinement, the flexible coupling illustrated in Fig. 9G compensates for misalinement of the shafts 64i and 62e, said coupling consisting of an annular member or disk 69 which is interposed in the shaft line and formed with ribs 69a at right angles on opposite sides thereof, said ribs having a sliding fit in grooves formed in enlarged heads 69b, which are secured on the ends of the separated shafting.

Super and sub-atmospheric pressure and other mediums may be applied to the molds through the chuck for various fabricating operations, the passages 62a and 62b extending down into the chuck spindle 62c as shown and opening out into annular registering air grooves 62a' and 62b' formed in a hood 70 having a working fit around said spindle and adjustably supported on the frame 63 by a thread rod 70a, hose nipples 62a2 and 62b2 being threaded into the hood 70 and communicating with said grooves. A further communicating passage opening out in the bottom of the chuck is provided by a bore 71 in the screw 62c', the interior of the spindle 62c being hollow, thus forming a chamber 71a, and the hood 70 having a further groove 71b in communication with said chamber, a hose nipple 71c being threaded into the hood 70 and communicating with said groove. Where the passages 62a, 62b, and 71 open out into the chuck 62, resilient sealing and cushioning pads 62l are adjustably threaded into said chuck.

Fluid control valves

The reference numeral 72 generally designates the fluid-control valves which are installed at various points in the apparatus, these valves controlling the application of super and sub-atmosphere and other fluid mediums used in fabricating the ware. A preferred type of valve is illustrated in Fig. 10 and comprises a casing 72a formed with a chamber 72b and ports 72c, 72d and 72e, a plunger 72f also formed with parts 72cd and 72ce, and a thread rod 72g which is used for adjustably supporting the valve from the frame or other convenient part of the machine and threads into the upper extremity of the casing 72a and seals the chamber 72b at this point. For convenience, the casing is provided with enlarged screw holes 72h, which serve as an alternate means of attaching the valve where desired. The plunger 72f is formed as a bracket 72i, slotted or cast with an opening 72j, to enable application over the plunger-actuating shaft, here shown as the shaft 62e but which obviously may be any convenient rotating shaft, cam-contact pins 72k and 72l being cast or secured in said bracket and projecting at right angles therefrom, said pins contacting with cams 72m, 72n, 72o and 72p, (see Fig. 7F), which are adjustably mounted as in Fig. 7D and control complete and intermediate shifting of the plunger in both directions. Ordinarily frictional contact serves to maintain the plunger 72f in shifted position, but to balance the weight of said plunger and ensure that it remains in shifted position until displaced by cam action, the one extremity thereof is notched and the casing bored and threaded to house a detent assembly comprising a spring-pressed ball 72q and screw 72r, the notches being spaced in accordance with the shifting movement of the plunger. Thus when the plunger reaches its approximate shifted position, the ball 72q engages in one of said notches and releasably holds the plunger in shifted position. As an alternate means of balancing the plunger, a spring 72q' may be attached at opposite extremities, respectively, to the casing 72a and plunger bracket 72i.

The casing ports 72c, 72d and 72e are enlarged and threaded to receive hose nipples for connection of flexible air or fluid lines or hose 73, 73a and 73b, the nipples for the hose 73a and 73b being provided with valves 73c and 73d for regulating the ressure or volume of the fluid medium independent of its source. The hose 73 leads to the point of application, and the hose 73a and 73b connect with the source of supply of the medium.

During fabrication of the ware it is advantageous in some instances to utilize electric current, and in the present machine this current is supplied to the molds through the chucks 62 or 62', the switch being automatically worked by the valve plunger 72f. Referring to Fig. 10, the reference numerals 74, 74a and 75, 75a designate contact heads suitably insulated from and supported on brackets 76, which may be adjustably secured on a convenient part of the frame of the machine, the bracket extremity 73i of the plunger 72f has secured on and insulated therefrom resilient contacts 76a and 76b which have connected thereto the positive and negative wires leading to the source of electric current. Contacts 74 and 74a and 75 and 75a connect by wires 74b and 75b with brushes 74c and 75c (see Fig. 9), adjustably and resiliently mounted on an extension of the rod 76a. The chuck 62 is provided with a coil 76c, which connects by wires 74e and 75e leading down through the chuck spindle 63c with commutators 74d and 75d, which are mounted on the lower extremity of said spindle and suitably insulated therefrom.

As an example of the utilization of current during fabrication, when the molds are to be held in stable position on the chuck while applying air pressure to the ware through the molds, the switch may be adjusted so that the coil 76c is excited when the chuck is in elevated position, thereby magnetizing the chuck and attracting the mold thereto, the latter having a metal base which lends itself to magnetic attraction. The lower set of brushes 74c and 75c are provided in case it should be desired to reverse the polarity of the coil 76c and thus ensure release of the mold.

Certain of the chucks 62 have embedded therein contact rings 74f and 75f which connect with the wires 74e and 75e, said rings contacting with analogous rings 74g and 75g embedded in such of the molds as have heating coils 76d therein, see Fig. 17H.

Treating nozzles

The molds and ware may be treated and conditioned at various points along the fabricating line in preparation for some particular operation, the treating medium being applied through the nozzle member shown in Fig. 11, generally indicated by 77 in Fig. 1, and which may be mounted on the frame of the machine adjacent the line of travel of the molds and ware. This treating member comprises an inner exteriorly-threaded nozzle 77a, which may be adjustably threaded into the supporting frame of the device or, as shown through one of the top plates 38c, and secured by lock nuts 77b—and an outer nozzle or shell 77c, which is adjustably threaded on the inner nozzle 77a. These respective nozzles may be provided with any number of supply connections such as hose nipples for applying a mixture of treating ingredients or mediums or any particular medium separately, and in the present instance there are shown two supply connections 77d and 77e for the outer nozzle and a hose connection or nipple 77f for the inner nozzle, each of said connections and nipple being provided with a regulating valve. The inner nozzle is provided with an adjusting pin 77g which tapers into the nozzle extremity and forms a needle valve, thus enabling accurate adjustment, and the lower extremity of the inner nozzle tapers into the outer nozzle, so that this same adjustment may be obtained with respect to the outer nozzle by adjusting the latter on the inner nozzle. The pin 77g is threaded at its upper extremity in the nozzle 77a and provided with a knob or grip 77h. To ensure centering of the outer nozzle 77c on the inner nozzle 77a, screws 77i are threaded into the lower extremity of said outer nozzle, said screws being secured in adjusted position by lock nuts 77j.

Feeder assembly

The clay of which the ware is to be formed may be taken from the conditioning apparatus in the usual cartridge or slug form and disposed in a hopper 78o opening into a progressing and compacting chamber 78, Fig. 13, having a driven screw 78a working therein, which progresses and compacts the clay into a conduit 81, Fig. 13C, extending transversely of the machine across the line of molds as they advance on the trays 39, and from this conduit the clay is forced into extruding chambers and extruded and segregated in measured charges into or on the molds by the reciprocating plunger assembly illustrated in Fig. 13D.

The chamber 78 is formed with a supporting bracket 78b adapted for posts 78b' which are secured in one of the top plates 38c and by means of which the entire feeder assembly may be adjustably supported over the mold-actuating assembly. The screw 78a is preferably formed in sections and the required number of these sections are assembled on the squared portion of a shaft 78c and secured from endwise displacement by an end cap 78d, said shaft having bearing in a detachable head 78e formed with a hub 78e' and bracket 78f, (see Fig. 13), the bearing being provided with the usual packing gland and packing to ensure against leakage and wear on the bearing.

The walls of the chamber 78 are preferably fluted longitudinally to prevent angular movement of the clay, and in the top wall a return passage 78g is formed, the inlet 78h of which is shaped to seat a valve 78i provided with a stem 78j having a sliding fit in an exteriorly-threaded sleeve 78k against the resistance of a spring 78l, said sleeve being adjustably threaded in a cover plate 78m and secured by lock nut 78n, and the outlet of said passage opens into the hopper 78o. By adjusting sleeve 78k, the unseating pressure of valve 78i may be regulated to thereby regulate the operating pressure in the conduit 81. When the valve unseats, clay is permitted to pass through the return passage 78g back into the hopper 78o.

The screw 78a is preferably (but not necessarily) intermittently driven by a continuously-rotating sprocket gear 79, which is rotatably mounted on shaft 78e, and an intermittently-rotating ratchet gear 79a, which is splined on said shaft by a key 78b, the said sprocket 79 having a pivot pin 79c secured therein for pivotally mounting a dog 79d adapted to engage the teeth of the ratchet gear 79a. The dog is pivoted at an intermediate point and has secured in one side thereof a contact pin 79e which makes alternate contact with trip cams 79f and 79g, see enlarged end view Fig. 13B, these cams being mounted in the radial path of said pin 79e on blocks 79h, which are angularly adjustably secured or clamped by bolts 79i on a ring 79j, which in turn is secured to the bracket 78f by screw bolts 79k. The cam 79f, which throws the dog 79d out of mesh with the teeth of the ratchet gear 79a, may be rigidly secured to block 79h, but it is preferred to mount cam 79g, which throws the dog into mesh with the teeth of said gear, resiliently to ensure against breakage or jamming in case said dog should come down on top of one of the teeth of the ratchet. The cam 79g is therefore pivoted at one extremity on block 79h and has secured therein a stop pin 79g' which normally contacts with a block 79g2 in which a spring 79g3 is seated, trip cam 79g being maintained under resilient pressure by said spring. To maintain the dog 79d in tripped position, a ball and socket spring 79d' is seated at one end in the said dog and at its opposite end seated in a lug 79d2 formed on the sprocket gear 79, said spring exerting resilient pressure on the dog in a longitudinal plane in line with its axis, so that when the dog is oscillated past its axis, it will snap back into or out of mesh with the teeth of ratchet 79a. To limit the disengaged position of dog 79d, a stop pin 79d3 is secured in the side of gear 79.

A thrust bearing 79l, (see Fig. 13), is applied on the shaft 78c between a shouldered portion of said shaft and the bracket 78f.

In operation, the continuously-rotating gear 79 carries its pivotally-mounted dog around the periphery of ratchet 79a, the dog being alternately thrown into and out of mesh with said ratchet by trip cams 79g and 79f, and as these cams are adjustable by shifting the position of blocks 79h on their supporting ring 79j, the travel of ratchet 79a and screw 78a may be varied as desired.

Reverting briefly to Fig. 1, power for driving the screw 78a may be taken from a shaft 80 which extends along the side of the machine, motion being transmitted from this shaft to the various cross shafts 80a for the lower line of fabricating units by means of helical gears 67 and 67a similar to those used for the shaft 44 and cross shafts 62e. The shaft 80 has bearing in brackets 80b and the cross shafts 80a have bearing in the side frame plate 38b, as heretofore specified.

The shafts 80 and 44 are provided with sprocket gears and connected by a sprocket chain or analogous member 80c and driven in synchronism.

The sprocket gear 79 is connected by a chain or analogous member 79m with a sprocket gear 79n secured on one of the cross shafts 80a, this particular shaft being connected with an adjacent cross shaft 80a by a sprocket chain 79o, (see right-hand portion of Fig. 2), instead of being driven direct from shaft 80.

Referring now to Fig. 13D, the clay compacting in the conduit 81 is forced upwardly through openings 81a, formed in the top of the said conduit wherever the extruding assembly is to be installed, and into a chamber 81b formed in a pivot post 81c, and from the chamber 81b the clay passes through registering openings 81b' and 81b2, respectively formed in the side wall of the post 81c and the hub of a pivoted turret casting 81d, and into one of a series of chambers 81b3 formed in a multiple of radial cylinders 81e forming part of the turret 81d, from which the clay is extruded into or on the molds. While the clay could be extruded direct from the conduit 81 onto the molds, the construction here shown is adapted for producing different kinds of ware in succession, as where plates, cups and saucers are being formed in one line of molds. The turret 81d, therefore, may be rotated on the pivot post 81c in synchronism with the mold conveyor to bring each cylinder over a mold as it is advanced in line if different types of molds are in the same line. However, this operation may not be desired in many instances, as where the same type of ware is being produced in one line and where the mold-receiving or upper die is adapted for different shapes of ware, as will hereinafter become apparent.

The upper extremity of the turret 81d is formed with a shoulder and trunnion to receive a gear 81f, which is rotatably mounted thereon, the gear being recessed to house a resiliently mounted latch or detent 81g, (see Fig. 12A), the shoulder being formed with a number of recesses in accordance with the number of extruding cylinders 81e, here three. After the gear and detent assembly have been applied, the gear is secured from displacment by a cap 81h. The side of the turret 81d is also bored to receive a spotting or positioning detent assembly 81i, see Fig. 12, and the side wall of the pivot post 81c is formed with a plurality of notches, here three, so that when the turret is rotated to its approximate angular position, it is spotted by said detent.

The upper extremity of the pivot post 81c is threaded and thereon is adjustably mounted a lever-supporting bracket or post 82, the lower extremity of which is rounded and enlarged as at 82a and threaded over the post 81c and secured by lock nut 82a', said bracket 82 also being cast with a branch bracket 82b. On the upper extremity of this bracket 82 a lever 81j is adjustably pivoted as in Figs. 7 and 7A, said lever 81j terminating to a gear segment, 81k, which is in continual mesh with the turret gear 81f. The lever 81j is oscillated by a groove cam 81l, (see Fig. 13C), which is formed with a groove 81l' and adjustably secured as in Figs. 7B and 7C on the shaft 80a, said lever being provided with a pin 81j' which engages in said groove.

As the cam 81l rotates, lever 81j is oscillated, thus oscillating turret gear 81f, the length of the stroke being adjusted in accordance with the angular spacing of the detent slots in the shoulder of the turret 81d. Thus if the turret is to be intermittently rotated counter-clockwise, the detent is turned so that the toe of its beveled end faces in that direction, and if clockwise, the detent is simply turned in its socket accordingly, while if the turret is to be oscillated back and forth, the detent is turned to an intermediate position, as in Fig. 12A.

As the clay is progressed into the chambers 81b3 it is extruded therefrom in measured charges by reciprocating plungers, each of which comprises a stem 83, which is hollow or formed with a longitudinal bore 83a, the lower extremity of the plunger being threaded to adjustably receive a socket 83b, in which is threaded a porous head 83c composed of material such as plaster of Paris and having a chamber 83c' therein, the bore 83a terminating in said chamber, (see enlarged view Fig. 13E). The head may be secured in adjusted position by a lock nut 83d. The stem 83 extends upwardly through the top of the cylinder 18e, which is provided with a packing gland 83e, said cylinder being formed with an extension guide bracket 81e' for said stem, the latter moving upwardly against the compression of a spring 83f, which encircles the stem 83 and is adjustable by a collar 83g threaded on said stem. A contact nut 83h is also adjustably threaded on the stem 83, to adjust the lowermost point of reciprocation or travel of the plunger.

The extruding plungers are forced upwardly against the compression tension of springs 83f by a lever 83i, adjustably pivoted at one extremity (see Figs. 7 and 7A) on the bracket 82b, and at its opposite extremity said lever has pivotally mounted thereon a hook 83j, adjustable by turnbuckle 83j' said hook engaging under a collar 83k, which is adjustably secured on each plunger stem 83. Lever 83i is actuated by a cam 83l, which is adjustably mounted as in Figs. 7D and 7E on the shaft 80A.

Means are provided for applying a treating medium, such as super and sub-atmosphere, electricity or other fluid to the clay charges, the rounded part 82a of bracket 82 and the upper extremity of post 81c being formed with registering bores or passages 83m and 83n which register with bores or passages 83m' and 83n' formed in the turret 81d, the passage 83m' connecting with the plunger bore through a hose 83o and the passage 83n' leading down through the turret and terminating in an upper die or former generally designated by the numeral 84 and which will now be described. The passages 83m and 83n are provided with nipples for attaching the hose 73 thereto for the control valves 72, Fig. 10.

Upper die attachments for feeder

While the type of upper die or former 84 shown applied to extruding cylinder 81e in Fig. 13D and in enlarged section in Fig. 13E may serve satisfactorily for both shallow and deep ware, it is preferred to use this form principally for shallow ware and that shown in Fig. 13F for deep ware, the two dies or formers embodying the same advantageous features of construction with modifications in shape to adapt them to the type of ware produced. The numeral 84a designates the body of the die, which is supported by a flanged ring 84b, detachably secured over the open bottom portion of the extruding cylinders 81e by bolts 84c, the body being formed with clay deflectors 84d, which project upwardly into the chamber 81b3 and prevent the compacting clay from imposing undue lateral strain on the plunger stem 83. The surface of the body block 84a is formed with a series of annular grooves 84e, over which a porous facing 84f—which may be cast of plaster of Paris—is secured by the ring 84b, the body 84a being bored to provide a passage 83n2 which communicates with the passage 83n' and whereby a treating fluid or medium may be admitted to said grooves 84e and applied to the clay charge through the porous facing 84f, or if it is desired to facilitate application of the fluid, the facing may be vented in a manner similar to the vents 53e' shown formed in the plaster body 53b of the mold. A predetermined number or all of the grooves 84e may be in communication by forming a connecting duct 84e' through the ribs which result from grooving the under surface of the die.

The forming molds shown in connection with the feeder and remaining fabricating units are of a slightly modified construction relatively to those shown in Figs. 8 and 8A, the plaster body 53b and metal base 53a being exteriorly threaded and secured in assembled relation by the ring 53c. The base may be of open construction as in Fig. 8 or formed with passages to establish independent communication with the chuck passages 62a, 62b and 71.

Heating or analogous temperature-regulating elements may be disposed in the plunger head chamber 83c and the annular grooves 84e, to control the temperature of the porous head 83c and facing 84f, and in Fig. 13E electric coils 84g and 84h are shown in said chamber and grooves, the coil 84g being supplied with current through wires inserted through the plunger stem and which may lead to one of the plunger switches shown in Fig. 10 or any other suitable control switch, and the coil 84h being connected by wires to wiper contacts 84h' and 84h2 which contact with commutator rings 84h3 and 84h4 mounted on the pivot post 81c, Fig. 13D, and which may also be supplied with current under control of one of the valve switches or other convenient control switch.

The die or former shown in Fig. 13F is adapted for deep ware and permits rotation of the mold during the feeding operation, the body 84a being convex instead of concave and threaded into its supporting ring or plate 84b, the latter being secured to the cylinder 81e. In this instance, also, a resilient contact is provided between the mold and upper die, a ring 84i, preferably of porous material and formed with a chamber 84i', being applied around the body 84a prior to application of the porous facing 84f, which in this instance is threaded on said body, this ring being contoured to form the brim of the ware and yields upwardly against the compression tension of a spring 84j, which is inserted over the body 84a between said ring 84i and an adjusting collar 84k. When the mold elevates it first contacts with the ring 84i and moves upwardly a short distance therewith and as this ring is rotatable, the mold may be rotated during the feeding operation, and when the mold lowers, the ring being under pressure will assist in releasing the clay from the porous facing. By rotating the mold, the ware may be profiled or shaped during or subsequent to the feeding operation, the porous facing serving as the usual separately mounted profile.

General operation of feeder assembly

To provide for progressing different grades and mixtures of clay into one conduit and feeding a particular mix or grade into a particular advancing line or lines of molds, it is preferred to mount the progressing and compacting assembly shown in Fig. 13 at both ends of the conduit 81, and the extruding orifices along the conduit may be separated from one another by slide valves 81m. Thus a certain grade or mix of clay may be progressed into each end of the conduit and maintained separate by the slide valves, or if it should be desired to feed a different grade or mix of clay to each line of molds, a separate feeding chute and screw could obviously be provided for each extruding assembly.

The feeder assembly as a whole is adapted for use with the mold-actuating units described in connection with Figs. 9 and 9B, and it will be seen that the charges of clay may be treated on all sides, viz.: through the plunger head 83b, upper die or former and the mold.

The operation of the feeder should now be understood. The clay may be deposited in the hopper 78o in the usual cylindrical roll as it is taken from the conditioning apparatus, the screw 18a being intermittently actuated to progress and compact the clay in a homogenous mass into the conduit 81, from which it is forced upwardly through the chamber 81b. If the turret is to be rotated to feed different types of molds in succession, the detent 81g is turned in the proper direction, and as the openings 81b' and 81b2 register, the clay passes into the chamber 81b3, from which the feeding plungers eject or extrude and segregate it in measured charges against the molds, which are preferably elevated to the upper die and form a confining chamber substantially bounded on all sides by porous material and into which the clay is extruded, the descending plunger completing the walls of the chamber. The feeding plungers need only be raised to a point sufficient to permit approximately the correct quantity of clay to pass into the feeding orifices—the side walls of which form an accumulating chamber or well—and at which time it is preferred to partially rotate the screw 78a, whereupon the descending plungers move into the orifices and eject the clay in the form of a column onto the molds with sufficient force to cause it to adhere thereto, and it is preferred to adjust the mold-actuating mechanism so that the molds meet the extruding column, which through contact with the side walls of the extruding orifice assumes a bulbous shape, note Fig. 13H, the column spreading radially over the molds and expelling the air from the gradually closing chamber, note Fig. 13I, until the molds and upper dies meet, at which time or shortly thereafter the charge is completely extruded by the descending plunger head.

It is preferred to leave a clearance space between the plunger head 83c and side walls of the extruding orifice or well, to permit back extrusion of excess material into the chamber 81b3.

Fig. 13J illustrates how, in applying the bat or disc shaped charge to the mold as heretofore practiced the clay disc or bat flattens on a mold of irregular surface contour, the clay first striking the high parts of the mold, leaving spaces in which air is entrapped and which often results in bad ware. The improved feeder used in practicing the method herein described applies the bat or charge so that there is practically no air entrapped between the clay and mold. However, if there should be any air in the clay or entrapped between the clay and mold when applying the charge under any circumstances, suction may be set up through the porous mold, plunger head and die facing, which will not only withdraw air but increase adhesion of the clay to the mold and withdraw excess moisture as well and speed up the drying action. The effect of suction is auxiliated by the mechanical pressure exerted on the clay by the extruding plungers.

No attempt is made herein to enumerate the many methods of treating the clay charge through the porous walls which encompass the chamber formed by the mold, die facing and plunger head and into which the charge is extruded. However, in the event the clay should adhere to the upper die and plunger head, air under pressure may be applied to ensure release of the clay, or a suitable fluid or liquid applied so that the plaster head and facing will be maintained in a moist and slippery condition, and in conjunction with the foregoing, sub-atmosphere or suction may be applied through the porous mold which will cause the clay to adhere thereto and also evacuate excess moisture and air pockets. The vents 53e' may be formed around the mold where the peripheral edge of the ware terminates so that when suction is applied, it will assist the expansion of the charge and ensure complete coverage of the mold. Ordinarily, the porous material will permit the treating medium to pass therethrough and it will not be necessary to provide ducts or vents unless it is desired to selectively apply said medium. By establishing a subatmospheric condition between the chuck and mold, the latter will be held firmly on the chuck and be prevented from sticking to the upper die if there should be any tendency in that direction. In the event it is desired to apply super-atmospheric pressure to the under-portion of the mold, the chuck may be magnetized to maintain the mold and chuck in association.

It will be seen that the drying of the ware and extent and time of adhesion and/or release of the ware relatively to the mold walls is under artificial control and therefore may be positively timed to conform with the various fabricating operations as the ware is advanced along the fabricating line without retarding or delaying production.

In the manufacture of ware embodying a comparatively stiff dry clay, by applying super-atmosphere or air under pressure to the mold walls, the ware may be immediately released without distortion and without applying oil or other non-adhesive mediums to the mold walls prior to applying the clay bat and which ofttimes have a deleterious effect on the ware.

*Method of feeding and feeder attachment for dry clays*

In the manufacture of ware requiring a non-viscous clay or clays comprising a comparatively large amount of silicon, such as those used in producing vitrified ware, great difficulty is usually experienced in previous known methods in causing the clay bat or charge to adhere to the mold and in preventing ruptures and cracks due to radial and peripheral expansion. In shaping this type of ware, it has been the custom to preform the clay bat or charge by pressing or flattening a ball of clay into the form of a disc between two flat surfaces and then throw it on the mold. The bat is then shaped by the usual process of rotating the mold adjacent a profile. This method causes cracks and ruptures in the ware due to the radially and peripherally expanded bat and action of the profile thereon, which causes the bat to creep on the mold and tear or rupture, it being usually very difficulty to cause the bat to adhere to the mold.

Fig. 13G shows a feeder attachment particularly adapted for producing ware from non-viscous clays, the clay being fed by pressure to the peripheral portion of the mold and thence inwardly toward the center, or convergingly, or to both the peripheral and central portions of the mold, to thereby prevent cracking or rupture of the clay due to radial and peripheral expansion or stretching of the clay. The upper die body 84a is provided with posts by which it is secured by screws to a supporting ring 84b', and the plaster facing is secured direct to the die instead of being held in position by the ring 84b, the latter in this instance serving as an enclosing housing which forms a chamber 81b4. The central plunger head 83c with its socket 83b is resiliently mounted relatively to the stem 83 and in addition thereto a peripheral plunger 83b' is provided, said latter plunger also having an annular chambered porous head 83c2 secured thereto, the stem 83 having adjustably threaded thereon a socket 83b2 which is extended radially in the form of a spider to avoid the posts of the die body, the annular peripheral portion of the spider forming the plunger 83b' which has a sliding fit in the chamber 81b4. The central plunger socket 83b is flanged and has a sliding fit in a ring 84l, which is adjustably threaded in socket 83b2, a plunger spring 84m being seated in said socket to give the resilience aforesaid. A suitable treating fluid or medium may be conducted to the chambers in the porous plunger heads 83c and 83c2 through the bore 83a in the plunger stem 83, which branches off and leads through the spider portion of the plunger to the chambered head 83c2.

A preferred operation is as follows:

The clay is forced by pressure from the chamber 81b3 into the chamber 81b4, from which it is applied under pressure by the outer annular plunger 83b' to the peripheral surface portion of the mold, the clay converging toward the center of the mold. The central plunger is preferably adjusted so as to descend with the outer plunger and close the central orifice, but when the converging clay reaches the central orifice, its pressure causes the central plunger to rise against the pressure of spring 84m, thus permitting excess material and also any excess moisture that may be present at the converging point to pass back into the chamber 81b4. When the outer plunger reaches its lowermost position and the clay ceases to pass upwardly through the central orifice and back pressure is removed, the central plunger descends to normal position, thus segregating the extruded mass and completing the wall of the upper die by closing the central orifice and eliminating the protruding stub and smoothing and forming the central portion of the ware. It is preferred to enlarge or taper the central orifice at its upper extremity, so as to permit central plunger to gradually exert its final pressure. Super and/or sub-atmosphere may be applied at such times during the foregoing operations as will produce the best results.

By the foregoing method the clay is guided to the peripheral portion of the mold and applied thereto under pressure, the clay rolling inwardly over the mold and converging and amalgamating at a central point. This method avoids radial and peripheral expansion and stretching, with resultant cracks and ruptures in the ware.

Combined profile and feeding attachment

Fig. 13K shows the upper die shaped similar to the ordinary profile and formed with a chamber 84n and extrusion openings 84o, the clay being applied to the mold through said openings in the form of a ribbon or layer and shaped in one operation.

Tool and attachment carriage

Many of the fabricating tools and attachments are mounted on a standard form of carriage assembly substantially similar to that illustrated in Figs. 14 and 14A, for the purpose of giving them the desired movements relatively to the ware on which they are to perform.

The reference numeral 85 designates vertical guide and stop posts which are adjustably secured in and depend from one of the top plates 38c of the machine, (see Fig. 1), a frame 85a shown as of rectangular shape being mounted to have a vertical sliding fit on said posts, nuts 85b being threaded on the lower extremities of said posts to adjustably limit the lowermost point of travel of said frame. The frame 85a is formed with a bracket 85c, which is bored to receive a pivot bolt 85d, which is adjustably secured by nut 85d', a lever 85e being pivoted at one extremity in said bolt and at its opposite extremity adjustably and pivotally supported as in Figs. 7 and 7A from a post 85f, which also depends from and is secured in the top plate 38o. This lever 85e is provided with a cam roller 85e' adapted for contact with various types of frame-actuating cams shaped in accordance with the work involved and which are mounted on one of the cross shafts 80a, or if the variable speed assembly is used, on the sleeve 68, these cams being shown in connection with the various attachments hereinafter described.

The lower portion of the frame 85a is formed with a dove-tail slot or groove in which a bar 85g is mounted to have a horizontal sliding fit, the bar at the left as viewed in Fig. 14 being formed with a vertical guide bracket 85h having a central slot or track 85h'. A lever 85i provided with a cam roller 85i' is pivotally and adjustably supported at its upper extremity as in Figs. 7 and 7A from a post 85j, and at its lower extremity said lever is provided with a pin 85i2 adapted to have a working fit in said track 85h'. As in the case of lever 85e, the cams for the lever 85i are given the required contour in accordance with the work involved and are mounted on one of the cross shafts 80a or sleeve 88, each attachment generally requiring a particular contoured cam which is illustrated in connection with the attachment.

The bar 85g is slotted at 85k, a pin 85k' being secured in the frame 85a, a compression spring 85k2 being mounted to abut at opposite ends, respectively, against said pin and the bar 85g. The bar 85g is also provided with a screw bracket 85l in which a contact screw 85m is mounted, which serves to adjustably limit the movement of bar 85g in one direction independently of its cam travel or reverse movement. The screw bracket 85l is adapted to be attached at either end of bar 85g and the spring 85k2 at either end of slot 85k, to conform to the positive direction of movement of the cam lever 85i.

It will be seen that when levers 85a and 85i are oscillated, the frame 85a reciprocates vertically and in the bar 85g laterally the bar deriving its vertical movement from said frame. The frame is provided with screws 85n and 85o adapted to be adjusted in contact with the posts 85 and the frame 85a in the event the actuating cams are to be disconnected and the frame and bar set in rigid adjusted position.

An attachment and tool-mounting turret disk 86 is supported from the slide bar 85g by means of a hanger bracket 86a, said bracket being formed with projecting hub portions 86a' and 86a2, (see Fig. 14B), and is secured to the bar 85g by screws 86a3, see Fig. 14A, the disk 86 being rotatably mounted on the hub 86a' and prevented from lateral displacement by a ring 86a4. A shaft 86b extends through and has bearing in the projecting hubs of bracket 86a, this shaft functioning in a manner which will later become apparent. The disk, like the feeder turret 81d, may be rotated intermittently in one direction or oscillated, the detents 81g and 81i being housed, respectively, in a gear 86c and the bracket 86a and adapted to register in detent or latch notches 81g' and spotting notches 81i' formed in one side of said disk 86, there being four of each of said notches in the present instance. The gear 86c is mounted to rotate free on the bracket hub 86a' and the teeth 86c' of said gear are in continual mesh with the teeth 86d' of a rack 86d, the latter being slidably dove-tailed into a groove formed in the bracket 86a, see Fig. 14B, and terminating in a T-head 86d2, see Fig 14, which is formed with a track 86d3. The rack 86d is actuated by a bellcrank lever 86e, which is fulcrumed at 86e' on a bracket extension 86e2 formed on the frame 85a, the one extremity of said lever 86e being provided with a pin 86e3 which has a sliding fit in the groove or track 86d3, while the opposite extremity of said lever has pivoted thereto a connecting rod 86f which extends through a guide bracket 86f3 and terminates in a T-head 86f' formed with a groove or track 86f2, said T-head cooperating with a lever 86g pivotally supported at its upper extremity as in Figs. 7 and 7A from a post 86h, which is secured in one of the top frame plates 38o, and at its lower extremity said lever is provided with a pin 86g' having a sliding fit in the groove or track 86f2 of T-head 86f'. Lever 86g is provided with a cam roller 86g2 adapted to contact with a suitably shaped cam to be mounted on shaft 80a, these cams also being generally shown with the respective attachments hereinafter described. A retracting spring 86d4 is secured at opposite extremities, respectively, to the T-head 86d2 and the bar 85g.

A screw 86i is shown as threaded in the bracket 86a, see Fig. 14B, this screw being adjusted against the turret disk 86 when it is desired to maintain said disk stationary with said bracket. A screw 86j is also shown threaded in the hub 86a2 of bracket 86a, and this screw may be adjusted against the shaft 86b when it is desired to maintain the latter stationary with said bracket.

The disk 86 is provided with a plurality of holes 86k for attaching various fabricating tools and attachments, such as shaping tools, turning and finishing tools and transfer chucks, which will be described in connection with each respective fabricating operation.

The shaft 86b may be driven by either a positive or friction drive, both forms of drive being shown in Figs. 14A and 14A¹ for the purposes of illustration.

A bevel gear 87, formed with a hub 87', is shown as adjustably secured on the shaft 86b, this gear meshing with a similar gear 87a secured on a stub shaft 87a' which has bearing in the projecting extremity of a bracket arm 86a5 formed as part of the bracket 86a. A bracket 87b is adjustably supported by a post 87b' from one of the top frame plates 38c and extends down and at its lower extremity is formed with a foot 87b2, a stub shaft 87c having bearing in said foot, this shaft forming part of a flexible coupling comprising a sleeve 87c' and longitudinally grooved shaft 87c2 in spline-sliding engagement with said sleeve, the lower extremity of shaft 87c2 being coupled for universal movement with the stub shaft 87a' on which gear 87a is secured. The stub shaft 87c of the flexible coupling has adjustably secured thereon a pinion gear 87d, which may be replaced by a friction gear 87d', see Fig. 14A¹, when a non-positive, intermittent or continuous high-speed drive is desired. If pinion 87d is used, the drive is effected by means of a segmental gear 87e formed on a lever 87e', which is adjustably pivotally mounted as in Figs. 7 and 7A on the bracket 87b and provided with a cam roller 87e2 adapted to contact with a cam to be mounted on shaft 80a or sleeve 68 and which may be given various contours in accordance with the rotation desired for shaft 86b. The lever 87e' may be retracted by a spring 87f.

If the friction or non-positive drive is desired, the 87d' may be substituted for pinion 87d and a cooperating friction gear 87g splined or mounted for longitudinal sliding movement on shaft 80a or sleeve 68, the latter gear being formed with a hub having an annular groove 87g' formed therein. A grooved cam 87h, adjustably mounted on shaft 80a, transmits longitudinal movement to friction gear 87g by means of a pin 87i, slide rod 87i2 and pin 87i', the pins 87i and 87i' being adjustably secured on slide rod 87i2 which in turn is mounted to slide longitudinally in adjustable supporting brackets 87j which extend upwardly and are secured in one of the frame plates 38c.

If the rotation of shaft 86b is to be alternately reversed, the drum cam 87h may be used, this cam movement causing the friction gear 87g to move across the face of gear 87d', and when the gear 87g passes over the vertical axis of gear 87d', the rotation of said gear will be halted and then reversed, thus reversing the drive on said shaft 86b.

The jack shaft 68f of the change-speed assembly previously described in connection with Fig. 14D is shown as mounted and having bearing in hanger brackets 87j' which are also adjustably supported by posts 87j2 from one of the frame plates 38c.

Some of the fabricating attachments are shown mounted directly on the turret disk 86 while others are shown mounted on a turret 88, see Figs. 19G and 14C, which is secured to the disk 86 by screws 88a. This turret may be rotated in accordance with the particular attachments in use. If there are four attachments on the turret and all are being used in succession, the lever 86g may be actuated by a cam substantially similar to cam 86g3, see Fig. 15E.

Super and sub-atmosphere, electricity and other fluid mediums may be communicated to the various fabricating attachments that may be applied to the turret disk 86, see Figs. 14B and 14C.

For super and sub-atmosphere, liquids and analogous fluids, the bracket 86 is bored to provide passages or ducts 73e and 73f, which lead through the hub 86a" and register with passages 73e' and 73f' formed in the turret 88, these latter passages terminating in annular grooves or chambers 73e2 and 73f2. The fragment of the turret 88 shown in Fig. 14C is provided with a rotating spindle or post which is formed with passages 73e3 and 73f3 which register at one extremity with said chambers and at their opposite extremities terminate at the point of application. Hose nipples 73e4 and 73f4 are secured in the bracket 86a, see Fig. 14B, for connection of the air or fluid lines leading to the control valves 12, Fig. 20.

To supply the various attachments that may be applied to the turret 88 or disk 86 with electric current, the bracket arm 86a5 may be formed with a projection on which are secured brushes 67k and 87l, Fig. 14C, which are adapted to contact with suitably insulated commutator rings 87k' and 87l' secured in the adjacent side of the disk 86, said rings being connected with another set of commutator rings 87k2 and 87l2 secured on the periphery of said disk and which in turn transmit the current to the attachment through contacts or rings 87k3 and 87l3 secured in the attachment, a fragment of the latter being shown in Fig. 14C.

Preforming

After the feeding operation, the molds are advanced to the next station, at which point the ware may be subjected to a preforming operation preparatory to profiling, or receive additional material for utility or decorating purposes prior to profiling, the assembly for applying additional material being described in connection with Fig. 17.

To preform the ware, upper dies substantially similar to those shown in Figs. 13E and 13F may be utilized by simply attaching the same to a block or casting 89f, see Fig. 17D, which may be mounted on the turret 88. The feeding orifice in these dies may be closed when preforming, or a plunger may be utilized to close the orifice to complete the preforming operation. The die may be reciprocated in contact with the mold or vice versa, or both the upper die and mold reciprocated, it simply requiring an oval-shaped cam for lever 85e to reciprocate the die. Any tendency of the clay bat or charge to adhere to the upper die may be overcome by applying a suitable fluid medium as in the feeding operation. If the ware is of uniform shape in the same line of molds, the turret 88 need not be rotated, while if molds for differently shaped ware are moving under the preforming die in series, the lever 86g may be actuated by cam 86g3, see Fig. 15E.

Profiling

The profile and trimmer assemblies are shown in Fig. 15 as being mounted directly on the turret disk 86, there being four profiles 90, 90a, 90b and 90c shown, so that four different kinds of ware may be shaped in succession, or the turret disk oscillated to alternately move any two profiles into operative position. The profiles are adjustably secured to the disk 86 by slotting the disk and profile at right angles to receive attaching bolts, as at 90d. Excess material openings 84o, see Fig. 15D, sloped so as to present a scooping edge counter to rotation of the mold, are pereferably formed in the profiles, these openings terminating in a cavity or channel 84n as in Fig. 13K but serving a different function in this instance.

The profile 90 is for undercut ware, see Figs. 8L and 15, and is provided with a resiliently mounted brim forming ring 90e having a brim-contacting porous or plaster insert 90f threaded therein, an annular chamber 90g being formed at this point, said chamber being supplied through a duct 90g' and hose nipple 90g2 with a treating medium such as sub or super atmosphere or other fluid. The ring 90e is rotatably mounted in a bearing or supporting ring 90h and held against displacement by pins 90h', so that the ring 90e may rotate with the mold while its supporting ring 90h remains relatively stationary, the hose nipple 90g2 being secured in the ring 90h and the latter formed with an annular groove or chamber in registration with the supply duct 90g'. The ring 90h is secured by threaded pins 90h2 to a bracket 90i, springs 80j being inserted over said latter pins to provide a resilient mounting for the assembly. The bracket 90i is slotted at 90k for the securing pins or bolts for the profile so that the profile and ring assembly have a relative lateral floating association.

It will be noted that the ring 90e centers on the tapered top portions of the sections 59a of the partible mold 59 and clamps or braces the said sections during the profiling operation.

When the profile is removed from the interior of the undercut ware, it is first moved toward the left as viewed in Fig. 8L by cam 83i3, Fig. 15E, which actuates lever 65i for this form of profile attachment, and then elevated by cam 85e2, which actuates lever 85e, while at the same time the mold may be lowered. It will be understood, however, that cam 85e2 could be dispensed with and the molds lowered sufficiently to clear the profile. Segment lever 87e is actuated by cam 87e3 for the purpose of rotating shaft 86b, which in the case of the profile assembly has adjustably secured thereon a trimmer-depressing cam 91, see Fig. 15, which depresses a trimmer 91a against the compression of a spring 91b, said trimmer being slidably mounted in brackets 91c, which may be formed on the profile, and has adjustably threaded in the top thereof a contact screw 91d which contacts with cam 91.

It will be noted that the profile 90 does not require a trimmer in view of the ring 90e with its brim-contacting insert 90f.

To ensure accurate positioning of the profile relatively to the molds and uniform thickness of the ware, a contact screw 62k' may be adjustably mounted in a bracket 62k2 secured to the turret disk 88, said screw being adjusted to contact with screw 62k threaded into the top of the pitman 62g, Fig. 9. When the mold and profile reach their approximate operative positions, the screw 62k and 62k' contact and the profile moves a short distance in unison with the mold.

If it is desired to produce irregular-shaped ware such as ovals and the like, the mold may be provided with a ring cam 92, contoured in accordance with the ware to be produced, the profile being guided by any suitable cam-contact means such as screws 92a and 92b, which are adjustably mounted in a bracket 92c secured to the disk 86, the screw 92a guiding the profile vertically and the screw 92b laterally, and as the slide bar 85g to which the turret disk 86 is is secured has a resilient yielding action in one direction and the frame 85a yields vertically against gravitational weight, the cam 92 may serve to guide the profile in shaping irregular-shaped ware. The profile could also be given the desired vertical and horizontal movements in producing irregular-shaped ware by the use of suitably-contoured cams for levers 85e and 85i.

A suitable fluid such as water may be automatically applied to the clay charge during profiling through the passages 73e and 73f, one of which in Fig. 15 is shown as having a tube connected thereto which terminates in a valved nozzle 90l. The fluid may be controlled by one of the valves 72, Fig. 10.

Figs. 15B and 15C illustrate a simplified form of profile assembly which it may be desired to use when the ware in one line is of the same shape. In this instance the assembly may be adjustably supported from one of the top plates 38c by posts 90m. The profile 90a is adjustably secured on a slide bracket 90m' which in turn is mounted for vertical sliding movement in a guide and supporting bracket 90m2, the latter being supported by said posts 90m. The bracket 90m' moves vertically against the tension of a spring 90m3 secured at opposite extremities, respectively, to said bracket 90m' and bracket 90m2. The slide bracket 90m' has adjustably secured on top thereof a stop member or washer 90m4, which contacts with the guide bracket 90m2 when the profile is in its lowermost position. The trimmer 91a is adjustably secured on a bracket 90m5 which may be cast integral with, or secured to the bracket 90m2.

In operation, the screw 62k' may be adjusted relatively to screw 62k (Fig. 9), so that when the mold elevates, these screws will contact when the profile has smoothed the ware to a predetermined thickness, whereupon the mold and profile move in unison to a point where the trimmer operates, after which the mold with the formed ware is lowered onto its tray 39. The horizontal operating position of the profile may be definitely limited by screw 85m and its angular position definitely spotted by the detent 81i, see Figs. 14 and 14B.

A bracket 92c carrying screws 92a and 92b may obviously be applied to the turret disk 86 for each profile assembly, and the use of this feature is not confined to the production of irregularly shaped ware, but said screws may serve as an alternate means or in addition to horizontal limiting screw 85m and vertical profile-limiting screws 62k and 62k', for definitely limiting the horizontal and vertical operating position of each profile assembly.

Fig. 15D shows a profile through which excess material may be removed from the charge or additional material applied to the charge during profiling. The openings 84o are formed in the profile as in the feeder attachment, Fig. 13E, the profile being adjustably threaded on a trunnion 89b terminating in a bevel gear 89a, the gear and trunnion having bearing in the turret 88, which is attached to disk 86. The gear 89a and trunnion 89b are formed with an orifice opening 89c which terminates at its upper extremity in the form of a hopper 89d, see Fig. 17D, and through this hopper and orifice additional material may be applied to the ware for decorating and other purposes as will be more fully described in connection with Fig. 17. The gear 89a is in continual mesh with a ring gear 89, (more fully shown in Figs. 19F and 19G), which is secured on the shaft 86b, the latter being driven independently of the turret disk 86 as described in connection with Figs. 14 and 14A. Thus either or both the profile and mold may be rotated during the shaping operation.

The profile may be secured in adjusted position on the trunnion 89b by a screw 89e. The passage 73e' supplies the nozzle 90l for applying water or other fluid during profiling, while the passage 73f' may have suction set up therethrough to withdraw excess material from chamber 84n, this excess material being forced in through the openings 84o, which are preferably sloped so as to scoop the excess material from the charge as the mold and/or profile rotates. The passage 73f in the profile may be regulated by a screw 90n.

Excess Material

As the profile shapes the ware, the excess material is forced into the openings 84o and chamber or cavity 84n, from which it is removed by pressure, which may if desired be aided by suction, into a conduit member 93, see Fig. 15A, formed with a segmental flange 93a, to facilitate registration with a conveying conduit 93b. The conduit 93b may be supported from the adjacent stationary frame of the apparatus and is positioned so that the enlarged or flared inlet thereof yields slightly and registers with the flanged terminal 93a of the conduit 93 when the turret is given a partial turn to bring one of the profiles into operative position, or the conduits 93 and 93b may remain in registration if only one profile is in use, a screw conveyor 93c being mounted in the conduit 93b to remove the excess material therefrom.

It will be obvious that suction could also serve to withdraw the material in place of a screw, and the excess material may be conveyed to a suitable place of deposit or the conduit 93b may convey the material to a receiving trough 93e, see Figs. 16 and 16A, having a screw conveyor 93f therein. The trough 93e forms part of a pan 93g, which is adjustably supported from one of the top frame plates 38c by posts 93g' said pan being disposed transversely of the machine across the chucks 62 and having an opening for each mold to elevate through when profiling, each opening being substantially encircled by an annular trough 93h which opens into the trough 93e, see Fig. 16, and as the mold moves vertically through its pan opening, its sloping peripheral edge contacts with and carries upwardly a short distance therewith a ring 93i provided with radially projecting vanes 93j which follow the contour of the trough, see left-hand portion of Fig. 16A, and as the mold rotates, the excess material thrown off by centrifugal action as well as that resulting from the trimming operation and the excess material not carried away through the profile falls onto said ring and into the annular trough 93h, the vanes 93j operating to disintegrate and mix the material and throw it off into the trough 93e, from which it is taken by the conveyor 93f, which may be driven in any suitable manner as from one of the drive shafts of the machine. While the rings 93i lend themselves to varying sizes of molds within certain limits, it may be desirable for unusually large or small molds to substitute varying sizes of rings.

Fig. 16B shows a modified form of disintegrating and conveying means, gears 93k and 93k' being rotatably mounted in the opposite extremities of the pan 93g, said gears being formed with wedge-shaped teeth which mesh with corresponding teeth or cleats 93k2 provided on a belt 93k3. Thus as the excess material moves into the trough 93e it is taken by the belt 93k3 and carried as far as the gear 93k', which thoroughly crushes and disintegrates the material and discharges it through an outlet conduit 93k4 leading to a point of deposit, a cover 93k5 being provided for the pan where the material is passed into the outlet conduit.

Figs. 16C and 16D illustrate a profile cleaner or scraper 93l, which is formed with a funnel-shaped chamber 93l' having a conveyor 93l2 mounted therein. This scraper assembly may be mounted on the pan 93g or other part of the frame of the machine so that the profile scrapes the excess material clinging thereto into the chamber 93l' when the disk 86 rotates, from which it may be taken by the conveyor 93l2 to trough 93e or some suitable point of deposit. By using a suitably contoured cam for lever 85i, the profile may be given a straight lateral movement to scrape off excess material clinging thereto.

Reshaping and decorating

It may be desirable to slip-glaze certain grades of ware or apply additional material thereto and/or reshape the ware, for decorative as well as utility purposes, and the present invention provides means whereby these operations may be automatically performed either before or after the ware has passed through the drier, this unit however being shown in Fig. 1 as acting on a line of ware just prior to moving into the drier and at which time the ware is in a plastic or pliable condition and readily adapts itself to a change in shape and also provides a more perfect bond between the ware and any coating or partial coating of additional material. This additional material may be of any desired character, such for instance as clay of a different grade and/or color than the clay of which the ware was originally formed, slip, etc., and may be applied as a smooth coating or irregularly and at the same time the ware may be reshaped if desired or remain in its original shape.

The reshaping and decorating attachments are adapted to be mounted on the carriage assembly shown in Figs. 14 and 14A and are illustrated in Figs. 17D, 17E, 17F and 17H, while Figs. 17 and 20 show a type of apparatus which may be used in applying the additional material. These attachments may be applied to the turret 88, and as the particular motion given an attachment while operating is governed by a particular type or shape of cam, it should be obvious that the cams shown in connection with the attachments are only examples for the purposes of illustration and may be varied in accordance with the work involved.

For applying additional material of a non-fluid character to the ware, it is preferred to use the pug-mill assembly shown in Figs. 17, 17A, 17B and 17C. The numeral 94 designates a horizontally disposed container formed with a bracket 94a, by means of which it may be secured to a hanger bracket 94b, in turn adjustably secured to and depending from one of the top frame plates 38c, the container being provided with a feed screw 94c, the shaft 94d of which has bearing in an end cover plate 94e, which is secured to the container 94 and provided with the usual bearing and packing gland for said shaft. A ratchet gear 94d' is adjustably secured on the projecting extremity of shaft 94d and intermittently meshes with a rack 94d2, pivotally secured at its upper extremity to one extremity of a lever 94d3, the opposite extremity of said lever being adjustably pivoted as in Figs. 7 and 7A to a post 94d4, which may be adjustably secured in and depend from one of the top plates 38c. Lever 94d3 is provided with a cam roller 94d5 engaging in an eccentric positive cam 94d6, said cam being adjustably mounted on one of the cross shafts 89a. The rack 94d2 is guided by a bracket 94d7, which may be cast on the cylinder head and has secured therein a spring 94d8, which exerts a yielding pressure on said rack, see Fig. 17A.

The container 94 is provided with a hopper 94e' and outlet orifice 94f, and to regulate the pressure and density of the material in the container in advance of the screw 94c, it is preferred to adopt the valve structure described in connection with the feeder assembly, Fig. 13, and like reference numerals are therefore used in designating corresponding parts in Fig. 17.

As the material is extruded through the outlet orifice 94f, it may be segregated into charges by a cutter 94g, see Fig. 17B, secured in a bracket 94g', adapted to slide vertically in a groove formed in an enlarged bracket extremity 94e'' of the container, see Fig. 17C, the cutter bracket 94g' having threaded therein a rod 94g2, adjustable by turn-buckle 94g3, said rod being pivotally secured at its upper extremity to a lever 94h, which is adjustably pivotally supported as in Figs. 7 and 7A from a post 94h', which in turn is adjustably secured to one of the top plates 38c. The lever 94h is provided with a cam roller 94h2, which rides on a cam 94h3; said cam being adjustably mounted as in Figs. 7B, and 7C on the shaft 89a. The lever 94h periodically raises a chute 94i into position to receive a charge of material and then lowers the said chute to prevent possible interference with other parts of the apparatus, the chute being adjustably secured at 94i' to one extremity of said lever.

The chute serves to convey the charge of material to the hopper 89d and orifice 89c of the decorating attachment in use, and pressure is then applied to spread the material over the ware on the mold preferably by a fluid-operated assembly comprising a plunger 94j, which is adjustably secured to the one extremity of an adjustable-length connecting rod 94k provided at an intermediate point with swivel joint 94k', which permits angular movement of the plunger with the attachment while at the same time maintaining it vertically rigid, the opposite extremity of said rod 94k being secured on the lower end of an actuating piston stem 94k2, provided with a piston 94k3 working in a cylinder 94k4, which may be supported on a bracket 94k5 in turn secured to the stationary frame of the machine. The cylinder 94k4 is provided with nipples 94k6 and 94k7 for attachment of the air or other operating fluid lines which may lead to the valves 72, Fig. 10.

A baffle or shield 94l is shown as secured on a bracket arm 94l', which in turn is secured to the cylinder 94k4, said baffle ensuring proper placement of the charges of material in the orifice 89c.

The charges of material are automatically equalized through the medium of a slide valve 94m, which has a sliding fit in a grooved portion of bracket 94e2, see Fig. 17C, and is provided with an opening 94m' of substantially the same size as the orifice 94f, the slide 94m having threaded therein a stem 94m2 (adjustable by turn-buckle 94m3), which is pivotally secured to the one extremity of a lever 94m4 formed with a fulcrum slot 94m5 and adjustably fulcrumed as in Figs. 7 and 7A, the assembly being adjustably supported from one of the top plates 38c by a post 94m6.

The cutter rod 94g2 is provided with a contact pin 94m7 adapted to contact with the one extremity of lever 94m4, and the piston stem 94k2 is extended and has adjustably threaded on its upper extremity a contact nut 94m8 adapted to contact with the opposite extremity of said lever 94m4. Thus by adjusting contact nut 94m8 on stem 94k2 so that it will contact with and actuate lever 94m4 and raise valve 94m such distance as will enlarge the orifice 94f of container 94 to a predetermined extent, a correspondingly increased charge will be extruded from the container, and as the cutter rod 94g2 lowers, contact pin 94m7—which may also be adjusted to a predetermined position—again actuates lever 94m4, which lowers the valve to its original position. As the pressure in cylinder 94k4 may be regulated so that in the event the plunger 94j descends on a charge of such quantity as will impose more than a predetermined amount of resistance to said plunger, the latter will only press a certain amount of the material cut over the surface of the ware and the contact nut will not then actuate lever 94m4 as much as in the case of a reduced charge, thereby reducing the size of the orifice 94f in the first instance and increasing its size in the latter instance.

If the additional material is of a fluid nature, such as slip for glazing certain grades of ware before firing, the material may be applied to the ware by means of the charging and measuring device illustrated in Fig. 20 and which is also utilized in applying handles and other appendages to the ware as will hereinafter become apparent, part of the apparatus illustrated in Fig. 20 being concerned with this latter phase of the method and will therefore be subsequently described in connection therewith.

This charging and measuring device comprises a casing 95, which may be adjustably supported from one of the top frame plates 38c by a bracket 95a, the lower extremity of which is of angle shape and bored to receive an externally-threaded sleeve 95b, the latter being adjustably secured by nuts 95c, the lower extremity of said sleeve terminating in an externally and internally-threaded socket head which is threaded into the casing 95. The casing 95 is provided with an inlet port 95d and outlet port 95e controlled by check valves or analogous means, the port 95d having a pipe or hose connection 95d' with a source of supply such as a slip tank or the like, and the port 95e having connected thereto a pipe 95e' formed with a valved T-head, to which pipes or hose members 95e2 and 95e3 are connected, both of which lead to the point of application, the hose 95e2 being herein referred to as the one used for the ware decorating and slip glazing attachments and the pipe 95e3 for handle or appendage work, to be described. The casing 95 is shown as being formed with additional ports 95f and 95g, the port 95f having a pipe connection 95f', provided with a check valve assembly 95f2, said pipe 95f' leading to the supply tank, the object being to expel any fluid or slip that may enter the casing chamber above the piston 95h or which may leak past said plunger, and the port 95g is also provided with a check valve assembly 95g' to which a hose or the like 95g2 may be connected for withdrawing excess material when the device is used for appendage work or the port 95g may remain open and serve simply as an air inlet port. A plug 95g3 is shown inserted in the casing 95 below port 95g, to provide for interchangeability of the position of said port.

The plunger 95h is secured on the lower extremity of a stem 95h', which has a working fit in the sleeve 95b, a packing gland 95h2 being threaded in the socket head of said sleeve and the piston 95h also being provided with the usual rings or analogous means to prevent leakage, said stem projecting upwardly through an arm 95a' of bracket 85a, a compression spring 95h3 being mounted on said stem and bearing at its upper end against an externally-threaded adjusting collar 95h4, which is threaded into the arm 95a'.

The plunger is reciprocated by means of a lever 95i, adjustably and pivotally supported at one extremity as in Figs. 7 and 7A from a post 95i', which is secured to and depends from one of the top plates 38c, and at its opposite extremity said lever is bifurcated and pivotally secured to a pivot block 95h5 which is adustably secured on stem 95h' by upper and lower collars 95h6. Lever 95i is provided with a cam roller 95i2, adapted to contact with a cam 95i3, which may be adjustably mounted as in Figs. 7D and 7E on one of the cross shafts 80a.

It will be noted that the pressure of piston 95h on the charge may be regulated by adjusting spring 95h3, which may ensue while in operation, and as the fulcrum point of lever 95i and angular position of cam 95i3 may be varied while in operation, the reciprocation and phase of reciprocation of said plunger may be likewise varied, to thereby measure the charges of material and time and pressure of application of the same while the device is operating to deliver the charges.

To provide for automatic equalization of the charges as in the pug mill assembly, Fig. 17, the lever 95i is formed with a toothed portion 95i4 which coacts with an adjustable-length contact pin 95j, adjustably secured in a stud arm 95k, the latter in turn being formed with a hub and ball-crank extremity 95k' and adjustably secured on a supporting bar or shaft 95k2 which is journaled in the one extremity of the angle bracket 95a. An adjustable-length connecting rod 95k3 is pivotally secured at opposite extremities, respectively, to the bell crank 95k' and the one extremity of the lever 94m4, the fulcrum assembly of the latter being secured to the bracket 95a instead of post 94m6 as in Fig. 17.

In operation, the contact collar or nut 94m8 may be given a predetermined adjustment to contact with lever 94m4 at each stroke of piston 94k3, thus causing an upward thrust of rod 95k3 and oscillating contact pin 95j varying distances to engage the teeth 95i4 formed in lever 95i, depending upon the lowermost travel of contact nut 94m8 and which is governed by the size of the charge. Thus, if the charge is abnormally heavy, plunger 94j will only descend to a certain point on orifice 89c and contact nut 94m8 will only give a correspondingly limited actuation to lever 94m4, upward thrust to rod 95k3 and arcuate swinging movement to pin 95j, which will accordingly limit the succeeding stroke of lever 95i.

In some instances, as in handle or appendage work where varying quantities of slip or clay are to be fed to each consecutive mold, it may be desired to vary the stroke of the charger plunger 95h independent of the cam 95i3, or impart a series of pulsations of varying extent to said plunger, and when such operation is desired, a reduction gear such as Geneva gear 95l may be secured on a stub shaft 95l', which may be mounted in bearings adjacent shaft 80a, and a motion plate 95l2 adjustably secured on the shaft 80a and adapted to intermittently actuate the Geneva gear 95l. Charge-measuring screws 95l3 are shown as adjustably mounted in spaced relation around the periphery of a wheel or disk 95l4 which may form part of the Geneva gear 95l, these screws corresponding in number to the slots in the Geneva gear. A further contact member or screw 95l5 is adjustably mounted in a side bracket on lever 95i, said screw being adapted to contact with the screws 95l3 at each intermittent partial revolution of the Geneva gear 85l. By adjusting contact screws 95l3 relatively to screw 95l5, the stroke of the charger plunger 95h may be correspondingly varied independent of the cam 95i3, and by adjusting contact screw 95l5 independent of screws 95l3, the complete cycle of strokes may be varied without varying each individual stroke.

*Decorating and shaping attachments*

The decorating and shaping attachments, examples of which are illustrated in Figs. 17D, 17E and 17F, may be mounted on the turret 88 through the medium of the trunnion gear 89a and block 89f, the attachment assembly in Fig. 17D comprising a ring 96, which is secured to the block 89f, a body member or die 96a, and a facing 96b of porous material such as plaster, the ring serving as a support or securing means for said body member and facing. The body 96a is provided with one or more chambers 96c, which may be supplied with a suitable decorating or ware coating or treating fluid through the passages 73e—73e3, 73f and 73f3 or slip may be applied to the ware through either or both of these passages and chamber, in which latter event the body 95, see Fig. 20, may be connected to either or both of the nipples 73e4 and 73f4, see Fig. 14B. The facing 96b may be provided with adjustable, removable and replaceable treating and decorating members 96d which are adapted to serve various functions such as nozzles to convey a treating and decorating medium to the clay charge or ware and/or dies for forming or applying incrustations, indentations, projections or other configurations in or on the ware.

Fig. 17DE illustrates a set of cams that may be used for the attachment just described, cam 96e actuating lever 85e and as shaped in this instance, will give the attachment head a series of reciprocations. Cam 96f actuating lever 87e' and rotating the head intermittently during reciprocation thereof, and cam 96g actuating lever 86g to turn the turret 88 to bring another attachment in position if a number of different attachments are to be placed in operation.

The chamber 96c is shown provided with an electric heating coil 96h, which is supplied with current through the contact rings 87k3 and 87l3. It will be obvious that steam or other temperature regulating fluids or mediums could be used in place of electricity.

When using the form of attachment shown in Fig. 17D, it is preferred to use the mold-actuating assembly illustrated in Fig. 9B, so that substantially the same type of cam may be used for the segment 65 as for the segment 87e, Fig. 14. Thus, the mold may be intermittently rotated in synchronism with the decorating attachment. However, any suitable type of cam may be used for the segment 65 as well as the mold-reciprocating lever 62f, to provide for synchronized or relative reciprocation and rotation of the molds with the ware thereon and the respective decorating or other attachments.

In Fig. 1 the additional material applying and decorating assembly is shown installed in the fabricating line adjacent the drier, at which point the ware will have been shaped by the profile and be still in a soft or plastic state. At this point, it may be desirable to apply a coating of slip such as Engobe, clay in a more or less plastic state and of a different color relatively to the ware, powdered, granular or fluid coloring or decorating material, and analogous decorative as well as utility mediums.

However, the apparatus may be installed at any point along the fabricating line, as will be obvious, both the pug-mill assembly and pump being adaptable to the frame plates 38c while the attachments may be readily mounted on the turret 88 and the latter secured on the turret disk 86 which forms part of the carriage assembly illustrated in Figs. 14 and 14A. If a comparatively stiff clay is used for the additional material, it may be applied through the hopper 89d and orifice 89c, the chute 94i automatically moving out of position after the charge falls into the hopper, the plunger 94j then descending into said orifice end forcing the material out over the surface of the ware.

If the pump is used, the material may either be applied through the orifice 89c or through the passages 73e and 73f, as above noted.

For an example of one of the numerous operations of which the apparatus just described is capable, let it be assumed that a layer or coating of clay is to be applied to a series of plates after being shaped, this extra layer of clay to be of a different color than the face of the plate and to have a dented or irregular surface. The contour of cams 96e and 96f would be suitable for this operation, and the cam 65b see Fig. 9B, could be shaped substantially as shown or the mold need not be rotated.

In this instance a comparatively stiff clay suitable for the pug-mill assembly could be used, the charge being segregated and falling onto the chute 94i, which may be treated by fluid exudation or otherwise to render it non-adhesive, the charge being thereby conveyed to the hopper 89d and into orifice 89c, the plunger 94j then descending and forcing the clay over the surface of the ware, the intermittently rotating and reciprocating attachment pressing, kneading and smoothing the extra layer of clay over the ware while the decorating members in the form shown in Fig. 17D form protuberances and indentations in the clay, and these members may be vented similar to a nozzle and a lubricant, coloring fluid, powder or other medium applied to the clay therethrough. If the clay has a tendency to adhere to the facing 93, air under pressure or other fluid medium may be applied through the chuck and mold to cause the clay to adhere to the latter.

In many instances only a pressing or stamping action may be required, as where the facing 96b has a design or trade-mark embossed or engraved therein, in which event certain of the cams could be disconnected and the others given a regular contour, the attachment and mold being capable of practically any desired relative reciprocatory, rotative and anuglar movements by simple and obvious modifications in the contours of the actuating cams and proper adjustment of parts.

Fig. 17I illustrates diagrammatically a number of the operating positions of the attachment and mold. Beginning at the left the attachment is shown working in vertical concentric alinement; next the attachment and mold are shown working in the same horizontal plane but out of vertical alinement; next the attachment is shown working at an angle or tilted and in concentric rotary relation with the mold while the following position shows the attachment at an angle and in eccentric rotary relation with the mold, and the last position shows the attachment and head working at right angles.

Various combinations of the foregoing working positions, too numerous to mention, may be effected, and as the cams and levers may be adjusted while in operation to adjust the phase and extent of movement of the parts controlled thereby, these working positions may also be varied and adjusted while the decorating or other operation ensues.

In Fig. 17E an attachment particularly adapted for decorating and shaping the interior of deep ware is shown, and comprises a plurality of decorating and stamping members which are illustrated as being supported from a cross-head 96i which is secured in angular spotted position to the gear trunnion 89b by the pin or screw 89e, said cross head being slotted for adjustable securement of brackets 96j, decorating and stamping units, generally designated by 96k and 96l, being pivotally secured to said brackets. The unit 96k as shown comprises a cylinder 96k', piston 96k2 having a working fit in said cylinder, compression spring 96k3 and guide pin 96k4, the cylinder being provided with adjustable heads or bushings, one of which is provided with air exhaust vents which also serve as sockets for a spanner wrench or analogous tool while the piston stem has a sliding fit in the other, the member 96k being secured on said stem.

In this instance, the material is preferably supplied through the charger 95, the hose 95e2 being attached to the nipple 73e4, see Fig. 14B and a T-head nipple being secured in the passage 73e3, Fig. 17E, to which flexible members or hose 96k5 and 96l5 are secured, the hose 96k5 connecting with a chamber 96k6 formed in the member 96k and communicating with the clay-contacting surface of said member through ducts or vents 96k7.

The piston 96k2 is preferably retracted by air or other fluid under pressure, the valve hose 73, Fig. 10, being connected to nipple 73f4, Fig. 14B, and a nipple being secured in the passage 73f3, Fig. 17E, to which a hose 96k8 is attached and connects with the cylinder 96k'.

Any desired fluid medium such as air, electricity or the like may be applied to the surfaces of the members 96k and 96l to facilitate their work.

The member 96l is shown in the form of a wheel which is rotatably mounted on a trunnion, shown in section, formed on a supporting bracket 96l' and secured against displacement by a collar 96l2, a gear 96l3 being cast integral with or secured on said wheel, said gear 96l3 meshing with a drive pinion or gear 96l4, which is secured on a trunnion having bearing in the bracket 96l. The drive is applied to pinion 96l4 by means of gears 96l6 and 96l7 and a flexible drive coupling similar to that shown in Fig. 14A, the gear 96l6 being secured on the trunnion 89b, and the gear 96l7 being mounted on an extension of cross-head 96i.

The wheel 96l is formed with an annular chamber 96l8, the material being fed to this chamber through hose 96l5 which is connected to a bore formed in the bracket 96l' and wheel trunnion and communicating with said chamber through a plurality of radial holes in said trunnion and grooves or a slot 96l9 formed in said wheel, as shown in the drawings.

While the wheel 96l is shown as provided with a driving means, it will be obvious that it could be rotated through friction with the ware or mold. However, by driving the wheel in synchronism with the rotation of the attachment and/or mold, accurate laying of the pattern, encrustation, design, etc., is ensured.

Both forms of decorating units 96k and 96l are shown mounted to operate in connection with one attachment for the purpose of illustration, but either one or the other or a plurality of each may be used together or separately.

Either or both the mold and/or the attachment may be reciprocated and/or rotated. In case intermittent reciprocation and rotation of the attachment is desired, the cams 96e and 96f may be found suitable.

Ordinarily, however, when one or a plurality of the units 96k are used, the work may be efficiently performed by simply reciprocating the plunger 96k2 and intermittently rotating the mold, or the ware may be coated or ringed by simply moving the member 96k into contact with the ware and rotating the mold or attachment.

Likewise, the wheel 96l is capable of producing effects too numerous to mention, the working surfaces of both the wheel and member 96k being adapted for applying any desired configuration or design, either engraved or in relief and with or without additional material.

Fig. 17F illustrates an attachment particularly adapted for printing, stamping, sponging, ground laying, dusting, etc. The facing 96b, see Fig. 17D, may be comprised of suitable material in accordance with the work involved, as for instance, rubber, felt, sponge, etc., and supplied with the required coloring fluid, oil or the like through the medium of a pad member 96m—which is diagrammatically illustrated in Fig. 17F and may be a stamp pad, platen or analogous member—and/or by means of one or a series of the treating nozzles 77, Fig. 11, or said nozzle may serve alone to prepare the facing 96b for the member 96m, the latter being shown as adjustably secured to a bracket 96m', which may be secured to or form part of the main frame of the machine. The pad 96m is provided with a plurality of chambers 96m2 and hose-attaching nipples 96m3 communicating with said chambers, to illustrate how, in stamping for instance, a suitable coloring fluid or fluids may be supplied to the chambers 96m2 and exude to the surface of the pad.

In operation, by providing a suitable cam for turret lever 89g, the attachment may be actuated to alternately move the facing 96b against the pad and the ware, and during this arcuate travel past the nozzle 77, which may be connected with one of the control valves 72—a suitable spray of fluid, dust or the like may be applied to said facing before or after being pressed against said pad. The pad 96m may be formed with designs of absorbent material in relief, the design, trade-name or other marking being applied to the facing and then to the ware. Any desired medium may be applied to the facing or die 96b through the passages 73e—e3 and 73f—f3 or orifice 89c in cooperation with the pad 96m2 and/or nozzle 77.

In Fig. 17G an attachment for shaping or reshaping the interior of deep or undercut ware is illustrated and in the present instance is shown as an insulator shaper or profile 96n, which is preferably formed of porous material with an interiorly-threaded socket in its upper extremity for application on the trunnion 89b. The bottom of the orifice or central passage 89c in this form of attachment may be closed by a removable plug 96n' during certain shaping operations, as in making insulators, and super and/or sub-atmosphere and other fluid mediums may be applied through this orifice and the passage of ducts 73e3 and 73f3.

In making insulators, the clay may be shaped primarily by the shaped attachment 96n, or the charge may be preformed by initially providing a cavity for said shaper as by the upper die in Fig. 13F, and when the mold is advanced under the attachment, the latter may be lowered into the mold substantially in line with its vertical axis and then moved off center and either or both the attachment and mold rotated. After the insulator has been shaped, the shaper may be moved toward the vertical axis of the mold or insulator sufficiently to clear the threads and undercut portion and the mold lowered and/or the shaper elevated to clear the insulator. Should the clay have a tendency to adhere to the shaper, a suitable fluid medium may be applied as above noted, the fluid passing through the porous material of the shaper and providing a film between the shaper and clay which effectively prevents adhesion of the clay to the shaper. However, as the shaper may be rotated with the mold and as the area of surface contact of the shaper with the clay during the shaping operation is comparatively small, any tendency toward adhesion and mutilation of the insulator threads is practically eliminated.

It will be noted that the mold is of the automatic partible type shown in Fig. 8L.

Fig. 17H illustrates an attachment or upper die for reshaping ware, as where the ware is to be given a smooth or regular surface contour by the profile and while in a plastic or pliable state, operated on by the die to give the ware an irregular shape or design without applying additional material. In this instance the facing 96b of the die is given the shape it is desired to give to the ware, as by forming a series of indentations in the facing or in the removable and replaceable treating members 96d, or a design or ornamental figure. If it is desired to have the design show on both sides of the plate, or be concave-convex, the facing 96b need only be designed or indented, but if the design is to show on one side only of the ware, then the mold should be formed with cooperating designs or indentations, the clay being originally smoothed or pressed thereinto by the profile.

The mold as shown is provided with adjustable, removable and replaceable inserts 96d' and 96d2, which may be threaded into the mold and vented as 96d' or made solid and slidably mounted, as 96d2, and these inserts may be annular rings or plugs and of porous or non-porous material. When air under pressure is applied to the mold through the chuck passages 62a and 62b it exerts pressure on the soft or freshly jiggered ware through the vented insert 96d' and/or forces the movably-mounted insert 96d2 against the ware and conforms the ware to the upper die or facing 96b, and this operation may be assisted by applying sub-atmosphere or suction to the ware through the upper die. It will be noted that the mold is formed with a reduced central chamber 71d which is partitioned off from the remaining passages, or each passage is separated from the other, to illustrate how the super and/or sub atmospheric pressure may be concentrated at some particular portion of the mold surface. If the force of the air under pressure should have a tendency to displace the mold relatively to the chuck, the electro-magnetic switch shown in Fig. 10 may be operated to hold the mold on the chuck. Agglutinants may be added to the clay mixture to condition the latter when producing ware by the foregoing method.

Fig. 17H¹ illustrates a cam 96n2 which may be suitable for the lever 85e when using the above described attachment or upper die.

It will be obvious that instead of venting a porous mold to concentrate the super and/or sub-atmosphere, the surface of the mold could be treated to render certain portions thereof impervious and obtain substantially the same effect.

Ware—transfer chucks

The diagrammatic illustration in Fig. 1 shows the reshaping and decorating assembly mounted adjacent the drier, the conveyor chain to the left of this fabricating unit starting its undulating path through the drier. At the left of the drier the cups, which may have then reached a partially dry or leather hard condition, are shown as being transferred from the forming molds in the main drier to the upper treating chamber and turned and finished during the process of transfer. However, means are provided for transferring any particular shaped article of ware, the chucks for gripping the ware being preferably mounted on one of the turrets 88, and are generally designated by the reference numeral 97, see, for example, Figs. 19F and 19G. These ware-gripping chucks are so constructed that ware which may be in a leather-hard state as well as delicate and fragile ware may be transferred without distortion, marring or breakage, said chucks being shown in detail in Figs. 18 to 18C inclusive.

The transfer movements of the chucks 97 are governed by the carriage assembly illustrated in Figs. 14 and 14A, the method of mounting said chucks on the turret 88 being shown in Figs. 19F and 19G. Each chuck is preferably provided with a stem 97a and operates to grip the ware through the medium of sub and/or super atmosphere, which may be conducted to the chuck by means of the spider attachment shown in detail in Fig. 18E. The shaft 86b, Figs. 14 and 14A, is formed with a longitudinal bore in which a tube 97b, Fig. 18E, is inserted, the one extremity of said tube being provided with a hose nipple 97b2, see Figs. 19G and 19I, and at its opposite extremity said tube projects through the shaft 86b. This tube has a free fit in said bore, as the shaft 88b rotates independently thereof, and the spider is formed with a hub 97b3 which is rotatably mounted on the projecting extremity of said tube, see Fig. 18E. The tube 97b' is closed or formed solid at its one extremity and provided with a port 97b4, and the hub 97b3 is formed with a plurality (four in the present instance), of radial bores 97b5 in which tubular arms 97b6 are secured, said bores being adapted to register with the port 97b4 as the spider rotates on the tube 97b. The chuck stems 97a are also formed with longitudinal bores 97a' and the tubular arms 97b6 telescope and have a rotatable working fit therein, said stems extending through and being in longitudinal spline-sliding engagement with the gears 89a which are in mesh with the ring gear 89, previously described. Collars 97b7 and 97b8, see Fig. 19F, are adjustably secured on the chuck stems 97a, by means of which the stems may have an adjustably limited range of longitudinal sliding movement in the gears 89a or be held longitudinally rigid therewith.

Fig. 18 illustrates a transfer chuck adapted to grip the ware from the bottom, said chuck comprising a body block 97c, which is interiorly bored and threaded to receive the stem 97a, the block 97c being adjustably secured on said stem by a nut 97d. The bottom surface of the block is recessed or formed with an annular cavity 97e, the resulting flange being shaped to center on the bottom bead of the ware as at 97e', a plurality of vacuum cups or nipples 97f being adjustably threaded in the block 97o, the cups preferably being three in number and spaced angularly, said block being formed with conduits or passages 97a2 which establish communication between the bore 97a' in stem 97a and the vacuum cups or nipples 97f.

It will be noted that this form of chuck leaves the greater surface portion of the ware free for turning and finishing operations, an advantage which will later become more apparent, and further, that the angular spacing of the nipples 97f provides a three point ware surface contact which will always be equal at all points regardless of whether the gripping surface of the ware is of regular or irregular contour.

The chuck illustrated in Fig. 18A is particularly adapted for gripping the interior of deep ware and may be operated by either sub or super atmosphere. Simply for the purposes of illustration, parts are shown in this chuck which would render the chuck operative, if used alone, or in other words a number of modifications in structure are included in the same figure to conserve space.

The block 97c in this instance has secured on the top surface thereof an annular flexible sealing valve 97g, which functions to seal the space between the chuck and ware when sub-atmosphere is used as the gripping medium. The passage 97a'' in this instance branches off at various points as at 97a3, and where these passages terminate, cushioning plugs 97h, which may be of soft rubber, are adjustably secured therein to ensure against marring and distortion of the ware during transfer and a number of these plugs may be solid to selectively close said passages. A guard or stop member 97i, which centers on and contacts with the mold is adjustably secured on the stem 97a by a nut 97i', to adjustably limit the approach of the grip head to the ware, said guard being vented at 97i2.

The block 97c is shown as being formed with an annular recess to receive a flexible or expansible tube 97j, (which may be in the form of a series of bulbs) formed with a nipple portion which fits in the passages 97a3. This tube may function as the gripping means through the application of air under pressure and also serve as a further centering and cushioning means for the chuck relatively to the ware. It will be seen that the expanding force will be applied equally in all directions by adopting this construction.

A further method of providing a grip means is to form a series of radial bores, preferably three, in the block 97c, which meet or converge at the central passage 97a2, gripping pistons 97k being mounted to have a sliding fit in said bores, cushioning pads 97k' being secured on the ends of said pistons. These pistons may be expanded by air under pressure or super atmosphere and retracted by sub-atmospheric pressure or by springs 97k2, the latter being housed in said pistons and secured at one extremity thereto. The abutting end of each piston may be formed with a bore segment, thus providing a complete bore which registers with the passages 97a2.

It will also be apparent that in this type of grip means the expanding force is applied equally in all directions.

Fig. 18B illustrates a chuck adapted to grip the exterior of deep ware, the expansible tube 97j being utilized as the grip member as in Fig. 18A. It will be noted that the block 97c is vented at 97i2 to prevent entrapping of air in the chamber formed when the chucks grips the ware.

The chuck illustrated in Fig. 18C is adapted to grip the ware from the side and turn or invert the ware and which permits access to the interior as well as the greater portion of the exterior of the ware.

The assembly is preferably mounted on the turret 88, the stem 97a in this instance being formed with an enlarged rounded head and the body block 97c is socketed and clamped on said head by means of adjustable pressure plates 97d'. The stem for this type of chuck serves as a bearing block or bracket 97l shown in section, which may be formed on the turret 88, said stem being formed with an annular end flange 97m, to prevent lateral displacement toward the right as viewed in Fig. 18C.

At an intermediate point, the stem or shaft 97a is formed with a pinion 97n adapted to mesh with a depressible rack 97n', which is formed with a cam-contact hump 97n2 and a pin or leg 97n3, the latter being encircled by a spring 97n4 and having a sliding fit in a bracket 97n5, a nut 97n6, which is threaded on the one extremity of said leg 97n3, serving to adjustably limit the travel of the rack 97n' in one direction. A cam 97n7 is shown as adjustably secured on the shaft 86b for depressing rack 97n'.

Sub and/or super atmosphere may be applied through either one or both of the passages 73e—e'—e2 or 73f—f'—f2, see Figs. 14B and 14C.

In operation, cam 97n7 depresses rack 97n' in mesh with pinion 97n, turning stem or shaft 97a and the chuck secured thereon, and this turning operation may be initiated at any desired point of the transfer operation by adjusting the actuating cam for lever 87e' Figs. 14—14A, which is not shown but may be shaped substantially similar to the cam 97n7 and mounted as in Figs. 7D and 7E, to permit change of phase while in operation, or by adjusting cam 97n7 on shaft 86b. It will thus be apparent that the position of the chuck may be changed to conform to the points of pick-up and deposit of the ware while moving from one point to the other.

Fig. 18D illustrates a modified form of chuck for shallow ware, the guard 97i in this instance being secured to the block 97c and the stem 97a being formed with a flanged or enlarged head 97a4 which has a loose mounting in a recessed portion of said block, a plate 97c being secured on the upper surface of the block, thus providing a floating mounting for the chuck on its stem which may prove advantageous in some forms of ware transfer work. The operating medium may be applied through a flexible hose connection 97p, which may connect direct with one of the control valves, Fig. 10, or be attached at any convenient point in the system. The nipples 97f are, as usual, spaced angularly to provide a three-point, automatically equalizing, contact with the gripping surface of the ware.

As the transfer movements of the chucks are governed by the carriage assembly illustrated in Figs. 14 and 14A, wherein the throw of the various levers may be adjusted while in operation, the path of transfer of the chucks may be defined or regulated while they are moving in said path, so that the chucks may be accurately guided and positioned at all times, and by mounting the various lever cams as in Figs. 7B and 7E, the phase of motion of the chucks may be accurately regulated during the transfer operations, and this facility of control of the chucks is of particular advantage in the automatic turning and finishing of the ware, which will now be described.

Ware may be taken from and deposited on a continuously-moving conveyor or other support by timing the movement of the slide bar 85g so that it will travel with the moving ware conveyor or support while the chuck is operating to grip and release the ware.

Turning and finishing

In the apparatus as arranged in Fig. 1, the turning and finishing assembly is mounted to operate on the ware as it is being transferred from the lower main drier to the upper treating chamber in a manner to be described, but it will be understood that the turning and finishing assemblies may be mounted in cooperative relationship with the carriage assembly carrying the transfer chucks at any point along the fabricating line where desired.

Referring to Figs. 19, 19A, 19B, the assembly is adapted to be adjustably supported from any of the frame plates 38c by posts 98. The tools used in the turning and finishing operations are of different types in accordance with work involved, the cutting tool in Fig. 19 being indicated at 98a and the burnishing and finishing tool at 98b, each of said tools as here shown being adjustably secured in the armature shaft of a motor 98a' and 98b' and independently driven, the motors being supported by blocks 98c which are adjustably secured to a bracket 98c' by a screw 98c2, said bracket in turn being adjustably secured to supporting posts or shafts 98d by a screw 98c3, see Fig. 19B. By loosening screw 98c2, block 98c may be adjusted angularly relatively to bracket 98c', thereby adjusting the tool, and by loosening screw 98c3 the bracket 98c' may be adjusted angularly relatively to posts 98d and also vertically on said posts, thereby similarly adjusting the tool. It will thus be seen that each tool is universally adjustable so that the tools may work at varying angles relatively to the ware.

The posts 98d are secured in upper and lower arms 98d' and 98d2 which are mounted to oscillate or yield in a horizontal plane in bearing collars 98d3, the latter being adjustably secured on the main supporting posts 98.

A bracket 98e is secured on the lower ends of the posts 98 see Fig. 19B, said bracket being formed with an extension 98e' and a lug or ear 98e2, retraction springs 98d4 being secured at opposite extremities, respectively, to said lug and the lower arms, which move outwardly against the tension of said springs, and to adjustably limit the inward movement or approach of said arms toward one another, abutment screws 98d5 and 98d6 are threaded through said lug 98e2 and may be adjusted relatively to said arms.

The tools 98a and 98b are accurately guided by a pattern cam 98f, which is mounted on the transfer chuck stem 97a and may be secured thereto by screw 98f' and rotate with the chuck and ware, or rotated free on said stem at varying speeds relatively to the chuck and ware, the hub of the cam 98f being adapted to receive change speed gear 68b, gear 68a being secured on stem 97a and the jack shaft 68f for gears 68c and 68d having bearing in the turret 88. A bearing collar 98f2 is removably and adjustably secured on stem 97a below cam 98f for supporting the cam when loosened for free rotation on said stem.

Tracers 98f3 are mounted for universal adjustment similar to the motor and tool assembly above described on the posts 98d, these tracers being adapted to follow the contour and design or pattern on cam 98f as the latter rotates, and as the tracers are mounted rigidly relatively to the tools 98a and 98b, this motion will be translated to said tools.

The bracket extension 98e' has mounted thereon a bottom turning and finishing tool 98g which is centered relatively to the axis of the transfer chuck when the latter is in operative position between the tools and tracers, so that the rotating ware may be lowered onto this tool at the beginning or completion of the turning and finishing operation, in this instance, at the beginning of the work.

A chip and dust receiving housing 98h is also mounted on the extension around and beneath the bottom tool 98g, the dust particles and chips resulting from the turning and finishing operations falling therein and are preferably removed therefrom by suction, a hose nipple 98h' being attached to said housing for the vacuum hose.

Fig. 19AB illustrates a set of cams that may be used with the carriage assembly, Figs. 14 and 14A, when turning and finishing ware with the pattern cam 98f and cooperating tracer and tool assembly. These cams are preferably mounted as in Figs. 7D and 7E on one of the cross shafts 80a, so that the phase of motion of the parts primarily actuated by said cams may be under ready control while in operation and while the driving connection subsists.

The cam for lever 85e or the vertical motion lever is designated 98i, the cam for lever 85i, or the slide bar lever, which carries the turret 88 and transfer chuck together with the pattern cam 98f and various gears and appurtenant parts is designated 98j, the cam for lever 87g or the lever which turns the turret after each turning and finishing operation is designated at 98k, and the cam for segment lever 87e' which drives shaft 86b and rotates the pattern cam and transfer chuck with the ware thereon is designated 98l.

In the position shown in Figs. 19, 19A and 19B, the ware is moving in toward the tools, which will be moved further apart to initially clear the ware by the pattern cam moving therebetween. When the ware shall have reached an intermediate position between the tools, segment 87e will be actuated by cam 96l and the ware rotated, lever 85e lowering the rotating ware onto the bottom tool 98g, dwelling a short period, at which time the side tools 98a and 98b are out of contact with the ware. Cam 98i then raises lever 85e and the rotating ware moves upwardly and the tools 98a and 98b, which are guided by tracers 98f3, move into contact with the vertically moving rotating ware to perform their respective functions, after which the turret is given a partial turn to deposit the ware in a handle mold as illustrated in Fig. 2A and bring another chuck and pattern cam into operative position, or the same chuck may be oscillated back to repeat the operation, depending upon the position of the latch 18g in the disk 86, Fig. 14B.

It will be obvious, however, that the ware may be deposited at any desired point and that one or a multiple of pattern cams and transfer chucks may be mounted on the turret 88.

Figs. 19C, 19D and 19E illustrate a turning and finishing assembly particularly adapted for plain ware or ware having a regular surface contour. In this instance, the turning and finishing tools are designated at 98a2 and 98b2 and are primarily driven from a vertical shaft 98m, see Fig. 19E, which has bearing in the bracket 98e and may be driven from any suitable source, as for instance, one of the shafts 80a, the drive being transmitted to the posts or shafts 98d on which the tools are secured by means of a gear 98m', which is secured on shaft 98m, idler gears 98m2 and 98m3 which transmit the drive to gears 98m4 and 98m5, these latter gears being secured on vertical shafts 98m6 and 98m7, also having bearing in bracket 98e. The posts or shafts 98d in this instance are mounted to rotate and extend through and have bearing in the lower arms 98d2, and the posts or shafts 98d and the shafts 98m6 and 98m7 are provided with sprocket gears and connected by sprocket chains 98m8 and 98m9 or analogous positive flexible drive connection.

In addition to the bottom tool 98g shown in Fig. 19, a bottom burnisher 98g' is provided in this instance, said tools being secured on jack shafts 98g2 and 98g3 which extend through and have bearing in a bracket extension of the arms 98*d*2, the lower extremity of each shaft having secured thereon gears 98*g*4 and 98*g*5 which are adapted to mesh, the drive being applied to gear 98*g*5 by means of gears 98*g*6 and 98*g*7 which are secured on the posts or shafts 98*d*, see Fig. 19D.

The pattern cam in this instance is in the form of a profile disk 98*f*4, each shaft 98*d* having rotatably mounted thereon rollers 98*f*5 adapted to follow the contour of the profile disk 98*f*5 during the turning and finishing or burnishing operations.

Fig. 19CE illustrates the cams for the carriage assembly, Figs. 14 and 14A, which are indicated by 98*k'*, 98*j'*, 98*i'* and 98*l'*.

It will be noted from the contour of these cams that the ware first moves adjacent the tool 98*a*2 and over the bottom tool 98*g*, is then lowered and dwells both the ware and tools being rotated, the ware then elevating slightly to clear the tools and moving over adjacent tool 98*b*2 and over bottom tool 98*g* and again lowers and dwells for the burnishing operation, after which the frame 85 is raised and the slide bar 85*g* retracted and the ware clears the burnishing tools and the turret 88 is given a partial turn as described in connection with Figs. 19—19B.

This assembly is shown in operation in the apparatus at G.

Figs. 19F and 19G illustrate an assembly particularly adapted for swabbing and edge finishing ware. This assembly is shown as mounted at the lower left extremity of Fig. 1 to operate on the ware as it leaves the drier, the ware being transferred from the molds carried by the chucks 62 to a ware conveyor, see Figs. 5D and 5C and 2, which is driven in synchronism with the conveyor 40 as will hereinafter be described, the ware being finished and swabbed while undergoing transfer.

Referring to Figs. 19F and 19G, it will be noted that the transfer chuck in the position shown is about to rotate a plate in contact with an edge-finishing tool, above and below and slightly to one side of which are mounted swabbing pads. This swabbing and edge finishing assembly is supported from one of the top frame plates 38*c* by an angle-bracket 98*m*10, which in turn has secured thereto an angle bracket 98*m*11, the latter serving to support and stabilize the upper extremity of a vertical shaft 98*m*12, which is driven by means of bevel gears 98*m*13 and 98*m*14, respectively secured on the shafts 98*m*12 and 80*a*. The lower extremity of shaft 98*m*12 extends through the bracket 98*m*10 and has adjustably secured thereon a motion plate 98*m*15, which coacts with a Geneva gear 98*m*16 secured on a counter shaft 98*m*17, which extends through and has bearing in the bracket 98*m*10.

A turret head or bracket 98*n* is secured on the counter shaft 98*m*17, and to this bracket a plurality of swabbing members and edge finishing tools are adjustably secured, the members which are visible in Figs. 19F and 19G being indicated at 98*n'*, 98*n''*, 98*n*2, and 98*n*3, and the tools at 98*n*4, 98*n*5, and 98*n*6.

Each swabbing member is formed with ducts and faced with felspong, or analogous absorbent material which is supplied with a suitable fluid from a chamber 96*o* formed in each member, the fluid being supplied to said chambers through ducts 98*o'*, which are formed in the shaft 98*m*17 and have connected thereto hose nipples for attachment of hose or analogous members 98*o*2 which connect with valved hose nipples 98*o*3 secured in the pad members 98*n'*—*n*3, the shaft 98*m*17 being broken at an intermediate point to show said ducts, see Fig. 19G. At the upper extremity of shaft 98*m*17, the ducts 98*o'* terminate in annular chambers in a manner similar to the ducts 73*e*3 and 73*f*3, Fig. 14C, said ducts 90*o'* being supplied with the required fluid through hose or analogous flexible members 98*o*4, which preferably lead to the control valves 72, Fig. 10, and thence to a source of supply.

Fig. 19FG illustrates a set of cams for use with the carriage assembly, Fig. 14—14A, when the transfer chucks are operating to bring the ware into operative adjacency to the swabbing and edge finishing assembly first described.

The vertical frame cam for lever 85*e* is designated by 98*i*2, the horizontal slide-bar cam for lever 95*i* by 98*j*2, the turret cam for lever 98*g* by 98*k*2 and segment cam for lever 87*e'* by 98*l*2.

In the position shown in Figs. 19F and 19G, the plate has been gripped and raised from one of the chucks 62 and is just beginning its movement past and in contact with the edge-finishing tool 98*n*4, see Fig. 19G, the ware moving toward the left as viewed in Fig. 19F and away from the observer as viewed in Fig. 19G. Cam 98*l*2 is about to actuate segment lever 87*e'* and rotate the ware when in contact with said tool. After the ware has been rotated in contact with tool 98*n*4, it moves farther toward the left, or away from the observer in Fig. 19G, and is lowered in contact with the swabbing pad 98*n'* while still rotating, see contour of cams 98*i*2 and 96*i*2, and then elevated into contact with swabbing pad 98*n''*. Rotation then ceases and the ware is moved again toward the left and lowered onto the ware conveyor, to be described in connection with Figs. 5C and 5D, the plates in this instance, being stacked on said conveyor, which is intermittently driven in synchronism with the transfer operation, the plate chuck stem 97*a* being in spline-sliding engagement with gear 89*a* and telescoped over the tubular arms 97*b*6 to permit this stacking operation.

The chuck then elevates and moves back and cam 98*k*2 acts on lever 88*g* to partially rotate turret 88 and bring another transfer chuck into position, and during which time the motion plate 98*m*15 may act on the Geneva gear 98*m*16 to partially rotate turret bracket 98*n* to bring the succeeding edge-finishing and swabbing assembly into position. However, it will be understood that when swabbing and edge-finishing a line of plates or ware suitable for one form of transfer chuck and swabbing and finishing assembly, the turret cam 98*k*2 and motion plate 98*m*15 remain idle.

Figs. 19H and 19I illustrate a modified form of turning and finishing tool and pattern cam, the cam being designated by 98*f*6 and the tool by 98*ab*, the latter being independently driven by one of the motors 98*a'*, the motor and tool assembly being adjustably mounted as in Fig. 19 but in this instance is secured on the post 98. The pattern cam 98*f*6 is also adjustably secured on the post 98, only one of which is required in this instance, and has a working surface contour in accordance with the shape of the ware.

The tool is shown enlarged in Fig. 19J and has a beveled cutting edge or surface which acts or turns while the ware is rotating in one direction and finishes and burnishes while the ware is rotating in the opposite direction, see contour of cams 98*i*3 and 98*l*3, Fig. 19HI. Cam 98*j*3 for the horizontal slide bar has a positive action toward the right as viewed in Fig. 19H, said bar being provided with a roller 98*f*5 which follows the contour of the pattern cam 98*f*6, the action of spring 85k2, Fig. 14, being reversed in this instance. The turret cam for lever 86g is designated at 98k3. The bottom tool 98g operated substantially as in Figs. 19 and 19B.

In Fig. 19K a tool 98a3 adapted to turn and finish the bottom of shallow ware while on the forming molds 53 is illustrated, said tool being adjustably secured on one of the transfer chuck stems 97a and is preferably mounted to operate on the ware prior to the ware turning and finishing assemblies previously described.

Fig. 19L illustrates a tool 98a4 for finishing the interior of deep ware which is mounted similarly to the tool 98a3.

When using these bottom and interior finishing tools, a suction action may be set up through the chuck 62 and mold 53 to hold the ware in stable position on the mold. In Fig. 19L the chip dust and other particles may be withdrawn from the ware by suction set up through the bore 97a' in the chuck stem 97a, and this course may be also adopted with the bottom tool 98a3 or the housing 98h used in conjunction therewith.

The cams for these tools need only be the usual oval-shaped cams and are not shown.

Handle and Appendage Application

Generally stated, but subject to variation within the scope of the invention, the method of applying handles and analogous decorative and utility appendages to such of the ware as desired consists in charging the molds 54 with clay in a fluid or semi-fluid state by the charger illustrated in Fig. 20 through the treating or nozzle member generally indicated at 99 in Fig. 1A and shown in detail in Fig. 20A (or modifications thereof) and then using the transfer-chuck assembly to place the ware in or on the mold against the handle or other appendage, the ware remaining in or on the mold until the clay sets, the mold being subsequently parted if required and the ware with the handle or figure attached thereto removed from the mold and preferably boxed, these series of operations being illustrated in Figs. 1A and 2A will be described more fully in connection therewith.

Referring to Fig. 20A, the nozzle or treating members 99 comprise an externally threaded valve casing 99a, formed with a valve chamber 99b, the inlet port of which is normally closed by a ball and spring valve, to prevent reverse flow of slip in some instances as in the syphoning system to be described in connection with Fig. 20 and also to prevent dripping, the casing 99a being threaded into an interiorly and exteriorly threaded adjusting shell 99c, the threads of both the inner casing 99a and shell 99c preferably being of the same pitch, the shell in turn being adjustably threaded into a mold contacting base 99d, shaped to fit in or on the handle or appendage mold, or frame of the latter, adjacent the filling opening of the porous mold 54e. The casing 99a, shell 99c and base 99d are formed with registering openings, the lower opening forming an outer nozzle which surrounds a charging nozzle 99e and which is adjustably threaded into the opening of the inner casing 99a, to provide an outlet for the chamber 99b, and the inlet port 99f to said chamber has connected thereto the outlet hose 95e3 of the charger 95, Fig. 20. An excess-material-receiving chamber 99g is formed between the casing 99a and shell 99c, the excess material passing into said chamber through the outer nozzle and may be withdrawn from said chamber through a bore 99g', which has attached thereto the hose 95g2 which connects with the charger 95, see Fig. 20, suction being exerted on the material in chamber 99g upon the downstroke of piston or plunger 95h.

The nozzle 99 is floatingly and adjustably supported as a unit by a headed stem 99h which is passed through an adjustable length arm or bracket 99i, and provided with retaining and limiting nuts 99h, said arm in turn being vertically and angularly adjustably secured on a bracket rod 99j, see Fig. 1A. To prevent angular movement of the nozzle relatively to arm 99h, a pin 99k is secured in the top of said nozzle and projects through a bore formed in said arm.

It will be seen that when an impulse is given the charger plunger 95h, slip or clay in the desired plastic state will be forced up through the hose 95e3 into the valve chamber 99b and from the latter through the inner nozzle 99e into the porous mold 54e.

By adjusting the casing 99a in the shell 99c, the inner nozzle 99e may be lowered or elevated without affecting the position of the surrounding or guide nozzle, and by adjusting the shell 99c on the casing 99a and in the base 99d, the outer guide nozzle may be lowered or elevated without affecting the position of the inner nozzle, and by adjusting the casing 99a and shell 99c as a unit in the base 99d, both of said nozzles may be adjusted without changing their relative positions. These adjustments are of particular advantage in applying slip to the appendage or handle casting molds, as the depth of penetration of the nozzle into the mold and spacing of the inner nozzle 99e relatively to its surrounding nozzle may be accurately gaged.

Referring to Fig. 20, the pipe 95e3 is provided with valves and a branch pipe 95e4 terminating in a valve chamber 99m', by means of which the slip may be bypassed into said valve chamber and through a syphoning assembly and back into pipe 95e3 and thence to the nozzle 99 instead of passing direct to the nozzle assembly 99 through the pipe 95e3. This assembly as shown includes parts which may be dispensed with in some instances, but to conserve space, the various parts are included in one figure.

The reference numeral 99l designates a tank or receptacle which may be supported in any convenient manner, a float 99l' being disposed in said tank and carried by a lever 99l2, which may be pivoted at the bottom of the tank, said lever being provided with a valve member 99l3 adapted to function relatively to a pipe 99l4, which is valved at 99l5.

When this syphoning assembly is used, a portion of the pipe 95e3 serves as a priming conduit, that is, the charger plunger starts a flow of slip from the feed nozzle 99e by pressure applied through said pipe, after which a by-pass inlet 95e5 to pipe 95e3 from valve chamber 99m', and which is automatically controlled by a valve 99m4, is closed and the entrance to pipe 99l4 opened and the slip caused to flow into tank 99l through said pipe 99l4, this operation being automatically regulated by a valve assembly comprising a casing or block 99m, chambered at 99m', the charger plunger stem 95h' having a bracket 99m2 adjustably secured thereon which is adapted to movably and resiliently support a valve stem 99m3 terminating in the valve 99m4 which is adapted to reciprocate in the chamber 99m' and alternately close the inlets to the pipes 99l4 and 95e3 from the valve chamber 99m', the valve stem 99m3 projecting upwardly through bracket 99m2 and having springs 99m5 mounted thereon which are adjustably maintained in position by collars 99m6 and 99m7.

After the flow of slip from the feed nozzle 99e has been initiated, the supply is from the tank 99l through a pipe 99l5 which is controlled by a check valve 99l7, the ball of which is preferably of hollow construction to reduce weight, this pipe 99l6 leading to the pipe 95e3.

The tank 99l is provided with a valved overflow pipe 99l8, which may also serve to regulate the maximum level of liquid slip in the tank 99l.

In operation, the tank 99l may be permitted to fill with slip to a predetermined level in accordance with the head required, and assuming it is desired to use the float and cooperating parts, the valve 99m4 and the stroke of the charger plunger may be adjusted to give a preliminary impulse to the fluid clay or slip and initiate a flow from feed nozzle 99e, after which the mold is charged through syphoning action, the molds being halted for the filling or charging operation at a point below the level of the slip in the tank 99l in accordance with the depth of the charge, and when the slip in the mold reaches a predetermined level equal to the level of the slip in the tank, the syphoning action will automatically cease, due to the law of liquids seeking their own level and hydrostatic head. The stroke of valve 99m4 may be adjusted by collars 99m6 and 99m7 so that the said valve will seat and dwell a predetermined length of time in the by-pass inlet 95e5 on the down stroke of plunger 95h, at which time said inlet is closed and the inlet to pipe 99l4 opened and if the slip in the tank 99l is then below the predetermined normal level, slip will flow in through pipe 99l4 until the rising float moves valve 99l3 against and closes the outlet of said pipe. Check valve 99l7 prevents any flow of slip into the tank 99l during the priming operation. Thus the level of the slip in tank 99l is maintained substantially constant.

To indicate an alternative construction, a fragment of a valved pipe 99l9 is shown connected to the inflow pipe 99l4, and this pipe may be connected to any suitable source of supply, the level of the slip in the tank 99l then being maintained constant by a flow of slip through said pipe.

By obvious manipulation of the valves for the pipe 95e3 and branches leading thereinto and therefrom, the syphoning assembly may be rendered inactive and the slip pumped direct to the nozzle 99 or other nozzle member in use.

A method of making spouts, hollow handles and the like is illustrated at the extreme left of Fig. 20. The mold 54e is shown as being formed with a cavity for a spout. The walls of this cavity to the end of the spout are formed of porous material and at this point a limiting ring 54e' is inserted in said cavity, said ring preferably being halved or in segments and having a base through which the core may be extracted, and from this ring to the end of the cavity the walls are rendered non-absorbent.

In this instance, the charging nozzle 99e' and a material with-drawing nozzle 99g'' are adjustably connected in spaced relation by a bracket 99n and provided with adjustable limiting and centering heads 99d'.

In operation, the slip may be applied either manually or automatically through nozzle 99e' and then permitted to set until some of the fluid is absorbed in the porous walls of the mold and the clay to some extent thickens or sets adjacent said walls. Suction or sub-atmosphere may then be applied through nozzle 99g'' and/or air under pressure through nozzle 99e' just sufficient to withdraw or force the slip from the core.

Referring to Fig. 1A, the bracket rod 99j which carries the nozzle members 99 is adjustably secured to the bracket 86a of a separate carriage assembly see Fig. 14E in conjunction with Fig. 1A, which need only comprise the frame 85a, slide bar 85g and actuating levers therefor, and in order to stabilize the molds 54 during the appendage or handle-applying operation, the spotting chucks 62' are mounted in a similar manner on arms 99i' which are in turn adjustably secured on a bracket rod 99j'. Thus as the trays 39 bearing the appendage molds 54 are halted in a manner to be described at predetermined points, the treating or nozzle members 99 move over and down on the molds while the spotting chucks 62' move over and up under the molds, note contour of cams 85i4 and 85e3 Fig. 14E', which may be adapted for both of the foregoing operations by proper angular adjustment or positioning on one of the shafts 80a.

In Fig. 1A two nozzle members 99 are shown, to indicate that a plurality of these members may be provided, so that at any time desired the position of application of the slip may be changed and also that supplemental or a plurality of charges may be applied to an appendage mold. However, these nozzle members may also serve as treating members for applying a blast of dry air, a fluid or other treating medium; as where the exposed joining surface of the handle may not have had time to set sufficiently and it is desired to apply a blast of warm dry air thereto. When these nozzle members are used for this purpose, the hose 95e3 may lead direct to one of the control valves 72 and thence to a source of supply of air or other treating medium instead of being connected to the charge applying device 95.

The showing in Fig. 1A is simply illustrative, as in actual practice the position of the nozzle members 99 should be adjusted in accordance with the predetermined lapse of time between charging of the appendage mold and placement of the ware thereon.

The operation of the charger 95 and nozzle member 99 may be varied in accordance with the condition of the plastic clay or slip and character of and quantity of material required for the handle or figure to be applied to the ware. While the syphoning assembly is shown connected up ready for use in Fig. 1A, the material from the charger is being by-passed around this device and goes direct to the upper nozzle member 99 which is shown in position on one of the molds 54 to apply the charge to the porous sections 54e thereof. When the charger 95 gives an impulse to the slip, it is forced through the pipe or flexible tube 95e3 into the nozzle chamber 99b and through inner nozzle 99e into the mold (note Fig. 1A in conjunction with Figs. 20 and 20A), the size of the charge being variable and measurable while the device 95 is operating and the excess material if any passing back around the inner nozzle into the chamber 99g and thence through the bore 99g' and tube or hose 95g2 to the charger 95 due to the suction exerted by the piston 95h on its downstroke, and on its up-stroke forcing this excess material back to the source of supply through tube or hose 95f'. The mold cavity is preferably filled slightly above its level or in excess of its capacity, so that when the cup or article of ware is deposited thereon, a slight bead or fillet is formed which eliminates crevices or cracks at the line of jointure. If the material is in such a fluid state as will readily flow, the mold cavity notwithstanding may be filled in excess of its capacity, as the capillary attraction inherent in the material permits the forming of a convex meniscus above the normal level of the mold. If shrinkage reduces the prominence of this convex formation or meniscus to any appreciable extent prior to application of the ware, it may be readily built up by a further relatively slight charge of slip, it being proposed to provide one or a multiple of nozzle members 99, as above stated. Shrinkage may also be regulated by reducing the water content of the slip and/or by deflocculation, as by incorporating a predetermined quantity of salts or electrolytes in the slip. To further improve the bond and perfect the blend at the line of jointure, when the cup or other article contacts with the convex charge of slip in the appendage mold, it may be given a rocking, angular horizontal or vertical shift, or combination or series of these movements. Also, a vacuum or sub-atmospheric condition may be set up in the cup or article of ware through the chucks 97, to ensure removal of entrapped air and surface water, and this suction action will also cause the slip to enter the pores of the wall of the article and improve the bond between the ware and its handle or appendage.

After the charge has been applied, the nozzle members 99 are raised clear of the molds and the spotting chucks lowered and both the chucks and nozzles move back to clear the succeeding tray and the conveyor is advanced for the succeeding re-transfer and boxing operations which will be more fully described in connection with the following general description of the operation of the apparatus.

*Conveying system of upper treating chamber or dryer*

Referring to Figs. 1 and 1A, the cross or cam shafts 80a for the units in the upper treating chamber are driven from a main shaft 80' by means of the helical gears 67 and 67a, said shaft 80' being provided with a sprocket and connected by means of a chain or analogous flexible positive drive connection 80d with the shaft 80 and driven in synchronism therewith, the drive being primarily applied to the shaft 80' by means of a motor 80e and gear 80f. The shaft 80' has bearing in brackets 38d which may be secured to or form part of the side beam 38b.

The upper treating chamber is preferably provided with separate conveyors 40a and 40b which are connected up and driven intermittently in synchronism with the lower conveyor 40 by means of a sprocket chain or analogous flexible positive drive connection 40c which engages sprockets 40a', 40b' and 40' secured on certain of the sprocket shafts 43a, these sprockets being of such relative size as to drive the conveyors 40 and 40a at the same speed and the conveyor 40b at one-half the speed of conveyors 40 and 40a, for a purpose which will later become apparent.

The drive on the conveyors 40a and 40b and certain sections of the conveyor 40 is intermittent, the drive primarily being applied to a motion plate shaft 40d by means of a sprocket connection 40e, see Fig. 2A, with one of the shafts 80a, a motion plate 40f being adjustably secured on the shaft 40d and coacting with a Geneva gear 40g which is secured on a shaft 40g', these various cross shafts having bearing in the side frame beams 38b of the apparatus, the connection chain 40c engaging a sprocket 40h, also secured on shaft 40g'.

The sections of the conveyor 40 which are driven intermittently in synchronism with the conveyors 40a and 40b are indicated at 40i and 40j and are each provided with a predetermined degree of slack which is confined to these particular sections and maintained constant therein by transmission sprockets 40k and 40k', see Fig. 1. Thus the trays 39 moving in these particular sections may be temporarily halted without affecting the continuous drive of the conveyor as a whole.

It will be understood by those having a knowledge of the art that the conveyor of a ceramic drier of the type herein contemplated is of considerable over-all length and that it would involve considerable power to drive a conveyor of this type intermittently.

The proportion of the conveyor as a whole to the total of the slack section may be estimated as being approximately thirty to one, the showing of the conveyor in Fig. 1 being simply diagrammatic.

*Mounting of spotting chucks for transfer operation between dryers*

The spotting chucks 62' which act on the molds bearing the ware which is to be transferred from the lower or main drier to the upper supplemental drier or treating chamber and back to the main drier are secured on stems 100, see Fig. 1, which are in turn secured on a cross head 101, the latter being secured at opposite extremities to vertical slide bars or pitman 103 which are slidably mounted in guide brackets 104 secured to the side frame of the apparatus, see also Fig. 1A. These slide bars are reciprocated vertically by cams 103, which are adjustably mounted as in Figs. 7B and 7E on certain of the shafts 89a and act on levers 106, which are pivotally secured at one extremity to said pitman and at their opposite extremities adjustably pivotally mounted as in Figs. 7—7A on the side of the frame beam 38b, the side walls of the drier being slotted vertically to accommodate the cross head and pitman connection.

*General description of operation of the apparatus*

To simplify the showing and description of operation of the apparatus, each tray is assumed as having disposed thereon a mold 59 for undercut ware, a plate mold 53, a cup mold (also 53) and a boxing form 58.

Referring to Fig. 1, the treating nozzles, Fig. 11, operate on the molds "A" and place them in condition to receive the charges of clay from the feeder at "B," Figs. 13—13D. At "C" the operation is optional, this being the preforming unit described in connection with Figs. 13E and 13F or the additional material applying unit described in connection with Fig. 17, and at which point clay of a different color, for example, may be applied over the clay bat or charge from the feeder prior to the shaping operation by the profiles. At "D" the profiles and trimmers, Figs. 15—15D, are mounted and shape the soft clay into ware. At "E" a treating nozzle acts on the ware, if desired, preparatory to the decorating operation at "F," see description in connection with Figs. 17 to 17F, inclusive.

The trays 39 are intermittently advanced under these various units by the apparatus described in connection with Fig. 5, the conveyor chain being provided with slack to accommodate this method of conveyance, and as each tray comes to rest in a definite position over the chucks 62, Figs. 9—9B, these chucks rise and elevate the molds from the trays to provide a stable support for and definitely position the molds and also cooperate therewith to apply super and/or sub-atmosphere, electricity and analogous mediums to the molds and ware to assist in the fabricating operations.

As the trays move into the drier, they begin their undulating path therethrough, until at "G" the cups or ware which require handles and like appendages are transferred from the lower main drier to the upper treating chamber or supplemental drier. At this point the mold in which this type of ware is formed are elevated from the trays 39 by the chucks 62' which are caused to rise by the cams 105 and levers 106.

The turning and finishing assembly used in conjunction with the transfer chuck and carriage assembly at "G" is that shown in Figs. 19C and 19D, the transfer chuck gripping the ware and moving it into operative relation with the turning and finishing tools, after which the turret is given a partial turn and the chuck swings in an arc to the right and deposits the ware on the handle mold, 54 at the handle applying station "H," which mold has been previously supplied with slip from the charger 95 and nozzle member 99.

These appendage or handle molds 54 are shown as being disposed on the trays 39 which are mounted in the conveyor 40a, which is timed to advance step by step in synchronism with the conveyor 40 in the lower main drier. At various points along their path of travel the handle molds and also the ware are subjected to treatment by the air exhaust and intake manifolds, Fig. 4C, which are adjusted to discharge conditioning air into these molds and ware.

After the ware has been deposited on the mold in contact with the handle or other appendage in its plastic state, the molds are conveyed through the treating chamber wherein the temperature, relative humidity, etc., of the air is under full control until the handle sets to the proper degree, the trays bearing these molds by this time having reached a position adjacent the transfer chuck and carriage assemblies at "I" and "I'," which grip the ware and transfer it to the boxing forms carried by the trays of the conveyor 40b.

There are three of these transfer units or carriages illustrated in Fig. 1A, the one on the left being idle, to indicate that a plurality thereof may be mounted ready to be connected up for operation when desired, to advance or retard the transfer position as required for the ware being produced.

The chuck of the intermediate transfer unit at "I" grips the ware in each alternate tray from the top, lowers it in an arc and deposits the ware in upright position in a boxing form, while the chuck of the unit at "I'" grips the ware of each alternate tray from the bottom, lowers it in an arc past and in contact with a moistening pad or sponge 107, which may be considered analogous to the pads 98n, Figs. 19F and 19G and is adjustably mounted on a bracket 107a in turn adjustably secured to an adjacent part of the frame of the apparatus, and deposits the article of ware in boxed relation to the ware transferred at "I," the conveyor 40a being driven at twice the speed of the conveyor 40b.

During this boxing transfer operation, it is preferred to impart a slight rotative movement to the chuck 97 when the brim of the cup contacts with the moistening pad 107 and also when it contacts with the brim of the cup in the boxing form, to uniformly distribute the moistening fluid and slightly smear the brims, which tends to improve the bond between the brims of boxed ware.

Just prior to the time the transfer chucks grip the ware to raise it clear of the handle or appendage mold on the trays in the conveyor 40a, the spotting chucks 62', see Fig. 14E, move upwardly and engage the mold from the bottom, (note position in Fig. 8G) and at this time the valves 72 which control the air lines to said chucks operate to first impregnate the porous sections 54e with air under pressure through passage 62b to ensure release of the ware and then suction pressure is applied through passage 62a, and the mold section 54a and 54b in which the porous sections 54e are seated slide apart, freeing the handle and permitting the transfer chucks to lift the ware clear of the mold.

The spotting chucks then lower and move back, and the tray bearing the open mold is advanced on its circuit, note direction of arrows.

Just prior to recharging and after having been dried, air under pressure is applied through passage 62a to close the mold, which is then ready for a further charge.

The ware is now advancing in boxed relation in the forms 58 carried by the trays of the conveyor 40b, and as it moves past the inspection point "J," an attendant trims the handle fins and inspects for defects, and as the forms are of open construction, this operation may ensue with or without removal of the ware from said forms.

The ware ready for the final drying operation now advances on the conveyor 40b to the transfer chuck units at "K," which are mounted at right angles relatively to those at "I—I'," see Fig. 3, so that they transfer the ware transversely to the conveyor, and the cam shafts 80a of these units are accordingly mounted at right angles to the remaining similar shafts 80a and driven by a sprocket connection 40l from the shaft 80', see Fig. 2A.

At this point the spotting chucks 62' which are reciprocated by the cam 105, levers 106 and pitmen 103 are caused to rise through one of the trays 39 in the conveyor 40 of the main drier and engage a boxing form 56 on said tray, elevating said form to cooperate with the transfer chuck of the unit at "K," only the unit on the left, see Fig. 3, being shown in operation, the unit on the right being ready for use in case more than one line of handle or appendage ware is to be produced.

The chuck then grips the top cup at the bottom and transfers the boxed ware from the form 58 on the tray of conveyor 40b to the form 62 on the elevated chuck 62' which lowers it onto a tray in the conveyor 40.

The ware now resumes its cycle through the main drier and moves out on the left extremity thereof as viewed in Fig. 1, where it is transferred to ware conveyors generally designated at 108, see Fig. 2.

To ensure equal drying and contraction of the handle and ware to which it may be applied, the relative humidity of the air in the treating chamber is preferably maintained at a degree which will increase the moisture content of the ware transferred from the lower main drier at "G" and which is then in a leather-hard condition for the turning and finishing operations. The moisture content of the ware is further increased when transferred back to the main drier at "K," as at this point the relative humidity of the air is maintained at a high degree to conform to the condition of the incoming green ware, the handled or appendaged ware doubling back over its previous circuit.

The undercut ware and plates, if no appendages are to be applied thereto are not transferred to the supplemental drier or treating chamber but complete the circuit through the main drier and also move out at the left thereof where this ware may be operated on by the various fabricating units at "M, N, O, and P" and which should be readily understood from the preceding description, after which this ware is also transferred to the ware conveyors at "R."

*Ware conveyors*

Fig. 19F illustrates how the ware may be transferred from the molds and forms on the trays 29 of the endless conveyor 40 to the ware conveyors 108. These ware conveyors are adapted to be driven in synchronism with the transfer chuck units, and the one extremity of a conveyor which embodies the driving mechanism therefor is shown in Figs. 5C and 5D.

It is preferred to provide a separate conveyor for each line of ware, each conveyor comprising ware trays 108a which are swingably mounted in series in a chain or analogous flexible member 108b by means of projecting trunnions 108c. The extremity of each conveyor adjacent the apparatus is supported by hanger brackets to be adjustably supported from the top frame plates by means of the suspension posts heretofore described.

The conveyor chains 108b are passed over the usual sprockets which are secured on stub shafts 108e, the latter having bearing in the brackets 108d, and as these stub shafts do not project into the path of travel of the trays 108a, the latter require less vertical space for mounting in the conveyor.

Channel rails 108f, which are formed with longitudinal flanges or tracks 108f' for supporting the tray trunnions 108c, are secured to the brackets 108d, the weight of the trays and ware being imposed on the side bars 108f.

Provision is made for driving the conveyor intermittently in synchronism with the transfer chucks, so that a multiple of articles of ware may be stacked on the ware conveyors as shown in Fig. 19F and the conveyor advanced, or the conveyor may be advanced for each article of ware, as desired.

A shaft 108g is mounted to have bearing in an extension of the bracket 108d said shaft having secured thereon a Geneva gear 108h which is driven by a motion plate 108i, which is adjustably secured on a drive shaft 108j, the latter also having bearing in the said extension of bracket 108d.

Sprockets 108k are secured on each extremity of the shaft 108g, which connect by means of sprocket chain 108l with sprockets 108m secured on the stub shafts 108e.

The drive is primarily applied to the motion plate shaft by means of a sprocket connection 108n with one of the cross shafts 80a at the left extremity of the apparatus, see Fig. 2.

It will be seen that the motion plate may be adjusted to time the intermittent drive of the conveyor in accordance with the drive of the transfer chuck unit driven from the cam shaft 80a.

As an alternate method of drive, the Geneva shaft 108g has adjustably secured thereon cams 108c, which may be contoured in accordance with the particular intermittent movement desired, said cams acting on levers 108p, which are adjustably pivotally mounted at one extremity as in Figs. 7 and 7A on the bracket 108d and at their opposite extremities have pivotally secured thereon ratchet bars or pawls 108q, which are adapted to mesh on their return stroke with ratchet gears 108r, said ratchet bars having movement through guide brackets 108q'.

This method of drive permits any number of regular or irregular series of impulses to be imparted to the conveyor, depending upon the contour of cams 108c, and is particularly adapted for use when the ware is to be stacked on the conveyor.

These ware conveyors may extend to some point adjacent the kilns where the ware may be prepared for firing or other operations.

It will be seen that a complete process and machine is provided which automatically fabricates the ware from the initially prepared clay to the firing kilns.

In the appended claims, the terms "different form" or "diverse form" as applied to ware pieces mean not only pieces of different shape or configuration, but also ware pieces of different size even if otherwise similar.

In the appended claims the term "set" of pottery ware is intended to include not only a complete set of table ware, but any group comprising pieces of diverse form which it may be desired to reproduce.

Where, in the appended claims, the term "clay mass" shall occur, it shall be construed as meaning the original pugged mass from which the individual charges are segregated or the charge per se prior to any processing responsible for the shaping or fabrication thereof into ware.

What I claim is:

1. Apparatus for fabricating pottery ware comprising a dryer having a main drying chamber arranged in zones and an opening for the removal of ware, a series of fabricating units mounted in co-operative relation with the dryer, a plurality of molds for supporting ware, means for advancing the molds to and through said fabricating units to have ware fabricated thereon, and then through the dryer all in a closed cycle, means for establishing a forced circulation of air through the drying chamber and around said molds and ware, means for controlling the temperature and humidity of the air in each zone to thereby regulate the moisture content of the advancing ware in accordance with speed of travel thereof toward a point of removal.

2. Apparatus for fabricating pottery ware comprising a dryer having a main drying chamber arranged in zones, a series of fabricating stations mounted in co-operative relation with the dryer, a plurality of molds on which ware is fabricated and thereafter supported during drying, means for advancing molds into operative adjacency to said fabricating stations and then through said dryer in a closed cycle, means for establishing a forced circulation of air through the drying chamber and around said molds and ware, means for controlling the temperature and humidity of the air in each zone to thereby regulate the moisture content of the advancing ware in accordance with the speed of travel thereof, and means for withdrawing and intermingling the air and recirculating the same in one or more zones of the drying chamber.

3. In apparatus for fabricating pottery ware, in combination, means for travelling molds on which ware is fabricated in a closed cycle, means for automatically fabricating ware on said molds, means for circulating conditioned air therearound and means for varying the temperature and humidity of the air to regulate the moisture content of the ware at predetermined points along the line of travel thereof.

4. A method for the manufacture of pottery ware comprising fabricating clay bodies on or in molds in a production line while said line of molds is advancing to and through points where the steps of fabrication are successively performed, subjecting the clay bodies in a drying chamber to the action of air variably conditioned as to temperature and humidity at different regions along said line, removing partly fabricated clay bodies from the production line at a point of predetermined humidity condition, performing on said bodies further fabricating operations in an atmosphere where the humidity condition is favorable, subjecting the said bodies thereafter to further action of conditioned air in accordance with said further fabrication, and returning the said bodies to a point in the production line where the temperature and humidity conditions are congenial to the then prevailing state of the clay in the further fabricated bodies, advancing the said bodies through a drying atmosphere until the bodies are in a dried condition, and transferring the bodies to a bisque kiln.

5. In an installation for the automatic mass production manufacture of pottery ware from clay mass to dried ware the combination of a pottery ware fabricating machine, a dryer, a flexible chain conveyor associated with said dryer and said fabricating machine, mold carriers attached to said conveyor, molds disposed on said carriers, means for automatically removing the molds from said carriers incident to the fabrication of ware thereon and replacing the same on said carriers, and means for automatically stripping the ware from said molds subsequent to drying, a finishing mechanism and means for operating said finishing mechanism in timed relation with said pottery ware fabricating machine.

6. An installation for the mass production automatic manufacture of dinner ware shapes such as plates, cups, saucers, etc., which comprises, in combination, an automatic pottery ware fabricating machine, mold conveying means, a plurality of mold carriers associated therewith, a dryer, said conveying means traversing said automatic pottery ware fabricating machine and said dryer, said pottery ware fabricating machine including means for automatically applying clay to said molds, jiggering the clay, decorating the jiggered clay, applying handles thereto, transferring ware, applying fluid medium to the ware and/or molds, applying additional material to the jiggered clay, finishing the jiggered clay and removing the clay from the molds, said means being located and arranged in the order of sequence required by the sequential operations involved in manufacturing ware of the type undergoing fabrication.

7. An installation for the automatic mass production manufacture of pottery ware shapes which comprises, in combination, an automatic pottery ware fabricating machine, a dryer and a conveyor traversing said dryer and said pottery ware fabricating machine and operating in timed relation with the said pottery ware fabricating machine, said fabricating machine comprising means for automatically applying clay to a plurality of molds, means for jiggering the clay into ware, treating means, additional material applying means, means for applying appendages, ware transferring means, turning and finishing means and slip charging means, said apparatus being of such a nature that said means are interchangeable and may be varied and arranged in proper sequence in accordance with the type of ware to be manufactured.

8. An installation for the automatic mass production manufacture of pottery ware shapes such as cups, saucers, plates, etc., which comprises, in combination, a dryer, a conveyor having supports adapted to receive molds associated therewith and an automatic pottery ware fabricating machine, said machine comprising mold cleansing means, charge feeding means, means for adhesively bonding material to the molds, additional material applying means, means for treating the material with fluid, decorating means, appendage forming means, appendage applying means, ware transfer means, ware boxing means, ware finishing means and means for conveying ware to a kiln for firing, said apparatus being of such a nature that the said means are interchangeable and may be arranged in sequence in accordance with the class of ware to be manufactured.

9. An installation for the automatic mass production manufacture of pottery ware such as plates, cups, saucers, etc., which comprises, in combination, an automatic pottery ware fabricating machine having means for automatically forming articles of jiggered dinner ware, appendaged articles, decorated articles and cast articles from clay mass to completed product ready for the firing kiln, a conveyor having a plurality of mold carriers associated therewith, molds disposed on said carriers and arranged in sequence in production lines in accordance with the type of ware to be manufactured in such lines, and a dryer traversed by said conveyer and through which the molds and clay are conveyed.

10. A machine for automatically fabricating diversified dinnerware shapes from clay mass to completed product ready for the firing kiln having ware forming, finishing and glazing mechanism, drive means therefor and synchronizing mechanism together with conveying mechanism synchronously operated with the forming, finishing and glazing mechanism for transporting the ware undergoing fabrication through the machine.

11. A machine for automatically fabricating appendaged potteryware in diversified shapes from clay mass to completed product ready for the firing kiln having ware forming, appendaging and glazing mechanism, drive means therefor, mechanism for synchronizing the operation thereof and conveying means for transporting the ware undergoing fabrication through the machine.

12. In combination, an automatic machine for manufacturing decorated ware in diversified shapes from clay mass to finished product ready for the firing kiln and a drier, said machine including ware forming, decorating and glazing mechanism, drive means therefor, mechanism for synchronizing the operation thereof and conveying means for transporting the ware undergoing fabrication through the machine and into operative adjacency to the forming, decorating and glazing mechanisms aforesaid.

13. In combination, a drier and a machine operated in conjunction therewith on which jiggered flatware and hollow ware shapes are made concurrently from plastic clay mass to product ready for the firing kiln, said machine including flat ware and hollow ware forming means, means for finishing the ware, means for glazing the ware, means for operating said forming, finishing and glazing means in timed relation and mechanism for conveying the ware through the machine.

14. In combination, a drier and a machine for manufacturing decorated and colored potteryware in diversified shapes from clay mass to completed product ready for the firing kiln, said machine including ware forming mechanism, decorating means, a clay feeder for applying colored clay, drive means therefor, a conveyor for transporting the ware and means for synchronizing the operation of the conveyor with the operation of the forming and decorating means and feeder.

15. An installation for the manufacture of diversified pottery ware wherein the ware is produced in a multiple of parallel lines of production, each production line having various instrumentalities for the fabrication, processing and finishing of ware from clay mass to completed form ready for the firing kiln associated therewith together with means for actuating said instrumentalities, and means for transporting the ware in various stages of completion along each production line said last named means being operated in synchronism therewith, said instrumentalities being shiftable from one position to another on the installation so that they may be arranged in accordance with the type of ware being manufactured in any one particular line.

16. An installation for the manufacture of pottery ware comprising, in combination, a conveyor for molds, an automatic mold charging mechanism, an automatic jiggering mechanism, a dryer, means for automatically applying appendages to the ware, and means for transferring the ware to a kiln.

17. An installation for the manufacture of pottery ware comprising, in combination, a mold conveyor, means for automatically feeding charges to molds, means for jiggering the charges into ware, a drier, means for turning and finishing the ware, drive means for said conveyor, charging means, jiggering means and turning and finishing means together with synchronizing mechanism and said means for applying appendages thereto, a ware conveyor and means for transporting ware to a kiln.

18. An installation for the manufacture of pottery ware which comprises, in combination, an automatic machine for manufacturing diversified jiggered flatware and hollow ware shapes on absorbent molds, having a conveyor, means for drying the ware, means for attaching appendages automatically to the hollow ware, means for finishing all of said ware, means for conveying said ware to a kiln and means for placing said ware on said kiln conveyor together with driving and synchronizing mechanism for operating said various means in timed relation for the sequential performance of fabricating operations on the said ware and the transportation thereof through the machine.

19. Apparatus for fabricating appendaged pottery ware comprising a drier, a multiple of trays having open bottom seats linked in series by an endless flexible conveyor adapted to traverse the drier, molds positioned on said seats, means for feeding clay charges to the molds and shaping the charges into ware, means for turning and finishing the ware, means for applying appendages to the ware, and means mounted below the line of travel of said trays and engageable with the molds through the open bottoms of the seats for effecting mold movements required by some of the foregoing operations.

20. Apparatus for fabricating appendaged pottery ware comprising a drier, a line of fabricating stations arranged adjacent the drier, an endless flexible conveyor adapted to traverse the fabricating stations and drier, a series of trays provided with open-bottom moldseats suspended from said conveyor, molds disposed in said seats, means mounted for reciprocatory and rotary movement beneath the line of travel of said trays for effecting mold movements of the molds carried thereby, a ware conveyor synchronized with said first-named conveyor, and means for transferring fabricated ware from the first-named conveyor to said ware conveyor and means for applying appendages to said ware associated with said second conveyor.

21. Apparatus for the manufacture of pottery ware comprising, in combination, a mold conveyor, mechanism for automatically charging molds with clay, mechanism for jiggering flatware and hollow ware concurrently, a drier through which said ware is travelled, a supplemental drier through which the hollow ware is travelled, means in said supplemental drier for appendaging said hollow ware, a conveyor for travelling said hollow ware in said supplemental drier, means for turning and finishing the flatware, and an off-bearing conveyer for removing completed ware from the apparatus.

22. Apparatus for the manufacture of hollow appendaged articles of pottery ware which comprises, in combination, an automatic mold charging apparatus, an automatic jigger, a conveyor for molds, a drier, means for turning and finishing the ware preparatory to the attachment of an appendage, means for forming and applying the appendage, and means for automatically retransferring the appendaged ware to the first named conveyor and boxing the same.

23. Apparatus for fabricating pottery ware comprising a drier, a multiple of trays having open bottom seats linked in series by one or more synchronized endless flexible conveyors adapted to traverse the drier, molds positioned on said seats and comprising ware forming molds, appendage molds and boxing forms arranged in groups, means for feeding charges of clay to the ware forming molds and shaping said charges into ware, means for charging clay slip into the appendage molds, means for transferring ware from the forming molds to the appendage molds in contact with the appendages in the latter molds; means for releasing each appendage from its mold, means for transferring the appendaged ware to the boxing forms, and means mounted below the line of travel of said trays and engageable with the molds through the said open seats for effecting mold movements required by some of the foregoing operations.

24. In the manufacture of appendaged pottery ware, the method which consists in, circulating molds in an endless path while supported on open bottom seats, performing during said circulation the steps of applying clay charges to the molds, shaping the charges into ware thereon, drying the ware on said molds, removing the ware from the molds, turning and finishing the ware, applying appendages thereto, effecting mold movements required by certain steps through the open bottom of said seats and glazing and firing the ware.

25. In the manufacture of pottery ware, the method of making appendaged ware which consists in initially disposing a plurality of forming molds, boxing forms and partible handle or appendage molds on open-bottom trays which are advanced in synchronism over reciprocating chucks in a cycle which includes a drier, charging the forming molds with clay which is shaped into ware and the appendage molds with clay slip for the appendage to be joined to the ware, transferring the ware from the forming molds to the appendage molds in contact with the appendage, and subsequently retransferring the ware to the boxing forms, the appendage molds being opened to release the appendage by means of air pressure which is applied through the reciprocating chucks.

26. In the manufacture of pottery ware, the method which consists in, circulating molds in an endless path while supported on open bottom seats, feeding clay charges onto the molds and forming the charges into ware in a portion of said path, partly drying the ware on the molds, temporarily removing dried ware from the molds in another portion of said path and performing additional fabrication on said ware while it is thus removed, returning the said ware to the main path and completing its drying therein, removing the finally dried ware from the molds, imparting movements as required in some of these steps to the molds through the open bottoms of the seats from points below the latter and returning the empty molds still on the same seats to the charging step.

27. An installation for the manufacture of pottery ware comprising, in combination, a potteryware fabricating machine, a mold conveyor associated therewith, a dryer, means for automatically finishing the ware, and off-bearing conveyor for receiving finished ware, an automatic ware transfer apparatus for transferring ware from said mold conveyor to said off-bearing conveyor means for operating said machine, finishing means transfer and mold conveyor in synchronized fashion.

28. An installation for the manufacture of pottery ware comprising in combination, a machine for fabricating diversified pottery ware shapes simultaneously, a conveyor for transporting diversiform molds thereto, a dryer in which said conveyor operates, means for simultaneously turning and finishing a plurality of ware shapes, means for applying additional material to the ware, an off-bearing conveyor for receiving completed ware and means for automatically transferring completed ware thereto.

29. An installation for the manufacture of pottery ware comprising, in combination, a pottery ware fabricating machine adapted for the simultaneous manufacture of a plurality of different ware shapes, a conveyor for travelling molds thereto, a dryer, means for automatically finishing the ware thus produced, means for glazing said ware, a conveyor for automatically transporting glazed ware to a kiln for firing and mechanism for synchronizing the operation of the fabricating machine, mold conveyor, finishing and glazing means.

30. An installation for the manufacture of pottery ware comprising, in combination, mechanism for automatically manufacturing undercut ware from clay mass to finished product ready for firing including jiggering means, mold conveying means, drying means, means for turning and finishing said ware and means for conveying undercut ware to a kiln for firing and drive means for operating said jiggering, mold conveyor and trimming and finishing means in synchronized fashion.

31. Apparatus for fabricating pottery ware comprising, a drier, a multiple of trays having open bottom seats and linked in series by an endless flexible conveyor arranged to traverse the drier, molds positioned on said seats, means for feeding clay charges to the molds and shaping the charges into ware, means for finishing the ware including means for removing ware from said molds and presenting the same to the finishing instrumentalities, and means mounted below the line of travel of said trays and engageable with the molds through the said open seats for effecting mold movements required by the feeding and shaping operations.

32. An installation for the manufacture of pottery ware comprising, in combination, a machine for fabricating pottery ware shapes, a mold conveyor, a dryer in which said conveyor operates, means for decorating said ware, means for finishing said ware, means for conveying ware to a kiln, means for transferring ware from said first named conveying means to said second named conveying means and mechanism for operating said fabricating machine, decorating means and said turning and finishing means in timed relation.

33. An installation for the manufacture of pottery ware comprising, in combination, a mold conveyor, means for cleaning said molds, means for feeding charges to said molds, means for performing said charges, means for jiggering said charges into ware, means for treating said jiggered ware preparatory for decoration, a dryer, means for automatically finishing the bottoms and edges of the ware, a conveyor for transporting ware to a kiln, and mechanism for operating all of said means in timed relation.

34. An installation for the manufacture of pottery ware comprising, in combination, a potteryware machine for automatically fabricating pottery ware, means for applying additional material to said pottery ware, means for jiggering the charges, means for treating the ware preparatory to decoration, means for decorating the ware, means for drying the ware, means for finishing the ware, means for transporting the ware to a kiln and mechanism for operating all of said means in timed relation.

35. Apparatus for fabricating pottery ware comprising a drier, a multiple of trays having open bottom seats linked in series by an endless flexible conveyor adapted to traverse the drier, molds positioned on said seats, means for feeding clay charges to the molds and shaping the charges into ware, means for applying decoration to the ware, and means mounted below the line of travel of said trays and engageable with the molds through the open seats of the trays for effecting mold movements required by the feeding, shaping and decorating operations.

36. Apparatus for fabricating pottery ware comprising a drier, a conveyor traversing said dryer, a multiple of mold carriers associated with said conveyor, diversiform molds positioned on said carriers, means for feeding clay to different form molds simultaneously and shaping the clay, means for turning and finishing the shaped clay, means for decorating the ware and means engageable with the molds for effecting all mold movements required for the feeding, shaping and turning and finishing and decorating operation.

37. The method of fabricating pottery ware, which consists in, disposing the molds in which the ware is fabricated on open-bottom trays, advancing the trays successively in a substantially rectilinear plane through a drier and adjacent a series of fabricating units mounted in co-operative relation therewith, automatically effecting the operations of feeding the molds with clay charges, shaping the charges into ware and decorating the ware, and applying a conditioning medium to the advancing ware to prepare it for the decorating operation and thereafter glazing and firing the said ware.

38. In the manufacture of pottery ware, the method which consists in, circulating molds in an endless path while supported on open bottom seats, performing during said circulation the steps of applying clay charges to the molds, shaping the charges into ware thereon, drying the ware on said molds, turning and finishing the ware, decorating and glazing the ware and effecting mold movements required by certain steps through the open bottom of said seats and with constant association of the molds with their respective original seats throughout any desired number of complete cycles of the molds in said path.

39. An installation for the manufacture of pottery ware comprising, in combination, a jiggering machine, a drier associated therewith and through which the jiggered ware is travelled, air conditioning apparatus associated therewith, air circulating means, a supplemental drier, pottery ware fabricating apparatus associated therewith, air conditioning means therefor, air circulating means therefor, means associated with each drier for controlling the temperature and humidity of the air in said driers whereby ware may be transferred from said first named drier to the second named drier for further processing in an atmosphere congenial to the temperature and humidity prevailing in the clay bodies at the time of transfer.

40. An installation for the manufacture of pottery ware comprising, in combination, a plurality of fabricating machines arranged in sequence, a mold conveyor associated therewith for travelling molds into operative adjacency to said fabricating machines and means for advancing or retarding the temperature and humidity of the molds to condition the same for successive fabricating operations.

41. Apparatus for the manufacture of pottery ware comprising, in combination, a drier, a jiggering apparatus associated therewith, an appendaging apparatus associated therewith, a ware turning and finishing apparatus associated therewith, means for conditioning the air surrounding said jiggering apparatus, said appendaging apparatus and said turning and finishing apparatus and means for varying the humidity and temperature of the air surrounding any one of said apparatus over that surrounding any other of said apparatus.

42. Apparatus for the manufacture of pottery ware comprising, a drier, means for fabricating clay bodies in or on molds in said drier, means for forming a production line over which said molds are travelled in said drier, means for removing partly fabricated clay bodies from the production line, means for appendaging the partly fabricated clay bodies and means for returning said bodies to the production line and means for creating variable temperature and humidity conditions in said drier and at different regions along said production line congenial to the appendaging operations.

43. Apparatus for manufacturing pottery ware which comprises, in combination, means for forming a production line for the automatic fabrication of pottery ware, means for forming a second production line for the automatic fabrication of clay ware in/or on molds, means for consolidating the clay bodies off the first production line with the clay bodies of the second production line, and means for equalizing the temperature of the bodies incident to consolidation.

44. Apparatus for the manufacture of pottery ware comprising, a flexible conveyor operating in an endless path, a plurality of mold locating means suspended at definite intervals on said conveyor, molds supported on said locating means, means for fabricating ware on said molds, a second flexible conveyor operating in an endless path adjacent the first conveyor, appendage applying means carried by the second conveyor, means for selectively transferring ware from the first conveyor to the appendage applying means, means for subjecting the said ware and applied appendage to separately controllable conditioning influences, means for transferring ware with applied appendages back to the first conveyor, and means for synchronizing the movements of said conveyors and transfer means.

45. In apparatus of the class specified, a mold, means for advancing said mold in a cycle including travel through fabricating units and through a drier, and means for advancing and retarding the moisture content of the mold to conform to the successive fabricating operations.

46. Apparatus for fabricating pottery ware, comprising, a drier, a series of ware fabricating stations arranged externally of the drier, an endless flexible conveyor, mold supports carried by said conveyor, molds located on said supports, means for advancing the conveyor with the mold supports and molds through the drier and series of fabricating stations, and individually controllable heating elements distributed through said drier.

47. Apparatus for fabricating pottery ware comprising, a drier, a line of fabricating stations arranged adjacent the drier, an endless flexible conveyor adapted to traverse the fabricating stations and drier, a series of trays provided with open bottom mold seats suspended from said conveyor, molds disposed in said seats, heating elements for conditioning the air in said drier, and means for selectively controlling said heating elements to regulate the drying of the ware.

48. Apparatus for fabricating pottery ware comprising, a drier, a line of fabricating stations arranged adjacent the drier, an endless flexible conveyor adapted to traverse the fabricating stations and drier, a series of mold supports suspended from said conveyor, molds disposed on said supports, means for conditioning the air in said drier, and means for selectively controlling said heating elements to effect the drying of the ware before it is stripped from the molds and the drying of the molds to a degree suitable for filling before the cycle is completed back to the fabricating machine.

49. Apparatus for the production of pottery ware, comprising, in combination, mold supports arranged in definite spaced relationship, molds on said supports including jiggering molds and casting molds, means for moving said mold supports in a predetermined path, means for simultaneously jiggering and casting ware in said molds and means in said path for drying the ware.

50. Apparatus for the manufacture of pottery ware comprising, in combination, supports for carrying jiggering and casting molds, means for moving the supports and molds along a predetermined endless path, plastic clay jiggering mechanism, slip charging means mounted adjacent the line of travel of said supports for filling said casting molds and a drier, through which the molds are travelled.

51. A method for the mass production manufacture of pottery ware shapes which comprises, automatically travelling, jiggering and casting molds arranged in side by side relation in endless repeated cycles in a plurality of production lines through a fabricating zone and a drying zone, jiggering and casting pottery ware simultaneously on the molds, advancing the molds with ware thereon in all lines through a drying zone common to all lines, drying the ware, stripping the ware from the molds and returning the molds to the fabricating zone to repeat the cycle, and firing the ware subsequent to fabrication and drying.

52. Apparatus for the manufacture of pottery ware comprising, in combination, a drier and a supplemental drier, fabricating units associated with each drier, a conveyor for molds and ware associated with each drier and the fabricating units associated therewith and means for halting sections of the conveyor located adjacent each fabricating unit to thereby arrest the travel of the molds and ware in such sections whilst undergoing fabricating operations.

53. Apparatus for fabricating pottery ware comprising, a drier, a series of fabricating units mounted in cooperative relation therewith, a multiple of open-bottom mold-carrying trays linked in series by an endless flexible continuously-driven conveyor provided with slack, molds located on said trays, tracks for supporting certain of said trays and sections of said conveyor, means for intermittently advancing said trays on said tracks at a speed in excess of the normal drive of the conveyor, the slack constantly accumulating and dissipating in advance and in rear of the advanced trays which are thereby permitted to dwell during a fabricating operation without halting the drive of the conveyor, means for opening and closing said molds incident to said dwell and means for spotting the position of dwell of said trays on said tracks.

54. Apparatus for the manufacture of pottery ware comprising, a flexible conveyor operating in an endless path, a plurality of mold locating means suspended at definite spaced intervals on said conveyor, molds supported on said locating means, means for fabricating ware on said molds, a second flexible conveyor adjacent the first conveyor, ware locating means suspended on the second conveyor at definite spaced intervals, and means for advancing the two conveyors with their respective locating means in mutual timed relationship at the adjacent portions of said conveyors.

55. Apparatus according to claim 54 in which the locating means of the second conveyor comprises boxing forms and said conveyor moves at half the speed of the first conveyor.

56. Apparatus according to claim 54 comprising also means operating synchronously with the advance of the conveyors for transferring ware from the molds on the first conveyor to the ware locating means of the second conveyor, and vice versa.

57. Apparatus for the manufacture of pottery ware comprising, a flexible conveyor operating in an endless path, a plurality of mold locating means suspended at definite spaced intervals on said conveyor, molds supported on said locating means, means for fabricating ware on said molds, a second flexible conveyor adjacent the first conveyor, ware locating means suspended on the second conveyor at definite spaced intervals, a third conveyor adjacent the first conveyor, ware locating means suspended on the third conveyor at definite spaced intervals, and means for advancing the three conveyors with their respective locating means in mutual timed relationship at the adjacent portions of said conveyors.

58. Apparatus for the manufacture of pottery ware comprising, a flexible conveyor operating in an endless path, a plurality of mold locating means suspended at definite spaced intervals on said conveyor, molds supported on said locating means, means for fabricating ware on said molds, a second flexible conveyor operating in an endless path adjacent the first conveyor, means carried by the second conveyor for effecting additional fabrication of ware temporarily transferred to said means from the first conveyor, a third flexible conveyor movable in an endless path adjacent the first conveyor, means carried by the third conveyor for effecting additional operations on ware transferred thereto from the second conveyor, a fourth conveyor operating in an endless path arranged to receive finished ware from the first conveyor, and means for advancing the said conveyors in mutually timed relation.

59. Apparatus for fabricating pottery ware comprising, a drier, an endless chain conveyor adapted to traverse said drier, mold trays provided with open bottom mold seats suspended from said conveyor, ware forming molds disposed in said seats, a series of ware fabricating stations installed for operation above the line of travel of the conveyor and including clay feeding mechanism and ware shaping mechanism, a second conveyor traversing the drier and synchronized with the first named conveyor, a plurality of trays carrying appendage molds mounted in series in said second-named conveyor, means for charging the appendage molds with clay slip, means for transferring ware from the forming molds to the appendage molds in contact with the appendage therein, a third conveyor synchronized with both of said first and second-named conveyors, boxing forms carried by said third-named conveyor, means for transferring the appendaged ware to said boxing forms in boxed position, and means for transferring the appendaged ware in boxed condition to the first-named conveyor.

60. Apparatus for fabricating pottery ware comprising, a drier, a line of fabricating stations arranged adjacent the drier, an endless flexible conveyor adapted to traverse the fabricating stations and drier, a series of trays provided with open bottom mold seats suspended from said conveyor, molds disposed in said seats, means mounted for reciprocatory and rotary movement beneath the line of travel of said trays for effecting mold movements of the molds carried thereby, a ware conveyor synchronized with said first-named conveyor, and means for automatically transferring fabricated ware from the first named conveyor to said ware conveyor.

61. Apparatus for fabricating pottery ware comprising, a drier, an endless chain conveyor adapted to traverse said drier, mold trays provided with open bottom mold seats suspended from said conveyor, ware forming molds disposed in said seats, a series of ware fabricating stations installed for operation above the line of travel of the conveyor and including clay feeding mechanism and ware shaping mechanism, a second conveyor traversing the drier and synchronized with the first-named conveyor, a plurality of trays carrying appendage molds mounted in series in said second-named conveyor, means for charging the appendage molds with clay slip, means for transferring the ware from the forming molds to the appendage molds in contact with the appendage therein, a third conveyor synchronized with both of said first and second-named conveyors, boxing forms carried by said third-named conveyor, means for transferring the appendaged ware to said boxing forms in boxed position, and means for transferring the appendaged ware in boxed condition to the first-named conveyor.

62. An installation for the mass production manufacture of pottery ware comprising, in combination, an automatic pottery ware fabricating machine, a drier, and means for promoting the drying of the ware within a definite predetermined interval comprising a support on which the molds are travelled exposing a maximum surface area of the mold, a mold having predetermined wall section enabling extraction of water from the clay within the interval aforesaid and an air circulating and humidifying system automatically controllable according to temperature and humidity conditions along the path of travel of said ware.

63. In the mass production manufacture of pottery ware wherein molds are circulated in repeated endless cycles through a drier and filling means, the combination with a conveyor on which said molds are travelled of a mold which comprises a body portion having a depth in the zone of the ware forming surface permitting direct penetration of the moisture in the freshly formed ware to the external surface of the mold and means for regulating the drying atmosphere in the drier to vaporize such moisture incident to the travel of the mold therethrough whereby the mold is restored to a substantially dry condition preparatory to refilling when it again reaches the filling means, and repeating such circulation indefinitely.

64. In apparatus for the mass production manufacture of pottery ware on absorbent molds of diversiform character, the combination which comprises, a drier, fabricating units mounted in co-operative relation with the drier, a conveyor for travelling molds through the drier and fabricating unit said conveyor including a plurality of mold supports each having individual mold seats said mold seats being adjustable relative to said supports and adjustable to accommodate molds of different sizes.

65. In apparatus for the manufacture of pottery ware the combination which comprises, a conveyor having a group of molds located thereon, a plurality of ware fabricating means each for making ware in multiple on a plurality of molds associated therewith, means for operating said conveyor and said fabricating means in timed relation, and adjustable mold supports associated with said conveyor for locating the molds both centrally and heightwise relative to the fabricating means.

66. Apparatus for manufacturing pottery ware comprising, in combination, a conveyor, mold supports associated therewith, individual mold seats carried by said supports, means enabling the adjustment of said seats relative to one another and to said supports to thereby establish in the direction of the length of said conveyor a plurality of aligned rows of molds, a plurality of fabricating machines straddling said conveyor and arranged in sequence for manufacturing ware in said molds from clay mass to completed product ready for the firing kiln, said machines including a plurality of individual units for fabricating ware, and means for adjusting each machine relative to its respective production line.

67. Apparatus for the manufacture of pottery ware which comprises, in combination, a conveyor, a plurality of ware fabricating means located adjacent said conveyor, means for supporting molds on said conveyor comprising trays having side and end members connected by telescoping members which project into said end members.

68. In apparatus for the manufacture of pottery the combination which comprises, a conveyor, a plurality of ware fabricating means associated with said conveyor and a plurality of trays associated with said conveyor including side members provided with a series of perforations for adjustable securement of mold supporting members in predetermined position.

69. In apparatus for the mass production manufacture of pottery ware the combination which comprises, means for automatically fabricating pottery ware, a conveyor for travelling molds and means associated with said conveyor for initiating the operation of said fabricating means.

70. In apparatus for the manufacture of pottery ware, the combination which comprises, a mold conveyor carrying a plurality of molds, ware fabricating means located adjacent said conveyor, a plurality of mold supports associated with said conveyor, means for halting said supports adjacent said fabricating means, means associated with said supports for initiating the operation of said ware fabricating means incident to the halting thereof.

71. Apparatus for the manufacture of pottery ware comprising, in combination, conveying means for molds and ware including supports on which a multiple of molds are located, a plurality of fabricating machines arranged adjacent and in sequence along said conveying means, said molds being accessible from above, below and through the sides of said supports and means associated with said fabricating machines for co-operation with said molds from above, below and through the sides of said supports.

72. An installation for the manufacture of insulators comprising, in combination, a drier, a kiln, conveying means associated therewith, molds carried by said conveying means, rotatable shaping tool co-operable with said molds movable vertically and laterally relative to the molding cavity, means insertable in said molds and removable from the ware subsequent to drying for forming an external groove in said ware, means for finishing the dried ware, means for applying a vitreous coating to said ware, said ware being subsequently conveyed to the firing kiln.

73. An installation for the manufacture of screw threaded insulators comprising, a drier, a kiln, conveying means associated therewith, molds carried by said conveying means having inserts therein adapted to form a groove in the completed ware and being removable therefrom subsequent to firing, a mold charging apparatus, and means for shaping the interior of said ware and screw threading the same comprising, a support and a rotatable tool having a lateral floating movement relative to said support.

74. Apparatus for manufacturing pottery ware comprising, in combination, a drier, a conveyor for molds including a plurality of supports arranged laterally thereof each support having a plurality of adjustable mold seats aligned in rows in the direction of the length of said conveyor, fabricating means for charging and applying clay to molds associated with each row of molds and ahead of the drier and means for finishing the ware, and means for coating the ware associated with each row of molds and arranged behind the drier, the molds being first filled prior to entering the drier, the ware then dried and the edges and bottoms finished and then coated preparatory to firing and means for conveying said coated ware to a firing kiln.

75. A method for the mass production of pottery ware which comprises, circulating a group of molds in an endless path along one portion of a main production line, automatically forming the bodies of many different shaped articles in said molds requiring different processing steps to complete the same preparatory to firing, drying the bodies in unison as the same are progressed along the production line and removing certain of the bodies from said molds whilst others continue to advance through the drier, automatically turning and finishing the bodies thus removed and as the same progress forming and applying appendages thereto and returning the same to the production line, finishing the edges and bottoms of all of the ware and applying a coating to be fired thereto and thereafter firing the ware.

76. In apparatus for manufacturing diversified pottery ware, a mold conveyor, a mold charging means, a preforming means having a plurality of shaping heads attached thereto, means for alternating said shaping heads, a reshaping and decorating means having a plurality of material applying heads attached thereto, means for alternating said heads, a jigger having a plurality of profiles and means for alternating said profiles and means for synchronizing said alternating means with said conveyor.

77. In apparatus for the manufacture of pottery ware, a conveyor for travelling molds of different form in sequence to a jiggering machine having a plurality of profiles and means for alternating the profiles to co-operate corresponding profiles with corresponding molds, means for drying the ware and means for decorating the ware comprising a plurality of decorating heads and means for alternating the heads to co-operate corresponding ware pieces with corresponding heads.

78. In apparatus for the manufacture of diversified pottery ware from clay mass to completed article ready for the firing kiln, a mold charging means, a conveyor for travelling diversified molds thereto in consecutive order, a jigger having a multiple of profiles and means for alternating said profiles to co-operate corresponding molds and profiles, means for turning and finishing ware in the order of ware succession, means for applying a coating to be fired to the ware, and a conveyor for transporting coated ware therefrom.

79. Apparatus for fabricating pottery ware comprising, a drier, a multiple of open-bottom trays carrying partible sectional molds mounted in series in co-operative relation with the drier, means for advancing said trays in a substantially rectilinear plane through the drier, reciprocable and rotatable chucks mounted below the line of travel of said trays, and means for opening and closing said molds in response to reciprocation of said chucks.

80. An apparatus for the manufacture of pottery ware comprising, a drier, a conveying means on which both molds and ware are conveyed and a plurality of ware fabricating apparatus mounted in conjunction with the conveyor and drier for the automatic sequential manufacture of pottery ware from clay mass to completed product having a mold charging means including a plurality of upper dies each provided with a central orifice, a housing surrounding each die with clearance between the periphery of the die and the housing which, together with a mold, forms a substantially closed chamber, means for progressing clay into said housing, a resiliently mounted plunger for closing the central orifice, and means for applying pressure to the clay in the housing to thereby force it into said chamber at the peripheral portion of the mold and inwardly toward the apex of the mold and means for reciprocating said plunger, said plunger permitting back extrusion of excess material and being adapted to form the central portion of the ware.

81. An installation for the mass production of pottery ware from clay mass to completed product ready for the firing kiln comprising, a conveying means, a drier, a plurality of ware fabricating units mounted in conjunction therewith and including an apparatus for applying additional material to the ware having a source of supply of additional material, a chambered material distributing and shaping attachment, means for supporting said attachment, a mold support, means for conveying additional material to the chambered interior of the attachment and through the attachment to the surface of the ware and means for moving the attachment relative to the mold to distribute the material over the surface of the ware and shape the material.

82. An installation for the mass production of pottery ware from clay mass to completed product ready for the firing kiln comprising, a conveying means for molds and ware, a drier, a plurality of ware fabricating units mounted in conjunction therewith and in sequence for the stepwise fabrication of pottery ware and including an apparatus for applying additional material to the ware comprising a source of supply of additional material, a distributing and shaping attachment adapted to co-operate with molds and means for actuating the attachment and the mold relative to one another to distribute the material over the surface of the partly formed clay and shape the material.

83. Apparatus according to claim 82 including means for imparting universal motion to said attachment.

84. Apparatus according to claim 82 including a charge measuring and segregating device which delivers the additional material in measured charges to the attachment.

85. Apparatus according to claim 82 including means for applying pressure to the charge of clay delivered to the attachment to spread the material radially over the surface of the partly formed clay.

86. Apparatus according to claim 82 which includes a charge measuring device, a pressure applying means and means for regulating the quantity of material comprised in each charge.

87. Apparatus according to claim 82 including a charge measuring and segregating device and means for controlling the phase of delivery of the charges whilst the device is in operation.

88. An installation for the mass production of pottery ware from clay mass to completed product ready for the firing kiln comprising a conveying means for molds and ware, a drier, a plurality of ware fabricating units mounted in conjunction therewith and in sequence for the stepwise fabrication of the pottery ware, said ware fabricating units including an apparatus for applying additional material to partly formed mold bonded clay bodies comprising an applying means and a pug mill assembly for supplying additional material of a non-fluid character thereto and a pump for supplying material of fluid character thereto.

89. Apparatus according to claim 88 including a system of cams and levers for actuating the pug mill and pump assembly and means for adjusting the pug mill and pump while in operation to vary the volume of the charge of additional material.

90. Apparatus for the mass production of pottery ware comprising, a conveying means for molds and ware, a drier, a plurality of ware fabricating units mounted in conjunction therewith for the stepwise manufacture of ware from clay mass to completed product ready for the firing kiln and including a treating and decorating means which comprises resiliently mounted decorating and shaping members and means for independently operating said members.

91. In combination with a machine for manufacturing pottery ware from clay mass to completed product ready for the firing kiln wherein a plurality of fabricating machines are arranged in sequence and operated in conjunction with a conveyor for transporting molds and ware thereto, a machine for turning and finishing the ware comprising a carriage assembly, a chuck mounted thereon, means for gripping the ware to the chuck, means for moving the carriage assembly to separate the ware from the mold and moving the ware into operative adjacency to turning and finishing means for turning and finishing and means for actuating the same.

92. In the manufacture of pottery ware the steps in the method of forming appendaged ware wherein the ware is automatically fabricated from clay mass to completed product ready for the firing kiln which consists in conveying the ware through a drying atmosphere in forming molds, providing a series of partible molds formed with cavities defining the appendage, conveying said partible molds successively into charging position and charging each mold with a measured quantity of slip in excess of its normal capacity, transferring the ware from said forming molds and joining it to the appendages in said partible molds, subsequently applying pressure to treat the clay in the freshly charged appendage mold cavity and part said partible molds, and transferring the ware from said partible molds to boxing forms or other supports.

93. In the manufacture of pottery ware the steps in the method of forming appendaged ware wherein the ware is automatically fabricated from clay mass to completed product ready for the firing kiln which consists in conveying the ware through a drying atmosphere until it reaches a leather-hard or partially dry condition and then transferring the ware to an appendage mold which has been charged with clay in a fluid or semi-fluid state, the ware being placed on the mold in contact with the clay and conveyed through a drying atmosphere until the appendage sets, the said ware and/or appendage being conditioned to equalize shrinkage in the joined bodies.

94. The steps in the method of manufacturing pottery ware automatically from clay mass to completed product ready for the bisque kiln which consists in establishing a flow of slip from a source of supply into a reservoir, advancing a plurality of molds in series and successively halting said molds to bring their filling openings in a predetermined horizontal plane relatively to the normal level of the slip in the reservoir, giving a preliminary impulse to the slip to initiate a flow by syphoning action into the mold, the flow being interrupted when the slip in the mold attains a level equal to the level of the slip in the reservoir, removing the ware from the molds when solidified to proper thickness, glazing the ware and firing the same.

95. A pottery installation which comprises, in combination, an automatic machine for fabricating jiggered flat ware and jiggered hollow ware, a dryer, a conveyor associated with said machine and said dryer, means for finishing ware, means for coating the ware preparatory to kiln firing and means for conveying the ware to a firing kiln.

96. A machine for the mass production manufacture of diversified pottery ware comprising, in combination, apparatus for fabricating pottery ware, a dryer, and mold and ware conveying means, finishing means arranged adjacent said conveying means, means for coating said ware preparatory to kiln firing, and means for conveying coated ware to kiln.

97. Apparatus for the manufacture of pottery ware comprising, a combination, a dryer, a plurality of fabricating machines mounted in sequence and in conjunction therewith including a jigger, a finisher and a decorating machine, a chain conveyor traversing said drier and said fabricating units and operating in timed relation therewith, a plurality of carriers connected to said conveyor, means for disconnecting a carrier from said conveyor located adjacent each of said fabricating stations whilst a fabricating operation is performed on the molds carried by said carrier, said carrier being subsequently reconnected to said conveyor and transported to the succeeding fabricating station.

98. Apparatus for the manufacture of pottery ware comprising, in combination, a plurality of ware fabricating units including a jiggering machine, a machine for finishing the edges and bottoms of ware and a glazing unit, a dryer, a conveyor associated with said dryer and said fabricating units, mold carriers suspended from said conveyor and means associated with each of said fabricating units for arresting the travel of a carrier whilst fabricating operations are performed on the molds carried thereby without interrupting the continued travel of molds traversing points between the fabricating units and in the dryer.

WILLIAM J. MILLER.

REFERENCES CITED

The following references are of record in the file of this patent:

UNITED STATES PATENTS

| Number | Name | Date |
| --- | --- | --- |
| 1,835,158 | Henderson | Dec. 8, 1931 |

OTHER REFERENCES

Journal of American Ceramic Soc., vols. 11 and 19,